United States Patent
Greenblatt et al.

(10) Patent No.: US 11,645,835 B2
(45) Date of Patent: May 9, 2023

(54) HYPERCOMPLEX DEEP LEARNING METHODS, ARCHITECTURES, AND APPARATUS FOR MULTIMODAL SMALL, MEDIUM, AND LARGE-SCALE DATA REPRESENTATION, ANALYSIS, AND APPLICATIONS

(71) Applicant: The Board of Regents of the University of Texas System, Austin, TX (US)

(72) Inventors: Aaron Benjamin Greenblatt, Stoughton, MA (US); Sos S. Agaian, San Antonio, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 1187 days.

(21) Appl. No.: 16/117,415

(22) Filed: Aug. 30, 2018

(65) Prior Publication Data

US 2019/0087726 A1    Mar. 21, 2019

Related U.S. Application Data

(60) Provisional application No. 62/551,901, filed on Aug. 30, 2017.

(51) Int. Cl.
*G06N 3/08*    (2006.01)
*G06N 5/046*    (2023.01)
(Continued)

(52) U.S. Cl.
CPC .............. *G06N 3/08* (2013.01); *G06K 9/627* (2013.01); *G06K 9/6257* (2013.01);
(Continued)

(58) Field of Classification Search
CPC ...... G06N 3/08; G06N 3/0445; G06N 3/0454; G06N 3/0481; G06N 3/082; G06N 5/046;
(Continued)

(56) References Cited

U.S. PATENT DOCUMENTS

| 6,269,351 B1 | 7/2001 | Black |
| 6,463,438 B1 | 8/2002 | Veltri |

(Continued)

FOREIGN PATENT DOCUMENTS

| CN | 107239730 A | * 10/2017 | ......... G06K 9/00818 |
| EP | 0 461 902 | 12/1991 | |

(Continued)

OTHER PUBLICATIONS

Basavanhally et al. "EM-based segmentation-driven color standardization of digitized histopathology," in Proc. SPIE Medical Imaging, 2013.

(Continued)

*Primary Examiner* — Stephen G Sherman
(74) *Attorney, Agent, or Firm* — Kowert, Hood, Munyon, Rankin & Goetzel P.C.; Gareth M. Sampson

(57) ABSTRACT

A method and system for creating hypercomplex representations of data includes, in one exemplary embodiment, at least one set of training data with associated labels or desired response values, transforming the data and labels into hypercomplex values, methods for defining hypercomplex graphs of functions, training algorithms to minimize the cost of an error function over the parameters in the graph, and methods for reading hierarchical data representations from the resulting graph. Another exemplary embodiment learns hierarchical representations from unlabeled data. The method and system, in another exemplary embodiment, may be employed for biometric identity verification by combining multimodal data collected using many sensors, including, (Continued)

data, for example, such as anatomical characteristics, behavioral characteristics, demographic indicators, artificial characteristics. In other exemplary embodiments, the system and method may learn hypercomplex function approximations in one environment and transfer the learning to other target environments. Other exemplary applications of the hypercomplex deep learning framework include: image segmentation; image quality evaluation; image steganalysis; face recognition; event embedding in natural language processing; machine translation between languages; object recognition; medical applications such as breast cancer mass classification; multispectral imaging; audio processing; color image filtering; and clothing identification.

7 Claims, 60 Drawing Sheets

(51) Int. Cl.
  G06K 9/62       (2022.01)
  G06N 3/04       (2023.01)
  G06N 3/082      (2023.01)
  G06V 10/98      (2022.01)
  G06V 10/44      (2022.01)
  G06V 20/13      (2022.01)
  G06V 20/64      (2022.01)
  G06V 20/10      (2022.01)

(52) U.S. Cl.
  CPC ......... *G06K 9/6289* (2013.01); *G06N 3/0445* (2013.01); *G06N 3/0454* (2013.01); *G06N 3/0481* (2013.01); *G06N 3/082* (2013.01); *G06N 5/046* (2013.01); *G06V 10/454* (2022.01); *G06V 10/98* (2022.01); *G06V 20/13* (2022.01); *G06V 20/64* (2022.01); *G06V 20/194* (2022.01)

(58) Field of Classification Search
  CPC ...... G06V 10/454; G06V 10/98; G06V 20/64; G06V 20/13; G06V 20/194; G06K 9/6257; G06K 9/627; G06K 9/6289
  See application file for complete search history.

(56) References Cited

U.S. PATENT DOCUMENTS

| | | | |
|---|---|---|---|
| 7,483,554 | B2 | 1/2009 | Kotsianti et al. |
| 7,761,240 | B2 | 7/2010 | Saidi et al. |
| 7,899,625 | B2 | 3/2011 | Bhanot et al. |
| 8,139,831 | B2 | 3/2012 | Khamene et al. |
| 10,055,551 | B2 | 8/2018 | Agaian et al. |
| 10,192,099 | B2 | 1/2019 | Agaian et al. |
| 2002/0165837 | A1 | 11/2002 | Zhang et al. |
| 2004/0258310 | A1 | 12/2004 | Giger et al. |
| 2006/0064248 | A1 | 2/2006 | Saidi et al. |
| 2007/0019854 | A1 | 1/2007 | Gholap et al. |
| 2008/0205518 | A1 | 8/2008 | Wilinski et al. |
| 2008/0319933 | A1* | 12/2008 | Moussa ............... G06N 3/084 706/31 |
| 2009/0077543 | A1 | 3/2009 | Siskind et al. |
| 2009/0161928 | A1 | 6/2009 | Khamene et al. |
| 2009/0274386 | A1 | 11/2009 | Panetta et al. |
| 2009/0297007 | A1 | 12/2009 | Cosatto et al. |
| 2010/0054622 | A1 | 3/2010 | Adams |
| 2010/0088264 | A1 | 4/2010 | Teverovskiy et al. |
| 2010/0098306 | A1 | 4/2010 | Madabhushi et al. |
| 2010/0177950 | A1 | 7/2010 | Donovan et al. |
| 2010/0312072 | A1 | 12/2010 | Breskin |
| 2011/0243417 | A1 | 10/2011 | Madabhushi et al. |
| 2012/0116716 | A1 | 6/2012 | Lokshin et al. |
| 2012/0148141 | A1 | 6/2012 | Ozcan et al. |
| 2013/0117212 | A1* | 5/2013 | Hunzinger ............ G06N 3/04 706/25 |
| 2016/0314567 | A1 | 10/2016 | Agaian et al. |
| 2016/0342888 | A1* | 11/2016 | Yang .................... G06K 9/6273 |
| 2018/0018757 | A1* | 1/2018 | Suzuki ................. G06T 3/4053 |
| 2018/0074493 | A1* | 3/2018 | Prokhorov ........... B60W 30/00 |

FOREIGN PATENT DOCUMENTS

| | | |
|---|---|---|
| EP | 1286280 | 2/2003 |
| KR | 100989650 | 10/2010 |
| WO | 2009006696 | 1/2009 |
| WO | 2013049153 | 4/2013 |

OTHER PUBLICATIONS

Bautista et al. "Color standardization in whole slide imaging using a color calibration slide," Journal of pathology informatics, vol. 5, 2014.
Bejnordi et al. "Quantitative analysis of stain variability in histology slides and an algorithm for standardization," in SPIE Medical Imaging. International Society for Optics and Photonics, 2014, pp. 904 108.
Bezdek "Cluster validity with fuzzy sets," J. of Cybern., vol. 3, pp. 58-71, 1974.
Gao et al. "Color image attribute and quality measurements," in Proc. SPIE Sensing Technology+ Applications, 2014.
Khan et al. "A nonlinear mapping approach to stain normalization in digital histopathology images using image-specific color deconvolution," IEEE Trans. Biomed. Eng., vol. 61, No. 6, pp. 1729-1738, 2014.
Laak et al. "Hue-saturation-density (hsd) model for stain recognition in digital images from transmitted light microscopy," Cytometry, vol. 39, No. 4, pp. 275-284, 2000.
Lindeberg "Scale-space theory: A basic tool for analyzing structures at different scales," J. of Appl. Statistics, vol. 21, No. 1-2, pp. 225-270, 1994.
Mosquera-Lopez et al. "Exploration of efficacy of gland morphology and architectural features in prostate cancer gleason grading," in IEEE Int. Conf. on Syst., Man, and Cybern. (SMC). IEEE, 2012, pp. 2849-2854.
Mosquera-Lopez et al. "The development of a multi-stage learning scheme using new tissue descriptors for automatic grading of prostatic carcinoma," in IEEE Int. Conf. on Acoust., Speech, and Signal Process. (ICASSP). IEEE, 2014.
Mosquera-Lopez et al. "Computer-aided prostate cancer diagnosis from digitized histopathology: A review on texture-based systems," IEEE Reviews in Biomedical Eng., vol. 8, No. 1, pp. 1-16, 2014.
Mosquera-Lopez et al. "A new set of waveletand fractals-based features for gleason grading of prostate cancer histopathology images," in IS&T/SPIE Electron. Imaging. Int. Soc. for Optics and Photonics, 2013, pp. 865 516-865 516-12.
Mosquera-Lopez et al. "Iterative local color normalization using fuzzy image clustering," in Proc. SPIE 8755, 875518, 2013.
MacEnko et al. "A method for normalizing histology slides for quantitative analysis," in IEEE International Symposium on Biomedical Imaging: From Nano to Macro (ISBI), vol. 9. Boston, MA: IEEE, 2009, pp. 1107-1110.
Magee et al. "Colour normalisation in digital histopathology images," in Proc. Optical Tissue Image analysis in Microscopy, Histopathology and Endoscopy (MICCAI Workshop), 2009.
Nercessian et al. "Multi-scale image fusion using the Parameterized Logarithmic Image Processing model," in Proc. IEEE Systems, Man, and Cybernetics, 2010.
Nercessian et al."An image similarity measure using enhanced human visual system characteristics," in Proc. SPIE Defense, Security, and Sensing, 2011.
Niethammer et al. "Appearance normalization of histology slides" ser. Lectures notes in Computer Science. Springer, 2010, pp. 58-66.
Othman et al. "Colour appearance descriptors for image browsing and retrieval," in Proc. SPIE Electronic Imaging 2008, 2008.

(56) References Cited

OTHER PUBLICATIONS

Panetta "Parameterized logarithmic framework for image enhancement," IEEE Trans. Systems, Man, and Cybernetics, vol. 41, pp. 460-473, 2011.
Panetta et al. "No reference Color Image Contrast and Quality Measures," IEEE Trans. on Consumer Electronics, vol. 59, No. 3, pp. 643-651, 2013.
Reainhard et al. "Color transfer between images," IEEE Comput. Graph. Appl., vol. 21, No. 5, pp. 34-41, 2001.
Senanayake et al. "Colour transfer by feature based histogram registration," in British Mach. Vision Conf. (BMVC). Citeseer, 2007, pp. 1-10.
Silva et al. "Quantify similarity with measurement of enhancement by entropy," in Proc. SPIE Mobile Multimedia/Image Processing for Military and Security Applications, 2007.
Wang et al. "A universal image quality index," IEEE Signal Processing Letters, pp. 81-84, 2002.
Wharton "Comparative study of logarithmic enhancement algorithms with performance measure," in SPIE Electronic imaging, 2006.
Yagi "Color standardization and optimization in whole slide imaging," Diagnostic Pathology, vol. 6, No. 1, p. S15, 2011.
Panetta et al. "Techniques for detection and classification of edges in color images", SPIE Proc., vol. 6982, pp. 69820W-69820W-11 (2008).
Peng et al. "Feature Selection based on Mutual Information: Criteria of Max-Dependency, Max-Relevance, and Min-Redundency", IEEE Transactions on Pattern Analysis and Machine Intelegnce, vol. 21, No. 8, pp. 1226-1237, Aug. 2005.
Phoenix5 "Understanding Gleason Grading", Phoenix 5 with permission from CoMed Communications and Vox Medica, 1997. URL: http://www.phoenix5.org/Infolink/GleasonGrading.html.
Pinoli "The logarithmic image processing model: connections with human brightness perception and contrast estimators", Journal of mathematical image and vision,7(4), 341-358(1997).
Rodriguez et al. "Steganography anomaly detection using simple-one-class classification", Defense and Security Symposium (pp. 65790E-65790E). International Society for Optics and Photonics. (2007).
Roushdy "Comparative study of edge detection algorithms applying on the grayscale noisy image using morphological filter", the International Journal on Graphics, Vision, and Image Processing, 6(4), 17-23 (2006).
Roula et al. "A Multispectral Computer Vision System for Automatic Grading of Prostate Neoplasia" Proc. IEEE International Symposium on Biomedical Imaging , pp. 193-196, 2002. (Abstract).
Ruzon et al. "Color edge detection with compass operator", IEEE Proc. Conference on Computer Vision andPattern Recognition '99, 2, 160-166, 1999.
Sankar et al. "Fractal Features based on Differential Box Counting Method for the Categorization of Digital Mammograms", International Journal of Computer Information Systems and Industrial Management Applications (IJCISIM), Nov. 7, 2010, vol. 2, pp. 011-019, 2010.
Sarkar et al. "An Efficient Differential Box-Counting Approach to Compute Fractal Dimension of Image", IEEE Trans. on Systems, Man and Cybernetics, vol. 24, No. 1, pp. 115-120, Jan. 1994. (Abstract).
Sharifi et al. "A Classified and Comparative Study of Edge Detection Algorithms", Proceedings of the Internaional; Conference on information Technology:Coding and Computing (ITCC 2002).
Shin et al. "Comparison of edge detection algorithms using a structure from motion task," IEEE Transactions on Systems, Man, and Cybernetics, Part B., (4), 589-601 (2001).
Smith et al. "Similarity Measurement Method for the Classification of Architecturally Differentiated Images" Computers and Biomedical Research vol. 32,No. 1, pp. 1-12, Feb. 1999.
Smith et al. "Effect of pre-processing on binarization", Proc. SPIE, (7534), document recognition and retrieval XVII (2010).
Smith "A tutorial on principal components analysis" Cornell University, USA, (2002), 51, 52.
Stotzka et al. "A hybrid neural and statistical classifier system for histopathologic grading of prostatic lesions" Anal Quant Cytol Histol. (1995); 17(3):204-18 (Abstract).
Tabesh et al. "Automated Prostate Cancer Diagnosis and Gleason Grading of Tissue Microarrays", Proc. SPIE, vol. 5747,pp. 58-70, 2005.
Tabesh et al. "Tumor Classification in Histological Images of Prostate Using Color Texture," Proc. IEEE ACSSC 06, pp. 841-845, Oct.-Nov. 2006.
Tabesh et al. "Multifeature Prostate Cancer Diagnosis and Gleason Grading of Histological Images," IEEE Transactions on Medical Imaging, vol. 26, No. 10, pp. 1366-1378, Oct. 2007.
Tai et al. "Computer-Assisted Detection and Grading of Prostatic Cancer in Biopsy Image", Proc. of the International MultiConference of engineers and Computer scientists IMECS2010, vol. 1, Mar. 17-19, 2010.
Tao et al. "Nonlinear image enhancement to improve face detection in complex lighting environment", International Journal of Computational Intelligence Research, 4(2), 327-336(2006).
Trahanias et al. "Color Edge Detection Using Vector Order Statistics". IEEE Trans. on image processing, 2(2), 1993.
Wang et al. "An edge detection algorithm based on Canny operator," Intelligent Systems Design and Applications, ISDA 2007. Issue , Oct. 20-24, 2007 pp. 623-628. (Abstract).
Wang et al. "Progressive Switching Median Filter for the Removal of Impulse Noise from Highly Corrupted Images". Circuits and Systems II: Analog and Digital Signal Processing, IEEE Transactions on (vol. 46, Issue: 1); 1999, 78-80.
Wesolkowski et al. "Comparison of color image edge detectors in multiple color space". ICIP-2000, 796-799, 2000.
Wetzel et al. "Evaluation of prostate tumor grades by content-based image retrieval" Proc. SPIE 27th AIPR Workshop, (1999); vol. 3584, pp. 244-252. (Abstract).
Ying et al. "Anisotropic filter based modified Canny algorithm,". Fourth International Conference on Fuzzy Systems and Knolwedge Discovery. Aug. 24-27, 2007 vol. 1, On pp. 736-740.
Yu-Qian et al. "Medical images edge detection based on mathematical morphology". Proceedings of the 2005 IEEE, Engineering in Medicine and Biology 27th annual conference. Shanghai, China Sep. 1-4, 2005.
Zelelew et al. "Application of digital image processing techniques for asphalt concrete mixture images" The 12th International conference of international association for computer methods and advanced geomachines (IACMAG). Goa, India, Oct. 1-6, 2008.
Aizenberg et al. "Image recognition on the neural network based on multi-valued neurons" In Pattern Recognition, 2000. Proceedings. 15th International Conference on, vol. 2, pp. 989-992. IEEE, 2000.
Aizenberg et al. "Multilayer feedforward neural network based on multi-valued neurons (mlmvn) and a backpropagation learning algorithm" Soft Computing, 11(2):169-183, 2007.
Aizenberg et al. "Blur identification by multilayer neural network based on multivalued neurons" Neural Networks, IEEE Transactions on, 19(5):883-898, 2008.
Alexandratou et al. "Texture analysis of tissues in gleason grading of prostate cancer" In Biomedical Optics (BiOS) 2008, pp. 685904(685904. International Society for Optics and Photonics, 2008.
Altmann "Hamilton, rodrigues, and the quaternion scandal" Mathematics Magazine, pp. 291-308, 1989.
Anderson "Learning to control an inverted pendulum using neural networks" Control Systems Magazine, IEEE, 9(3):31-37, 1989.
Arel et al. Deep machine learning—a new frontier in artificial intelligence research [research frontier]. Computational Intelligence Magazine, IEEE, 5(4):13-18, 2010.
Back et al. "Fir and iir synapses, a new neural network architecture for time series modeling" Neural Computation, 3(3):375-385, 1991.
Bas et al. Color image watermarking using quaternion fourier transform. In Acoustics, Speech, and Signal Processing, 2003. Proceedings.(ICASSP'03). 2003 IEEE International Conference on, vol. 3, pp. III-521. IEEE, 2003.

(56) References Cited

OTHER PUBLICATIONS

Beazley et al. "Swig: An easy to use tool for integrating scripting languages with c and C++" In Proceedings of the 4th USENIX Tcl/Tk workshop, pp. 129-139, 1996.
Benvenuto et al. "A comparison between real and complex-valued neural networks in communication applications" In Proc. of Intern. Conference on Neural Networks, 1991.
Boser et al. "A training algorithm for optimal margin classifiers" In Proceedings of the fifth annual workshop on Computational learning theory, pp. 144-152. ACM, 1992.
Bulow et al. "Hypercomplex signals—a novel extension of the analytic signal to the multidimensional case" Signal Processing, IEEE Transactions on, 49(11):2844-2852, 2001.
Casasent et al. "Position, rotation, and scale invariant optical correlation" Applied Optics, 15(7):1795-1799, 1976.
Chua "Memristor—the missing circuit element" Circuit Theory, IEEE Transactions on, 18(5):507-519, 1971.
Frigo et al. "Fftw: An adaptive software architecture for theft" In Acoustics, Speech and Signal Processing, 1998. Proceedings of the 1998 IEEE International Conference on, vol. 3, pp. 1381-1384. IEEE, 1998.
Fukushima et al. "Neocognitron: A self-organizing neural network model for a mechanism of pattern recognition unaffected by shift in position" Biological cybernetics, 36(4):193-202, 1980.
Giles et al. "Encoding geometric invariances in higher order neural networks" In Neural information processing systems, pp. 301-309. American Institute of Physics, New York, 1988.
Giles et al. "Learning, invariance, and generalization in high-order neural networks" Applied optics, 26(23):4972-4978, 1987.
Hecht-Nielsen "Theory of the backpropagation neural network" In Neural Networks, 1989. IJCNN., International Joint Conference on, pp. 593-605. IEEE, 1989.
Herve et al. "Statistical color texture descriptors for histological images analysis" In Biomedical Imaging: From Nano to Macro 2011 IEEE International Symposium on, pp. 724-727. IEEE, 2011.
Hopfield "Neural networks and physical systems with emergent collective computational abilities" Proceedings of the national academy of sciences, 79(8):2554-2558, 1982.
Huang et al. "Extreme learning machine: a new learning scheme of feedforward neural networks" In Neural Networks, 2004. Proceedings. 2004 IEEE International Joint Conference on Neural Networks, vol. 2, pp. 985-990. IEEE, 2004.
Huang et al. "Extreme learning machine: theory and applications" Neurocomputing, 70(1):489-501, 2006.
Humphrey "Gleason grading and prognostic factors in carcinoma of the prostate" Modern pathology, 17(3):292-306, 2004.
Hwang et al. "A linear continuous feedback control of chua's circuit" Chaos, Solitons & Fractals, 8(9):1507-1515, 1997.
Jafari-Khouzani et al. "Multiwavelet grading of pathological images of prostate" Biomedical Engineering, IEEE Transactions on, 50(6):697-704, 2003.
Jahanchahi et al. "A Class of Quaternion Kalman Filters" IEEE Transactions on Neural Networks and Learning Systems, vol. 25, No. 3, Mar. 2014, 533-544.
Jafari-Khouzani et al. "Automatic grading of pathological images of prostate using multiwavelet transform" In Engineering in Medicine and Biology Society, 2001. Proc. International Conf. of the IEEE, vol. 3, pp. 2545-2548. IEEE, 2001.
Khurd et al. "Computer-aided gleason grading of prostate cancer histopathological images using texton forests" In Biomedical Imaging: From Nano to Macro, Intl Symposium on, pp. 636-639. IEEE, 2010.
Kingsbury "The dual-tree complex wavelet transform: a new efficient tool for image restoration and enhancement" In Proc. EUSIPCO, vol. 98, pp. 319-322, 1998.
Kusamichi et al. "A new scheme for colour night vision by quaternion neural network" In 2nd International Conference on Autonomous Robots & Agents, 2004.
Littlestone "Learning quickly when irrelevant attributes abound: A new linear-threshold algorithm" Machine learning, 2(4):285-318, 1988.
Matsumoto "A chaotic attractor from Chua's circuit" Circuits and Systems, IEEE Transactions on, 31(12):1055-1058, 1984.
McCarthy et al. "A proposal for the Dartmouth summer research project on artificial intelligence", Aug. 31, 1955. AI Magazine, 27(4):12, 1955.
McEliece et al. "The Capacity of the Hopfield Associative Memory" Information Theory, IEEE Transactions on, 33(4):461{482, 1987.
Naik et al. "Automated gland and nuclei segmentation for grading of prostate and breast cancer histopathology" In Proceedings/IEEE International Symposium on Biomedical Imaging: from nano to macro. ISBI 2008. pp. 284-287. IEEE, 2008.
Naik et al. "Gland segmentation and computerized gleason grading of prostate histology by integrating low-, high-level and domain specific information" In MIAAB Workshop. Citeseer, 2007.
Nitta A quaternary version of the back-propagation algorithm. In Neural Networks, 1995. Proceedings., IEEE International Conference on, vol. 5, pp. 2753-2756. IEEE, 1995.
Ojala et al "Multiresolution gray-scale and rotation invariant texture classification with local binary patterns" Pattern Analysis and Machine Intelligence, IEEE Trans. on, 24(7):971-987, 2002.
Pei et al. "Color image processing by using binary quaternion-moment-preserving thresholding technique" Image Processing, IEEE Transactions on, 8(5):614-628, 1999.
Quinlan "Induction of decision trees" Machine Learning, 1(1):81-106, 1986.
Rosenblatt "The perceptron: a probabilistic model for information storage and organization in the brain" Psychological Review, 65(6):386, 1958.
Rumelhart et al. Learning representations by back-propagating errors Nature, 323:533-536, 1986.
Sabata et al. "Automated analysis of pin-4 stained prostate needle biopsies" In Prostate Cancer Imaging. Computer-Aided Diagnosis, Prognosis, and Intervention, pp. 89-100. Springer, 2010.
Schapire et al. "The strength of weak learnability" Machine Learning, 5(2):197-227, 1990.
Selesnick et al. "The dual-tree complex wavelet transform" Signal Processing Magazine, IEEE, 22(6):123-151,2005.
Shah "Current perspectives on the gleason grading of prostate cancer" Archives of Pathology & Laboratory medicine, 133(11):1810-1816, 2009.
Shoemake "Animating rotation with quaternion curves" ACM SIG-GRAPH Computer Graphics, 19(3):245-254, 1985.
Solomono "An inductive inference machine" In IRE Convention Record, Section on Information Theory, pp. 56-62, 1957.
Soulard et al. "Quaternionic wavelets for texture classification" Pattern Recognition Letters, 32(13):1669-1678, 2011.
Sparks et al. "Gleason grading of prostate histology utilizing manifold regularization via statistical shape model of manifolds" In Proc. of SPIE vol. 8315, pp. 83151J-1-83151J-13, 2012.
Tabesh et al. "Multifeature prostate cancer diagnosis and gleason grading of histological images" IEEE Transactions on Medical Imaging, 26(10):1366-1378, 2007.
Took et al "The quaternion lms algorithm for adaptive filtering of hypercomplex processes" IEEE Transactions on Signal Processing, 57(4):1316-1327, 2009.
Turing "Computing machinery and intelligence" Mind, 59(236):433-460, 1950.
Vapnik et al. "On the uniform convergence of relative frequencies of events to their probabilities" Theory of Probability & Its Applications, 16(2):264-280, 1971.
Von Der Malsburg "Pattern recognition by labeled graph matching" Neural Networks, 1(2):141-148, 1988.
Widrow et al. "Adaptive noise cancelling: Principles and applications" Proceedings of the IEEE, 63(12):1692-1716, 1975.
Widrow et al. "The no-prop algorithm: A new learning algorithm for multilayer neural networks" IEEE Transactions on Neural Networks, 2013.
Widrow et al. "30 years of adaptive neural networks: Perceptron, Madaline, and Backpropagation" Proceedings of the IEEE, 78(9):1415-1442, 1990.

(56) References Cited

OTHER PUBLICATIONS

Wong et al. "Quaternion based fuzzy neural network classifier for mpik datasets view-invariant color face image recognition" Informatica, 37:181-192, 2013.
Xia et al. "Automatic detection of malignant prostatic gland units in cross-sectional microscopic images" 2010 17th IEEE Intl Conf. on Image Processing (ICIP), pp. 1057-1060. IEEE, 2010.
Xiong et al. "Blind estimation of reverberation time based on spectro-temporal modulation filtering" 2013 IEEE International Conference on Acoustics, Speech and Signal Processing (ICASSP), pp. 443-447. IEEE, 2013.
Yassen "Adaptive control and synchronization of a modified Chua's circuit system" Applied Mathematics and Computation, 135(1):113-128, 2003.
Yoon et al. "Cardinal multiridgelet-based prostate cancer histological image classification for Gleason grading" 2011 Intl Conf on Bioinformatics and Biomedicine (BIBM), pp. 315-320. IEEE, 2011.
Ziou et al. "Edge detection techniques—an overview" International Journal of Pattern Recognition and Image Analysis, 1998.
Zhou et al. "Edge detection and linear feature extraction using 2D random field model", IEEE transactions on pattern analysis and machine intelligence, 11(1), 84-95(1989).
Zhang et al. "A new edge detection method in image processing", IEEE Proc. of the International Symposium on Communications and Information Technology. (ISCIT2005), 1, 445-448, 2005 (Abstract).
Zelelew et al. "A volumetric thresholding algorithm for processing asphalt concrete x-ray CT images". International journal of pavement engineering, vol. 12, Issue 6, 2011, 543-551 (Abstract).
Agaian "Visual Morphology", Proc. SPIE, (3646), 139-150 (1999).
Agaian et al. "A new edge detection algorithm in image processing based on LIP-ratio approach", Proc. SPIE, vol. 7532, (2010).
Chang et al. "Texture Analysis and Classification with Tree-Structured Wavelet Transform", IEEE Trans. Image Process, vol. 2, No. 4, pp. 429-441(1993).
Deng et al. "Differentation-based edge detection using the logarithmic image processing model". Journal of Mathematical Imaging and Vision 8, 161-180 (1998) (Abstract).
Deng et al. "The logarithmic image processing model and its applications", IEEE Proc. of the 27th Asilomar Conference on Signals, Systems, and Computers (ACSSC93), 2, 1047-1041(1993).
Dikbas et al. "Chrominance Edge preserving Grayscale Transformation with Approximate First Principal Component for Color Edge Detection", IEEE Proc. ICIP 2007, II,261-264, 2007.
Ding et al. "On the canny edge detector". Pattern Recognition. vol. 34, Issue 3, pp. 721-725 Mar. 2001.
Dony et al. "Edge detection on color images using RGBvector angles", IEEE Proc. of the 1999 IEEE Canadian Conference on Electrical and Computer Engineering Shaw Conference Center, Edmonton, Alberta, Canada , 1999.
Doyle et al "Automated grading of prostate cancer using architectural and textural image features", IEEE International Symposium on Biomedical Imaging: From Nano to Macro ISBI 2007, pp. 1284 1287,2007.

Felsberg "A Novel two-step method for CT reconstruction," BVM, 2008.
Ge et al. A method of Multi-Scale Edge Detection Based on Lifting Scheme and Fusion Rule.Proceedings of 2007 International Conference on wavelet Analysis and Pattern Recognition, Beijing, China Nov. 2-4, 2007.
He et al. "An improved Canny edge detector and its realization of FPGA", IEEE Proc. of the 7th conference on Intelligent Control and Automation, (WCICA2008), 6561-6564, 2008, (Abstract).
Hong-Lei et al. "Road Recognition in High Resolution SAR Image Based on Genetic Algorithm," ICIA,pp. 649-654, IEEE International Conference on Information Acquisition, 2006. (Abstract).
Huang et al. "Automatic Classification for Pathological Prostate Images Based on Fractal Analysis," IEEE Transactions on Medical Imaging, vol. 28, No. 7, pp. 1037-1050, Jul. 2009.
Huang et al. "Effective Segmentation and Classification for HCC Biopsy Images", Pattern Recognition, vol. 43, No. 4, pp. 1550-1563, 2009. (Abstract).
Jingzhong et al. "A method of edge detection based on improved canny algorithm for the Lidar-depth image", Geoinformatic 2006. SPIE vol. 6419,64190. (Abstract).
Khouzani et al. "Automatic Grading of Pathological Images of Prostate Using Multiwavelet Transform," Proc. IEEE 23rd Annual International Conference, Engineering in Medicine and Biology Society, vol. 3, pp. 2545-2548, 2001.
Khouzani et al. "Multiwavelet grading of pathological images of prostate" Biomedical Engineering, IEEE Transactions on, 2003, vol. 50 (6), 697-704. (Abstract).
Kogan et al. "Visualization using rational morphology and zonal magnitude-reduction", Proc. SPIE, (3304), non linear image processing IX 153-163(1998).
Koschan "A Comparative Study on Color Edge Detecton", IEEE Proc. ACCV'95, Singapore, III. 547-478, 1995.
Lai et al. "A Harr wavelet approach to compressed image quality measurement", Journal of Visual Communication and Image representation, No. 11, pp. 17-40 (2000).
Lee et al. "Classification for Pathological Prostate Images Based on Fractal Analysis," Proc. IEEE CISP '08, vol. 3, pp. 113-117, May 27-30, 2008.
Nercessian et al. "A Generalized Set of Kernels for Edge and Line Detection," Proceedings: SPIE Electronic Imaging 2009, San Jose, CA, USA, vol. 7245, 2009. (Abstract).
Oppenheimer "The Pathologic Examination of Prostate Tissue", Phoenix5, 1997, URL: http://www.phoenix5.org/Infolink/oppenpath.html#Tis.
Palomares et al. "General logarithmic image processing convolution", IEEE Transactions on image processing, 15(11), 3602-3608, 2006.
Panetta et al. "Logarithmic edge detection with applications", Journal of computers, 3(9) (2008), 11-19.
Panetta et al. "Human visual system based image enhancement and logarithmic contrast measure", IEEE transactions on systems, man, and cybernetics, part b, 1(38) 174-188(2008).

* cited by examiner

Equation 28
$S' = A'X'$ $$\underbrace{\begin{bmatrix} \text{Quat}(1,I,j,k) \\ a_0 \\ a_1 \\ \vdots \\ a_{D_0} \end{bmatrix}}_{D_i \cdot K_x \cdot K_y} \Bigg\}4$$

$D_0 =$ $$\underbrace{\begin{bmatrix} X_{0,0} & X_{0,1} & \cdots & X_{0,M} & \text{Quat}(1,I,j,k) & X_{1,0} & X_{1,1} & \cdots & X_{1,M} & \cdots & X_{G-1,0} & X_{G-1,1} & \cdots & X_{G-1,M} \end{bmatrix}}_{G \cdot (X_i - K_x + 1) \cdot (Y_i - K_y + 1)} \Bigg\}4 \;\; D_i \cdot K_x \cdot K_y$$

FIG. 60

HYPERCOMPLEX DEEP LEARNING METHODS, ARCHITECTURES, AND APPARATUS FOR MULTIMODAL SMALL, MEDIUM, AND LARGE-SCALE DATA REPRESENTATION, ANALYSIS, AND APPLICATIONS

PRIORITY CLAIM

This application claims priority to U.S. Provisional Application Ser. No. 62/551,901 entitled "Hypercomplex Deep Learning Methods, Architectures, and Apparatus for Multimodal Small, Medium, and Large-Scale Data Representation, Analysis, and Applications" filed Aug. 30, 2018, which is incorporated herein by reference in its entirety.

STATEMENT REGARDING FEDERALLY SPONSORED RESEARCH OR DEVELOPMENT

This invention was made with government support under RD-0932339 awarded by the National Science Foundation. The government has certain rights in the invention.

BACKGROUND OF THE INVENTION

1. Field of the Invention

The present invention(s) relate to deep learning networks or graphs, in particular, hypercomplex deep learning systems, methods, and architectures for multimodal small, medium, and large-scale data representation, analysis, and applications.

2. Description of the Relevant Art

Deep learning is a method of discovering hierarchical representations and abstractions of data; the representations help make order out of unstructured data such as images, audio, and text. Existing deep neural networks, however, assume that all data is unstructured, yet many practical engineering problems involve multi-channel data that has important inter-channel relationships which existing deep neural networks cannot model effectively. For example: color images contain three or four related color channels; multispectral images are images of the same object at different wavelengths and therefore have significant inter-wavelength relationships; and multi-sensor applications (e.g. sensor arrays for audio, radar, vision, biometrics, etc.) also employ data relationships between channels. Because existing deep learning structures have difficulty modeling multi-channel data, they require vast amounts of data for training in order to approximate simple inter-channel relationships.

An important topic in traditional, real-valued deep learning literature is the "vanishing gradient" problem, wherein the error terms that are propagated through the network tend towards zero. This occurs due to use of nonlinearities, such as the hyperbolic tangent, that compress the data around zero, that is mapping values of larger magnitude to values of smaller magnitude. After repeated applications of a nonlinearity, the value tends towards zero.

Many application areas have a sparsity of labeled data for deep representation learning. For example, in the fashion industry, there are extensive datasets of images with clothing and labeled attributes such as color, sleeve length, and so on. However, all of these images are taken with models in well-lit images. If one wants to identify the same clothing in images on social media, a mapping from the social media images to the well-lit images would be helpful. Unfortunately, this mapping dataset is extremely small and is difficult to expand. Correspondingly, methods for learning data representations on the large, source dataset of model images and transferring that learning to the target task of clothing identification in social media are necessary.

In addition to transferring learning from one domain to another, it is important to transfer learning from human to machine. Traditionally, machine expert systems were created according to following steps: Problem domain experts would engineer a set of data representations called features; these features would be used to train a fully-connected neural network; and, finally, the neural network would be used for prediction and classification tasks. Deep learning has automated the domain expert creation of features, provided that a sufficiently large dataset exists. However, large datasets do not exist for many applications, and therefore a method of employing human expert features to reduce training set size would be helpful.

One important emerging application of representation learning is multi-sensor fusion and transfer learning in biometric identity verification systems. The primary objective of biometric identity verification systems is to create automated methods to recognize uniquely individuals using: (i) anatomical characteristics, for example, DNA, signature, palm prints, fingerprints, finger shape, face, hand geometry, vascular technology, iris, and retina; (ii) behavioral characteristics, for example, voice, gait, typing rhythm, and gestures; (iii) demographic indicators, for example, height, race, age, and gender; and (iv) artificial characteristics such as tattoos. Biometric systems are rapidly being deployed for border security identity verification, prevention of identity theft, and digital device security.

The key drivers of performance in biometric identity verification systems are multimodal data from sensors and information processing techniques to convert that data into useful features. In existing biometric identity verification systems, the data features are compared against a database to confirm or reject the identity of a particular subject. Recent research in biometrics has focused on improving data sensors and creating improved feature representations of the sensor data. By deep learning standards, typical biometric datasets are small: Tens to tens of thousands of images is a typical size.

There have been significant recent advances in biometric identity verification systems. However, these methods are still inadequate in challenging identification environments. For example, in multimedia applications such as social media and digital entertainment, one attempts to match Internet face images in social media. However, biometric images these applications usually exhibit dramatic variations in pose, illumination, and expression, which substantially degrade performance of traditional biometric algorithms. Moreover, multimedia applications present an additional challenge due to the large scale of the image databases available, therefore leading to many users and increased probability of incorrect identification.

Traditional biometric identity verification systems are usually based on two-dimensional biometric images captured in the visible light spectrum; these images are corrupted by different environmental conditions such as varied lighting, camera angles, and resolution. Multispectral imaging, where visible light is combined with other spectra such as near-infrared and thermal, has recently been applied to biometric identity verification systems. This research has demonstrated that multimodal biometric data fusion can significantly improve the accuracy of biometric identity verification systems due to complementary information from multiple modalities. The addition of palmprint data appears to enhance system performance further.

Curated two-dimensional biometric datasets have been created for a variety of biometric tasks. While each dataset contains information for only a narrowly-defined task, the combination of all datasets would enable the creation of a rich knowledge repository. Moreover, combination of existing biometric datasets with the large repository of unlabeled data on the Internet presents new opportunities and challenges. For example, while there is an abundance of unlabeled data available, many problems either do not have a labeled training set or only have a small training set available. Additionally, the creation of large, labeled training sets generally requires significant time and financial resources.

Recent advances in three-dimensional range sensors and sensor processing have made it possible to overcome some limitations, such as distortion due to illumination and pose changes, of two-dimensional biometric identity system modalities. Three-dimensional multispectral images will provide more geometric and shape information than their two-dimensional counterparts. Using this information, new methods of processing depth-based images and three-dimensional surfaces will enable the improvement of biometric identity verification systems.

In light of recent advances, it is desirable:
i. to explore data representation and feature learning for applications with multiple data channels;
ii. to explore unified processing of multichannel, multimodal data;
iii. to resolve the vanishing gradient problem;
iv. to combine human and machine expertise to build optimal data representations;
v. to explore supervised and unsupervised representation learning;
vi. to investigate transferring learning from one or more tasks or databases to a useful target task;
vii. to explore the synergies of two-dimensional and three-dimensional modalities at the feature level;
viii. to explore methods for mapping three-dimensional images into two-dimensional images to enable the use of existing two-dimensional image databases;
ix. to generate hierarchical data representations of textures associated with three-dimensional objects; and,
x. to employ two-dimensional and three-dimensional data in the analysis of Internet and multimedia images.

SUMMARY OF THE INVENTION

The present invention(s) include systems, methods, and apparatuses for, or for use in: (i) approximating mathematical relationships between one or more sets of data and for, or use in, creating hypercomplex representations of data; (ii) transferring learned knowledge from one hypercomplex system to another; (iii) multimodal hypercomplex learning; and, (iv) biometric identity verification using multimodal, multi-sensor data and hypercomplex representations.

The Summary introduces key concepts related to the present invention(s). However, the description, figures, and images included herein are not intended to be used as an aid to determine the scope of the claimed subject matter. Moreover, the Summary is not intended to limit the scope of the invention.

In some embodiments, the present invention(s) provide techniques for learning hypercomplex feature representations of data, such as, for example: audio; images; biomedical data; biometrics such as fingerprints, palm prints, iris information, facial images, demographic data, behavioral characteristics, and so on; gene sequences; text; unstructured data; writing; geometric patterns; or any other information source. In some embodiments, the data representations may be employed in the applications of, for example, classification, grading, function approximation, system preprocessing, pretraining of other graph structures, and so on.

Some embodiments of the present invention(s) include, for example, hypercomplex convolutional neural network layers and hypercomplex neural network layers with internal state elements.

In some embodiments, the present invention(s) allow for supervised learning given training data inputs with associated desired responses. The present invention(s) may be arranged in any directed or undirected graph structure, including graphs with feedback or skipped nodes. In some embodiments, the present invention(s) may be combined with other types of graph elements, including, for example, pooling, dropout, and fully-connected neural network layers. In some embodiments, the present invention includes convolutional hypercomplex layers and/or locally-connected layers. Polar (angular) representation of hypercomplex numbers is employed in some embodiments of the invention(s), and other embodiments may quantize or otherwise non-linearly process the angular values of the polar representation.

Some embodiments of the present invention(s) propagate training errors through the network graph using an error-correction learning rule. Some embodiments of the learning rule rely upon multiplication of the error with the hypercomplex inverse of hypercomplex weights in the same or other graph elements which, for example, include neural network layers.

In some embodiments of the present invention(s), hypercomplex mathematical operations are performed using real-valued mathematical operators and additional mathematical steps. Some embodiments of the hypercomplex layers may include real-valued software libraries that have been adapted for use with hypercomplex numbers. Exemplary implementations of the present invention(s) to perform highly-optimized computations through real-valued matrix multiply and convolution routines. These real-valued routines, for example, run on readily available computer hardware and are available for download. Examples include the Automatically Tuning Linear Algebra Subroutines and NVIDIA cuDNN libraries.

In some embodiments, techniques or applications are fully automated and are performed by a computing device, such as, for example, a central processing unit (CPU), graphics processing unit (GPU), field programmable gate array (FPGA), and/or application specific integrated circuit (ASIC).

Some embodiments of the present invention(s) include various graph structures involving hypercomplex operations. Examples include hypercomplex feedforward networks, networks with pooling, recurrent networks (i.e. with feedback), networks where connections skip over one more layers, networks with state and layers with internal state elements, and any combination of the aforementioned or other elements.

In some embodiments, the present invention(s) may be employed for supervised learning and/or unsupervised learning. Through a novel pretraining technique, embodiments of the present invention(s) may combine knowledge of application-specific features generated by human experts with machine learning of features in hypercomplex deep neural networks. Some embodiments of the invention employ both labeled and unlabeled datasets, where a large labeled dataset in a source domain may assist in classification tasks for an unlabeled, target domain.

Some embodiments of the present invention(s) have applications in broad areas including, for example: image super resolution; image segmentation; image quality evaluation; image steganalysis; face recognition; event embedding in natural language processing; machine translation between languages; object recognition; medical applications such as breast cancer mass classification; multi-sensor data processing; multispectral imaging; image filtering; biometric identity verification; and clothing identification.

Some embodiments of the present invention(s) incorporate multimodal data for biometric identity verification, for example, anatomical characteristics, behavioral characteristics, demographic indicators, and/or artificial characteristics. Some embodiments of the present invention(s) learn biometric features on a source dataset, for example a driver's license face database, and apply recognition in a target domain, such as social media photographs. Some embodiments of the present invention(s) incorporate multispectral imaging and/or palmprint data as additional modalities. Some embodiments of the present invention(s) employ three-dimensional and/or two-dimensional sensor data. Some embodiments of the present invention(s) incorporate unlabeled biometric data to aid in hypercomplex data representation training.

BRIEF DESCRIPTION OF THE DRAWINGS

Advantages of the present invention will become apparent to those skilled in the art with the benefit of the following detailed description of embodiments and upon reference to the accompanying drawings in which:

FIG. 60 depicts an illustration of Equation 28.

Figure 1:
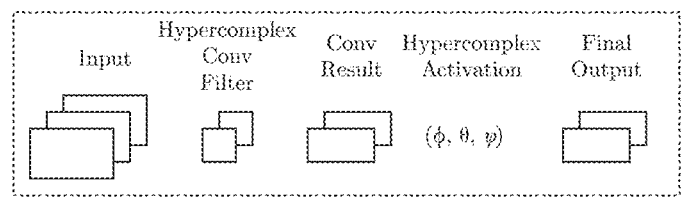
FIG. 1 depicts a schematic diagram of a hypercomplex convolutional layer.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The Detailed Description will be set forth according to the following outline:
1 Mathematical Definition
1.1 Hypercomplex layer introduction
1.2 Quaternion convolution
1.3 Octonion Convolution
1.4 Quaternion convolution for neural networks
1.5 Locally-connected layers
1.6 Hypercomplex polar form conversion
1.7 Activation function angle quantization
1.8 Hypercomplex layer learning rule
1.9 Hypercomplex error propagation
1.10 Unsupervised learning for hypercomplex layer pre-training and deep belief networks
1.11 Hypercomplex layer pre-training using expert features
1.12 Hypercomplex transfer learning
1.13 Hypercomplex layer with state
1.14 Hypercomplex tensor layer
1.15 Hypercomplex dropout
1.16 Hypercomplex pooling
2 Exemplary implementations of hypercomplex layer
2.1 Convolution implementations: GEMM
    2.1.1 Using 16 large real GEMM calls
    2.1.2 Using 8 large real GEMM calls
2.2 Convolution Implementations: cuDNN
2.3 Theano implementation
2.4 GPU and CPU implementations
2.5 Phase-based activation and angle quantization implementation
3 Exemplary hypercomplex deep neural network structures
3.1 Feedforward neural network
3.2 Neural network with pooling
3.3 Recurrent neural network
3.4 Neural network with layer jumps
3.5 State layers
3.6 Parallel Filter Sizes
3.7 Parallel Graphs
3.8 Combinations of Hypercomplex and Other Modules
3.9 Hypercomplex layers in a graph
4 Exemplary applications
4.1 Image super resolution
4.2 Image segmentation
4.3 Image quality evaluation
4.4 Image steganalysis
4.5 Face recognition
4.6 Natural language processing: event embedding
4.7 Natural language processing: machine translation
4.8 Unsupervised learning: object recognition
4.9 Control systems
4.10 Generative Models
4.11 Medical imaging: breast mass classification
4.12 Medical Imaging: MRI
4.13 Hypercomplex processing of multi-sensor data
4.14 Hypercomplex multispectral image processing and prediction
4.15 Hypercomplex image filtering
4.16 Hypercomplex processing of gray level images
4.17 Hypercomplex processing of enhanced color images
4.18 Multimodal biometric identity matching
4.19 Multimodal biometric identity matching with autoencoder
4.20 Multimodal biometric identity matching with unlabeled data
4.21 Multimodal biometric identity matching with transfer learning
4.22 Clothing identification 1 Mathematical Definition A hypercomplex neural network layer is defined presently. In the interest of clarity, a quaternion example is defined below. However, it is to be understood that the method described is applicable to any hypercomplex algebra, including but not limited to biquaternions, exterior algebras, group algebras, matrices, octonions, and quaternions.

1.1 Hypercomplex Layer Introduction

An exemplary hypercomplex layer is shown in FIG. 1. The layer takes a hypercomplex input, performs convolution using a hypercomplex kernel and temporarily stores the result, applies an activation function, and returns a final quaternion output.

Mathematically, in the quaternion case, these steps are defined as follows:

Convolution Step:

Let $\alpha \in \mathbb{H}^{m \times n}$ denote the input to the quaternion layer. The first step, convolution, produces the output $s \in \mathbb{H}^{r \times t}$, as defined in Equation 1:

$$s(x, y) = \sum_{u=-\infty}^{\infty} \sum_{v=-\infty}^{\infty} k(x-u, y-v) \times a(u, v), \quad 1$$

where $k \in \mathbb{H}^{p \times q}$ represents the convolution filter kernel and the x symbol denotes quaternion multiplication. An alternative notation for hypercomplex convolution is the asterisk, where $s = k *_h a$. Details about hypercomplex convolution are explained in Sections 1.2 and 1.4.

Figure 2:
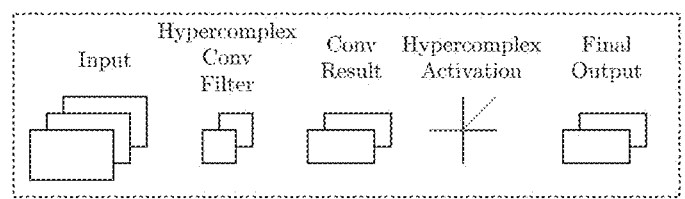
FIG. 2 depicts a schematic diagram of a hypercomplex convolution layer, with ReLU.

Activation Step:

Continuing with the quaternion example, the activation function is applied to $s \in \mathbb{H}^{r \times t}$ and may be any mathematical function. An exemplary function used herein is a nonlinear function that converts the quaternion values into polar (angular) representation, quantizes the phase angles, and then recomputes updated quaternion values on an orthonormal basis (1, i, j, k). More information about this function is provided in Sections 1.6 and 1.7. FIG. 2 demonstrates another exemplary activation function, the Rectified Linear Unit (ReLU), a real-valued function applied to each component of a quaternion number.

1.2 Quaternion Convolution

Exemplary methods for hypercomplex convolution are described presently. The examples described herein all pertain to quaternion convolution.

Figure 3:
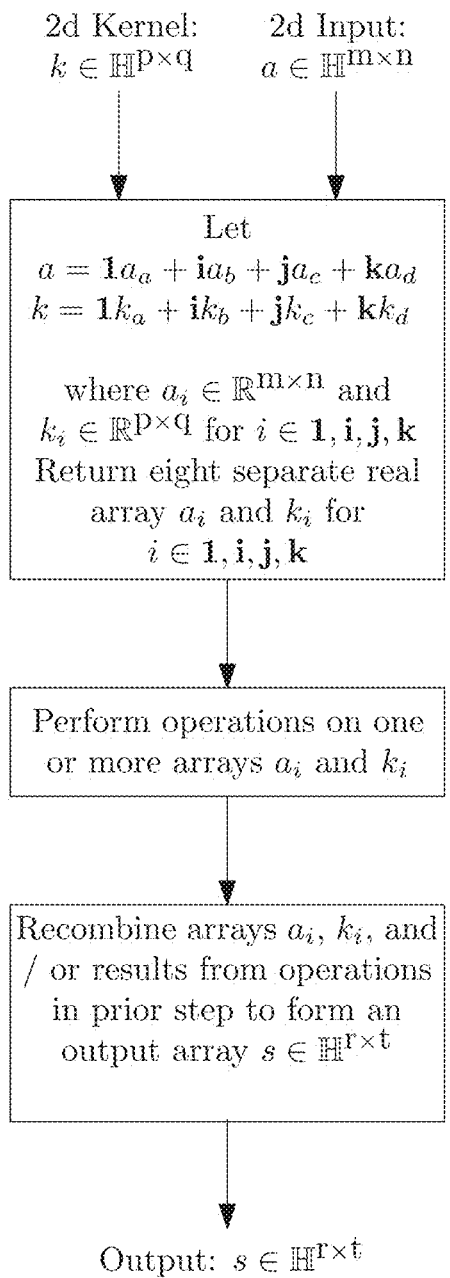
FIG. 3 depicts a flowchart representing hypercomplex convolution.

A quaternion example of hypercomplex convolution is pictured in FIG. 3, where a hypercomplex kernel $k \in \mathbb{H}^{p \times q}$ is convolved with a hypercomplex input $a \in \mathbb{H}^{m \times n}$. The process for convolution is to extract the real-valued coefficients from k and a, perform some set of operations on the coefficients, and to finally recombine the coefficients into an output $s \in \mathbb{H}^{r \times t}$.

Figure 4:
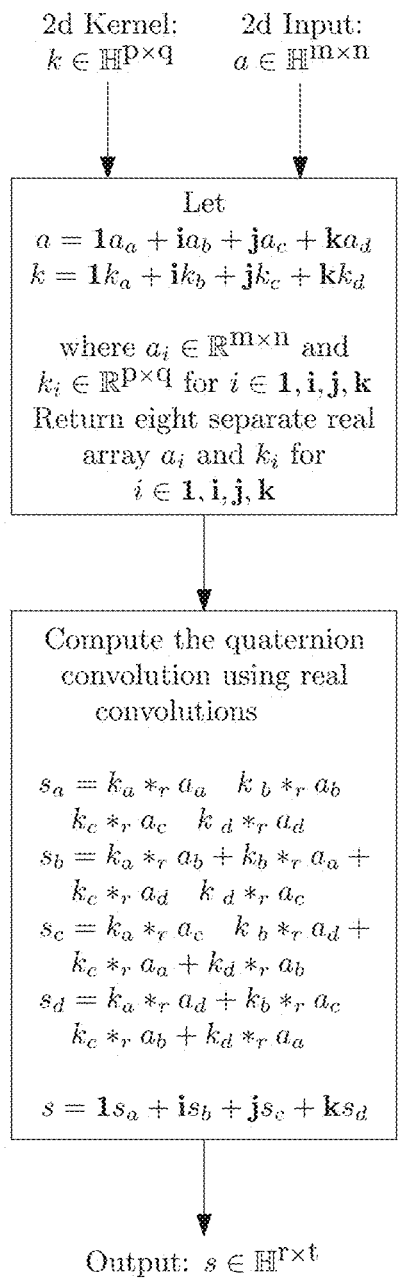
FIG. 4 depicts a flowchart representing quaternion convolution using sixteen real convolution operations.

A specific example of the approach described above is shown in FIG. 4. It should be noted that, by the distributive property, the product of two quaternion numbers $q_0 \in \mathbb{H}$ and $q_1 \in \mathbb{H}$ is:

$$q_0 q_1 = (a_0 + b_0 i + c_0 j + d_0 k)(a_1 + b_1 i + c_1 j + d_1 k) = \quad 2$$
$$a_0 a_1 - b_0 b_1 - c_0 c_1 - d_0 d_1 + (a_0 b_1 + b_0 a_1 + c_0 d_1 - d_0 c_1)i +$$
$$(a_0 c_1 - b_0 d_1 + c_0 a_1 + d_0 b_1)j + (a_0 d_1 + b_0 c_1 - c_0 b_1 + d_0 a_1)k$$

Because convolution is a linear operator, the multiplication in Equation 2 may be replaced by the convolution operator of Equation 1. Correspondingly, a convolution algorithm to compute $s(x,y) = k(x,y) * a(x,y)$ for quaternion matrices is shown in Equation 3:

$$k(x,y) * a(x,y) = (a_k(x,y) + b_k(x,y)i + c_k(x,y)j + d_k(x,y)k) *_h$$
$$(a_a(x,y) + b_a(x,y)i + c_a(x,y)j + d_a(x,y)k) =$$
$$a_k(x,y) *_r a_a(x,y) - b_k(x,y) *_r b_a(x,y) - c_k(x,y) *_r c_a(x,y) -$$
$$d_k(x,y) *_r d_a(x,y) + \begin{pmatrix} a_k(x,y) *_r b_a(x,y) + b_k(x,y) *_r a_a(x,y) + \\ c_k(x,y) *_r d_a(x,y) - d_k(x,y) *_r c_{a(x,y)} \end{pmatrix} i +$$
$$\begin{pmatrix} a_k(x,y) *_r c_a(x,y) - b_k(x,y) *_r d_a(x,y) + \\ c_k(x,y) *_r a_a(x,y) + d_k(x,y) *_r b_a(x,y) \end{pmatrix} j +$$
$$\begin{pmatrix} a_k(x,y) *_r d_a(x,y) + b_k(x,y) *_r c_a(x,y) - \\ c_k(x,y) *_r b_a(x,y) + d_k(x,y) *_r a_a(x,y) \end{pmatrix} k, \quad 3$$

where $*_h$ denotes quaternion convolution, $*_r$ denotes real-valued convolution, and (x,y) are the 2d array indices.

Figure 5:
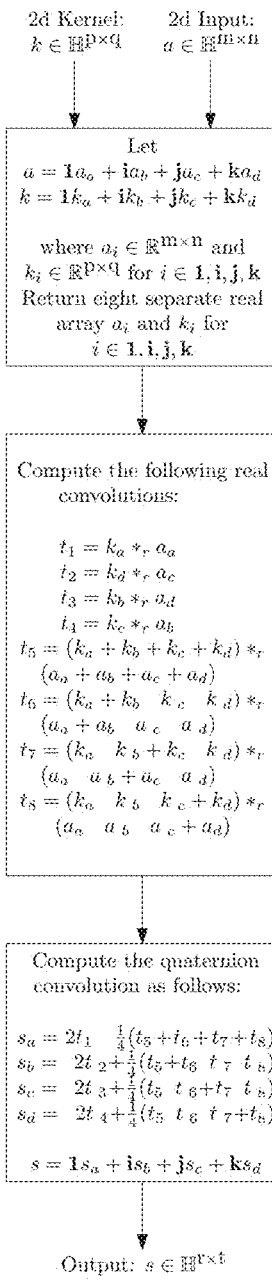
FIG. 5 depicts a flowchart representing quaternion convolution using eight real convolution operations.

One may observe the Equation 3 requires sixteen real-valued convolution operations to perform a single quaternion convolution. However, due to the linearity of convolution, high-speed techniques for quaternion multiplication may also be applied to the convolution operation. For example, FIG. 5 outlines a quaternion convolution algorithm that only requires eight real-valued convolution operations to perform the same mathematical operation as is shown in Equation 3. The eight-real-multiply convolution takes inputs $k(x,y) = a_k(x,y) + b_{k(x,y)}i + c_{k(x,y)}j + d_k(x,y)k$ and $a(x,y) = a_a(x,y) + b_a(x,y)i + c_a(x,y)j + d_a(x,y)k$, as in Equation 3. However, rather than computing the convolution directly, the following intermediate variables are computed as a first step:

$$t_1(x,y) = a_k(x,y) *_r a_s(x,y)$$

$$t_2(x,y) = d_k(x,y) *_r (x,y)$$

$$t_3(x,y) = b_k(x,y) *_r d_a(x,y)$$

$$t_4(x,y) = c_k(x,y) *_r b_a(x,y)$$

$$t_5(x,y) = (a_k(x,y) + b_k(x,y) + c_k(x,y) + d_k(x,y)) *_r (a_a(x,y) + b_a(x,y) + c_a(x,y) + d_a(x,y))$$

$$t_6(x,y) = (a_k(x,y) + b_k(x,y) - c_k(x,y) - d_k(x,y)) *_r (a_a(x,y) + b_a(x,y) - c_a(x,y) - d_a(x,y))$$

$$t_7(x,y) = (a_k(x,y) - b_k(x,y) + c_k(x,y) - d_k(x,y)) *_r (a_a(x,y) - b_a(x,y) + c_a(x,y) - d_a(x,y))$$

$$t_8(x,y) = (a_k(x,y) - b_k(x,y) - c_k(x,y) + d_k(x,y)) *_r (a_a(x,y) - b_a(x,y) - c_a(x,y) + d_a(x,y)) \quad 4$$

In Equation 4, $*_r$ represents a real-valued convolution; one will observe that there are eight real-valued convolutions.

To complete the quaternion convolution s(x,y), the temporary terms $t_i$ are scaled and summed as shown in Equation 5:

$$a_s(x, y) = 2t_1 - \frac{1}{4}(t_5 + t_6 + t_7 + t_8) \quad 5$$

$$b_s(x, y) = -2t_1 + \frac{1}{4}(t_5 + t_6 - t_7 - t_8)$$

$$c_s(x, y) = -2t_1 + \frac{1}{4}(t_5 - t_6 + t_7 - t_8)$$

$$d_s(x, y) = -2t_1 + \frac{1}{4}(t_5 - t_6 - t_7 + t_8)$$

$$s(x, y) = a_s(x, y) + b_s(x, y)i + c_s(x, y)j + d_s(x, y)k$$

1.3 Octonion Convolution

Octonions represent another example of hypercomplex numbers. Octonion convolution may be performed using quaternion convolution as outlined presently:

Let $o_n \in \mathbb{O}$:

$$o_n = w_0 o_{0n} + e_1 o_{1n} + e_2 o_{2n} + e_3 o_{3n} + e_4 o_{4n} + e_5 o_{5n} + e_6 o_{6n} + e_7 o_{7n} \quad\quad 6$$

To convolve octonions $o_a{}^*{}_o o_b$, first represent each argument as a pair of quaternions, resulting in w, x, y, z $\in \mathbb{H}$:

$$w = 1 o_{0a} + i o_{1a} + j o_{2a} + k o_{3a}$$

$$x = 1 o_{4a} + i o_{5a} + j o_{6a} + k o_{7a}$$

$$y = 1 o_{0b} + i o_{1b} + j o_{2b} + k o_{3b}$$

$$z = 1 o_{4b} + i o_{5b} + j o_{6b} + k o_{7b} \quad\quad 7$$

Next, perform quaternion convolution, for example, as described in Section 1.2:

$$s_L = w *_h y - z *_h x^*$$

$$s_R = w *_h z - y *_h x \quad\quad 8$$

where a superscript * denotes quaternion conjugation and $*_h$ denotes quaternion convolution.

Finally, recombine $s_L$ and $s_R$ to form the final result $s = o_a{}^*{}_o o_b \in \mathbb{O}$:

$$s_L = 1 a_L + i b_L + j c_L + k d_L$$

$$s_R = 1 a_R + i b_R + j c_R + k d_R$$

$$s = e_0 a_L + e_1 b_L + e_2 c_L + e_3 d_L + e_4 a_R + e_5 b_R + e_6 c_R + e_7 d_R \quad\quad 9$$

Figure 6:
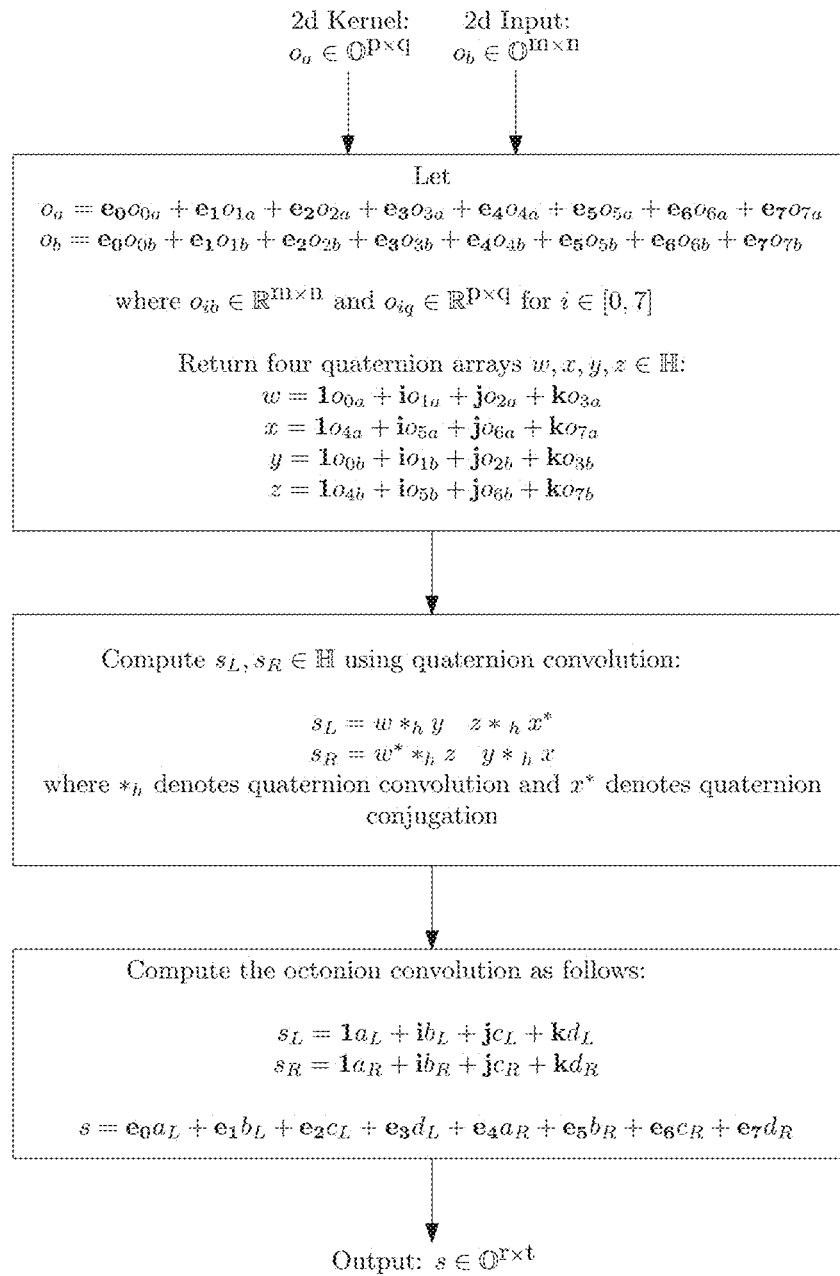
FIG. 6 depicts a flowchart representing octonion convolution.

The exemplary process of octonion convolution described above is shown in FIG. 6.

1.4 Quaternion Convolution for Neural Networks

Sections 1.2 and 1.3 describe an examples of hypercomplex convolution of two-dimensional arrays. The techniques described above may be employed in multi-dimensional convolution that is typically used for neural network tasks.

Figure 7:
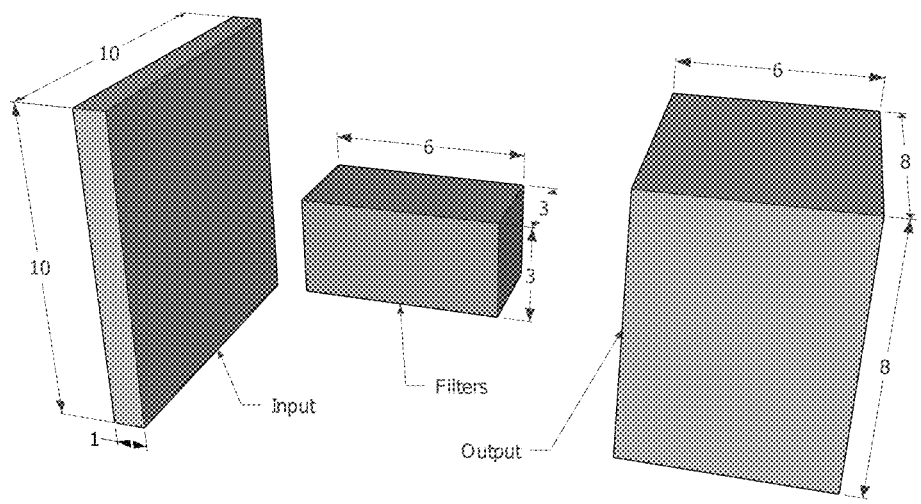
FIG. 7 depicts a visualization of a multi-dimensional convolution operation.

For example, FIG. 7 shows a typical multi-dimensional convolution: An input pattern that is a 10×10 array of depth 1 has six two-dimensional convolutional filters applied to it. The convolutional filter kernels are each 3×3 arrays. When performing a convolution where all output points are computed using valid data input values (i.e. no zero padding, sampling stride of 1 in each dimension), the convolution of a single 3×3 array with a single 10×10 results in a single array of shape 8×8. Since the convolution depicted in FIG. 7 has 6 convolution kernels that are stacked into a 3-dimensional convolution kernel, the final output is of shape 8×8×6, where each one of the six depth locations represents the output of a complete two-dimensional convolution as described in the prior section. This is discussed further below in Section 2.1.

The approach described above may also be extended to input arrays with a depth of larger than 1, thereby causing the filter kernel to become 4-dimensional. Conceptually, a loop over the input and output dimensions may be performed. The inside of the loop contains two-dimensional convolutions as described in the prior section. Note further that each two-dimensional convolution takes input values from all depth levels of the input array. If, for example, the 10×10 input array had an input depth of two, then each convolution kernel would have 3×3×2 weights, rather than 3×3 weights as described above. Therefore, the typical shape of a 4-dimensional hypercomplex convolution kernel is ($D_o$, $D_i$, $K_x$, $K_y$), where $D_o$ represents the output depth, $D_i$ represents the input depth, and $K_x$ and $K_y$ are the 2d filter kernel dimensions. Finally, in the present hypercomplex example of quaternions, all of the data points above are quaternion values and all convolutions are quaternion in nature. As will be discussed in the implementation sections below, existing computer software libraries typically do not support quaternion arithmetic. Therefore, an additional dimension may be added in software to represent the four components (1, i, j, k) of a quaternion.

1.5 Locally-Connected Layers

The convolutions described thus far are sums of local, weighted windows of the input, where the filter kernel represents a set of shared weights for all window locations. Rather than using shared weights in a filter kernel, a separate set of weights may be used for each window location. In this case, one has a locally-connected hypercomplex layer, rather than a convolutional hypercomplex layer.

1.6 Hypercomplex Polar Form Conversion

The exemplary quaternion conversion to and from polar (angular) form is defined presently. Let a single quaternion value output from the convolution step be denoted as $s \in \mathbb{H}$:

$$s = a + bi + cj + dk \quad\quad 10$$

The polar conversion representation is shown in Equation 11:

$$s = |s| e^{i\phi} e^{j\theta} e^{k\psi} \quad\quad 11$$

where $s_p \in \mathbb{H}$ represents a single quaternion number and ($\phi$, $\theta$, $\psi$) represent the quaternion phase angles. Note that a term to represent the norm of the quaternion, $|s|$ is intentionally set to one during the polar conversion.

The angles ($\phi$, $\theta$, $\psi$) are calculated as shown in Equation 12:

$$\psi = -\frac{\sin^{-1}(2bc - 2ad)}{2} \quad\quad 12$$

If $\psi \in \left\{+\frac{\pi}{4}, -\frac{\pi}{4}\right\}$:

$$\phi = \frac{1}{2}\tan2^{-1}\left(2(cd + ab), a^2 - b^2 - c^2 + d^2\right)$$

$$\theta = 0$$

Else:

$$\phi = \frac{1}{2}\tan2^{-1}\left(2(cd + ab), a^2 - b^2 + c^2 - d^2\right)$$

$$\theta = \frac{1}{2}\tan2^{-1}\left(2(bd + ac), a^2 + b^2 - c^2 - d^2\right)$$

The definition of $\tan 2^{-1}(x,y)$ is given in Equation 13:

$$\tan2^{-1}(x, y) = \begin{cases} \tan^{-1}\left(\frac{x}{y}\right) & \text{if } x > 0. \\ \tan^{-1}\left(\frac{x}{y}\right) + \pi & \text{if } y \geq 0, x < 0. \\ \tan^{-1}\left(\frac{x}{y}\right) - \pi & \text{if } y < 0, x < 0. \\ \frac{\pi}{2} & \text{if } y > 0, x = 0. \\ -\frac{\pi}{2} & \text{if } y < 0, x = 0. \\ \text{undefined,} & \text{if } y = 0, x = 0. \end{cases} \quad\quad 13$$

Most software implementations of Equation 13 return zero for the case of x=0, y=0, rather than returning an error or a Not a Number (NaN) value.

Finally, to convert the quaternion polar form in Equation 11 to the standard form of Equation 10, one applies Euler's formula as shown in Equation 14:

$$s_u = 1(\cos(\phi)\cos(\psi)\cos(\theta) + \sin(\phi)\sin(\psi)\sin(\theta)) + \quad 14$$
$$i(\sin(\phi)\cos(\psi)\cos(\theta) - \cos(\phi)\sin(\psi)\sin(\theta)) +$$
$$j(\cos(\phi)\cos(\psi)\sin(\theta) - \sin(\phi)\sin(\psi)\sin(\theta)) +$$
$$k(\cos(\phi)\sin(\psi)\cos(\theta) + \sin(\phi)\cos(\psi)\sin(\theta))$$

In Equation 14, $s_u \in \mathbb{H}$ has the "u" subscript because it is the unit-norm version of our original variable $s \in \mathbb{H}$. Not restricting $|s|$ to 1 in Equation 10 would result in $s_u = s$.

1.7 Activation Function Angle Quantization

Figure 8:
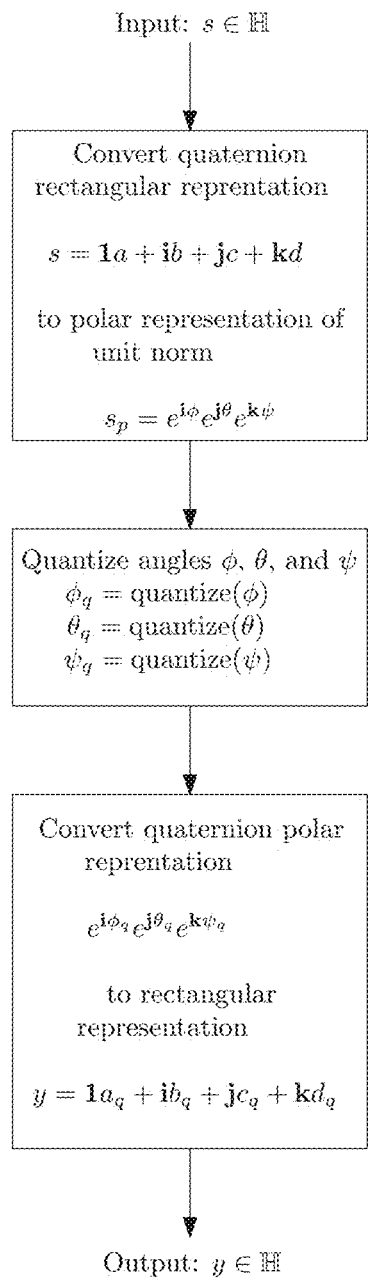
FIG. 8 depicts a flowchart representing quaternion angle quantization.
Figure 9:
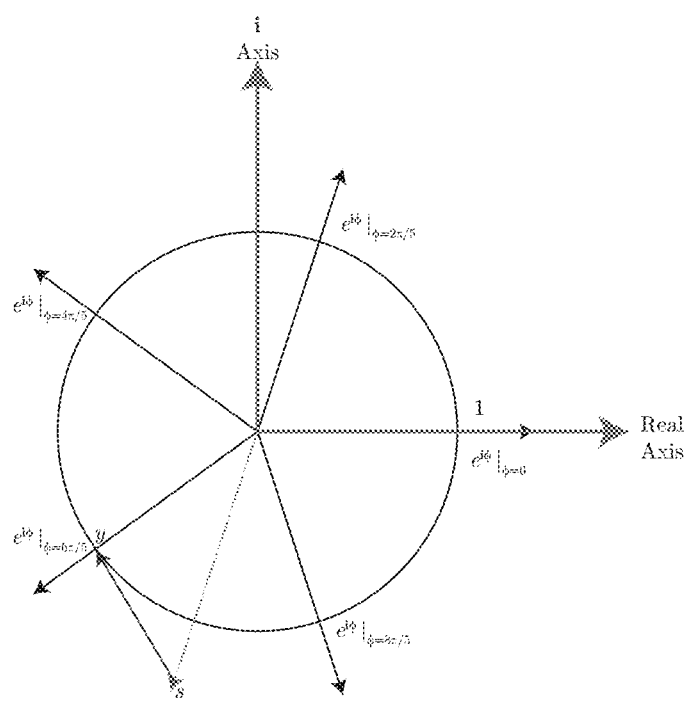
FIG. 9 depicts a schematic diagram of an angle quantization: phi.
Figure 10:
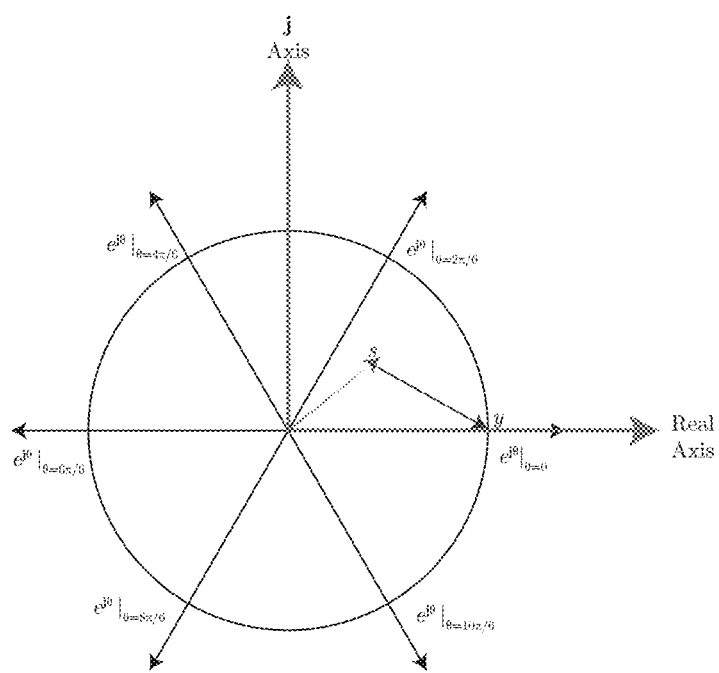
FIG. 10 depicts a schematic diagram of an angle quantization: theta.
Figure 11:
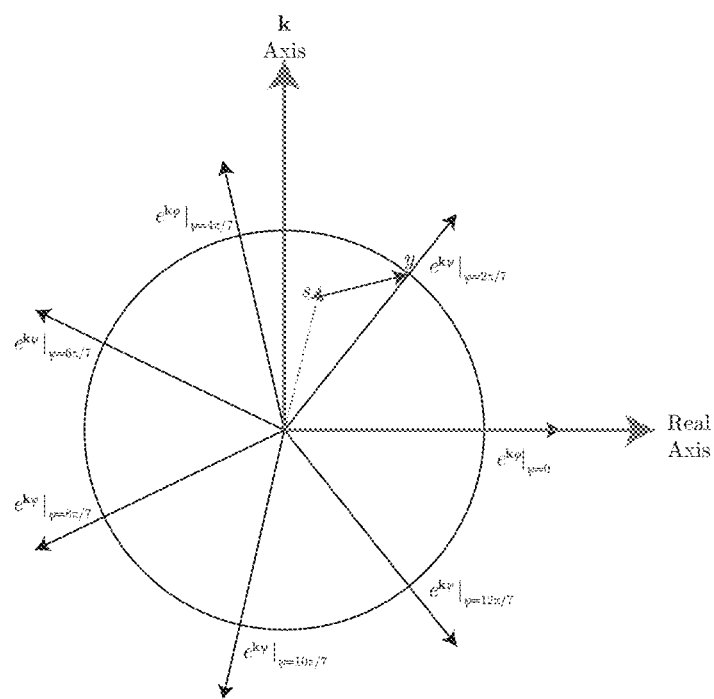
FIG. 11 depicts a schematic diagram of an angle quantization: psi.
Figure 12:
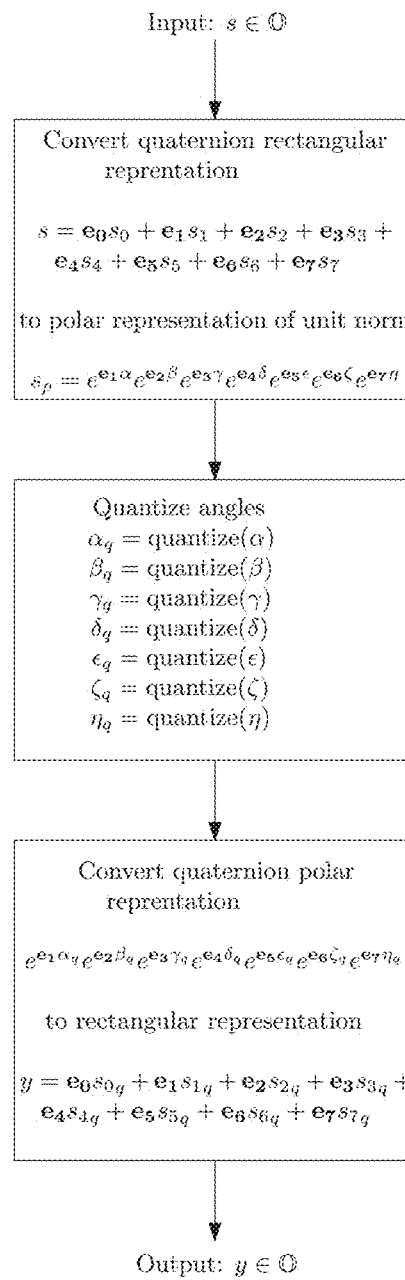
FIG. 12 depicts a flowchart representing an angle quantization example: octonion.

FIG. 8 shows a quaternion example of a hypercomplex layer activation function. The exemplary hypercomplex activation function converts a quaternion input $s \in \mathbb{H}$ to polar form using Equation 12 to produce a set of angles ($\phi$, $\theta$, $\psi$). These angles are then quantized using a set of pre-determined output values. Each angle is associated with a unique set of output angles, and those sets may or may not be equal. Examples of differing output angle sets are shown in FIG. 9, FIG. 10, and FIG. 11 where input vectors (dotted line, red) s are mapped to output locations y. In these diagrams, the output values are placed on the unit circle; however, this need not be the case and is shown merely as an example of the quantization process. FIG. 12 shows an additional hypercomplex example activation function that employs octonions rather than quaternions.

The quantization process described above creates a set of three new angles, ($\phi_p$, $\theta_p$, $\psi_p$), as shown in FIG. 8. The final step is to apply Equation 14 to these angles, resulting in the final activation function output y E H.

1.8 Hypercomplex Layer Learning Rule

A learning rule for a single hypercomplex neuron is described presently. A layer of hypercomplex neurons is merely a collection of hypercomplex neurons that run in parallel, therefore the same learning rule applies to all neurons independently. The output of each neuron forms a single output of a hypercomplex layer. This learning rule is an example of the quaternion case and is not meant to limit the scope of the claims in this document.

Stochastic gradient descent has gained popularity in the machine learning community for training real-valued neural network layers. However, because the activation function described Section 1.7 and shown in FIG. 8 does not have a continuous output, is non-differentiable and therefore cannot be used with gradient descent methods. Accordingly, an error-correction methodology is introduced here for neural network layer training. As with stochastic gradient descent, we assume that the neural weights are initialized randomly.

A typical error correction weight update rule for a fully-connected neural network layer is shown in Equation 15:

$$w_i^{(k+1)} = w_i^{(k)} + \mu \cdot \delta_i \cdot \overline{x}_i \quad 15$$

Equation 15 represents training cycle k of a neuron, where $x_i$ is the input value to the weight, $\delta_i$ is the related to the current training error, $\mu$ is the learning rate, $w_i^{(k)}$ is the current value of the weight, $w_i^{(k+1)}$ is the updated value of the weight, and i is the index of all the weights for the neuron.

To extend the fully-connected error correction rule in Equation 15 to convolutional layers, the multiplication between $\delta_i$ and $\overline{x}_i$ will be replaced by a quaternion convolution. However, before performing this replacement, the values of $\delta_i \forall i$ must be derived.

Returning to the fully-connected example, the goal of training a neuron is to have its output, $y^{(k+1)}$ equal some desired response value of d$\in \mathbb{H}$. Solving for $\delta_i$:

$$d = y^{(k+1)} \quad 16$$
$$= X^T \cdot W^{(k+1)}$$
$$= \sum_i x_i \cdot w_i^{(k+1)}$$
$$= \sum_i x_i \cdot \left(w_i^{(k)} + \delta_i \cdot \overline{x}_i\right)$$
$$= \sum_i x_i \cdot w_i^{(k)} + x_i \cdot \delta_i \cdot \overline{x}_i$$
$$= \sum_i x_i \cdot w_i^{(k)} + \delta_i$$
$$= \sum_i x_i \cdot w_i^{(k)} + \sum_i \delta_i$$
$$= y^{(k)} + \sum_i \delta_i$$

Note that Equation 16 employs the relationship:
$$\sqrt{x \cdot \overline{x}} = \sqrt{\overline{x} \cdot x} = \|x\| \text{ for } x \in \mathbb{C}, \mathbb{H}, \text{ or } \mathbb{O} \quad 17$$

where $\|x\|$ is the 2-norm of x and $\overline{x}$ is the quaternion conjugate of x.

Further note that the norm of each input is assumed to equal one, as the norm of the output from the activation function in Sections 1.6 and 1.7 is equal to one. This is not a restriction of the algorithm, as weight updates in the learning algorithm (discussed in Sections 1.8 and 1.9) may be scaled to account for non-unit-norm inputs, and/or inputs may be scaled to unit norm. Equation 15 clearly has more unknowns than variables and therefore does not have a solution. Accordingly, the authors assume without proof that each neural weight shares equal responsibility for the final error, and that all of the $\delta_i$ variable should equal one another. This leads to the following weight update rule, assuming that there are n weights:

$$w_i^{(k+1)} = w_i^{(k)} + \frac{\mu}{n} \cdot \left(d - y^{(k)}\right) \cdot \overline{x}_i \quad 18$$

In equation 18, k represents the current training cycle, $x_i$ is the input value to the weight, n is the number of neurons, $\mu$ is the learning rate, $w_i^{(k)}$ is the current value of the weight, $w_i^{(k+1)}$ is the updated value of the weight, and i is the index of all the weights for the neuron.

Extending this approach to convolution and multiple neurons, the new weight update rule is:

$$W^{(k+1)} = W^{(k)} + \frac{\mu}{n} \cdot \left(D - Y^{(k)}\right) * \overline{X}_i, \quad 19$$

where $W^{(k+1)}$ is the updated weight array, $W^{(k)}$ is the current weight array, n is the number of neurons, $\mu$ is the learning rate, D is the desired response vector, $Y^{(k)}$ is the current response vector, * represents quaternion convolution, and $\overline{X}_i$ is the quaternion conjugate of the input.

1.9 Hypercomplex Error Propagation

This section provides an example of error propagation between hypercomplex layers to enable learning in multilayer graph structures. This particular example continues the quaternion example of Section 1.8. Following the approach in Section 1.8, the multi-layer learning rule will be derived using a fully-connected network, and then, by linearity of convolution, the appropriate hypercomplex multiplication will be converted into a quaternion convolution operation.

Figure 13:
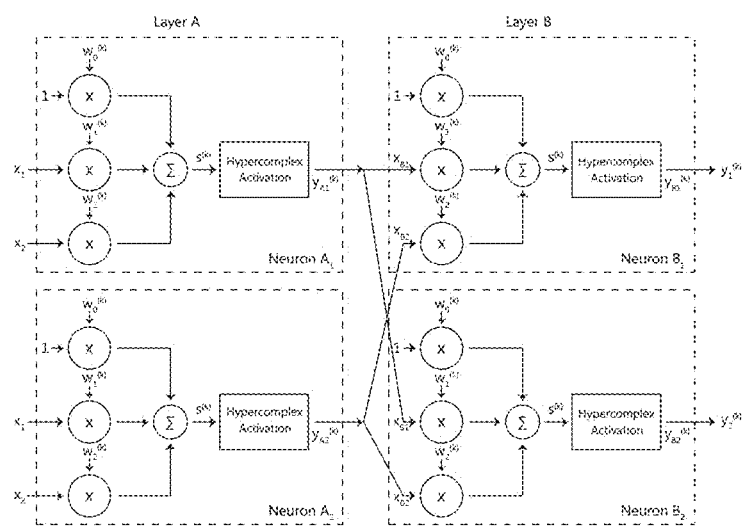
FIG. 13 depicts a schematic diagram of hypercomplex error correction learning: error propagation.

FIG. 13 shows an example of a two-layer, fully-connected neural network, with each layer containing two neurons. Layer A is on the left hand side and Layer B is on the right hand side of the figure. This particular example includes neural inputs that are of constant value 1 and are referred to as "bias weights."

As described in Section 1.8, the neurons each use an error correction rule for learning and, consequently, cannot be used with the gradient descent learning methods that are popular in existing machine learning literature.

Following the approach in Section 1.8, we set the output of the neural network equal to the desired response d and solve for the error terms $\delta_i$:

$$d = y^{(k+1)}$$ (20)
$$= X_B^T \cdot W_B^{(k+1)}$$
$$= w_{B_0}^{(k)} + \sum_i x_{B_i}^{(k+1)} \cdot w_{B_i}^{(k+1)}$$
$$= w_{B_0}^{(k)} + \delta_{B_0} + \sum_{i=1}^{n-1} x_{B_i}^{(k+1)} \cdot \left(w_{B_i}^{(k)} + \delta_{B_i} \overline{x_{B_i}}\right)$$
$$= w_{B_0}^{(k)} + \delta_{B_0} + \sum_{i=1}^{n-1} x_{B_i}^{(k+1)} \cdot w_{B_i}^{(k)} + \delta_{B_i}$$
$$= w_{B_0}^{(k)} + \delta_{B_0} + \sum_{i=1}^{n-1} \delta_{B_i} + \sum_{i=1}^{n-1} x_{B_i}^{(k+1)} \cdot w_{B_i}^{(k)}$$
$$= w_{B_0}^{(k)} + \sum_{i=0}^{n-1} \delta_{B_i} + \sum_{i=1}^{n-1} x_{B_i}^{(k+1)} \cdot w_{B_i}^{(k)}$$
$$= w_{B_0}^{(k)} + \sum_{i=0}^{n-1} \delta_{B_i} + \sum_{i=1}^{n-1} \left(\sum_{j=0}^{m-1} x_{A_j} \cdot w_{A_j}^{(k+1)}\right) \cdot w_{B_i}^{(k)}$$
$$= w_{B_0}^{(k)} + \sum_{i=0}^{n-1} \delta_{B_i} + \sum_{i=1}^{n-1} \left(\sum_{j=0}^{m-1} x_{A_j} \cdot \left(w_{A_j}^{(k)} + \delta_{A_j} \overline{x_{A_j}}\right)\right) \cdot w_{B_i}^{(k)}$$
$$= w_{B_0}^{(k)} + \sum_{i=0}^{n-1} \delta_{B_i} + \sum_{i=1}^{n-1} \left(\sum_{j=0}^{m-1} x_{A_j} \cdot w_{A_j}^{(k)} + \delta_{A_j}\right) \cdot w_{B_i}^{(k)}$$
$$= w_{B_0}^{(k)} + \sum_{i=0}^{n-1} \delta_{B_i} + \sum_{i=1}^{n-1} w_{B_i}^{(k)} \sum_{j=0}^{m-1} x_{A_j} \cdot w_{A_j}^{(k)} + \sum_{i=1}^{n-1} w_{B_i}^{(k)} \sum_{j=0}^{m-1} \delta_{A_j}$$
$$= y_B^{(k)} + \sum_{i=0}^{n-1} \delta_{B_i} + \sum_{i=0}^{n-1} \sum_{j=0}^{m-1} w_{B_i}^{(k)} \delta_{A_j}$$

Solving for the training error in terms of $\delta_{A_j}$ and $\delta_{B_i}$:

$$d - y^{(k)} = \sum_{i=0}^{n-1} \delta_{B_i} + \sum_{i=0}^{n-1} \sum_{j=0}^{m-1} w_{B_i}^{(k)} \delta_{A_j}$$ (21)

As in the single-neuron case, there is more than one solution to Equation 21. In order to resolve this problem, the assumption is that each neural network layer contributes equally to the final network output error, implying:

$$\sum_{i=0}^{n-1} \delta_{B_i} = \sum_{i=0}^{n-1} \sum_{j=0}^{m-1} w_{B_i}^{(k)} \delta_{A_j}$$ (22)

Accordingly, errors are propagated through the graph (or network) by scaling the errors by the hypercomplex multiplicative inverse of the connecting weights.

To propagate the error from the output of a layer to its inputs:

$$e_{l-1} = \frac{1}{N_{l-1}} \cdot \left[w_l^{(k)-1}\right]^T \cdot e_l,$$ (23)

where $e_l$ represents the error at the current layer (or the network error at the output layer), $[w_l^{(k)-1}]^T$ is the transposed hypercomplex elementwise inverse of the current layer's weights at training cycle (k), $N_{l-1}$ is the number of inputs to the l–1st layer, and $e_{l-1}$ is the new error term for the l–1st layer. In Equation 23, the layers are arranged from l ∈ [0,L], with the Lth layer corresponding to the output layer and the 0th layer corresponding to the input layer. The error terms $e_l$ are computed from output to input, therefore propagating the error backward through the network.

Once the error terms $e_l$ have been computed, the weight update is similar to the single-layer case of Section 1.8:

$$W_l^{(k+1)} = W_l^{(k)} + \frac{\mu}{n} \cdot e_l^{(k)} *_h \overline{X}_{l-1},$$ (24)

where n represents the number of neurons in layer l, and $*_h$ represents hypercomplex convolution.

For inputs that are not of unit-norm, Equation 24 may be modified to scale the weight updates:

$$W_l^{(k+1)} = W_l^{(k)} + \frac{\mu}{n} \cdot e_l^{(k)} *_h \left[X_{l-1}^{-1}\right]^T$$ (25)

Figure 14:
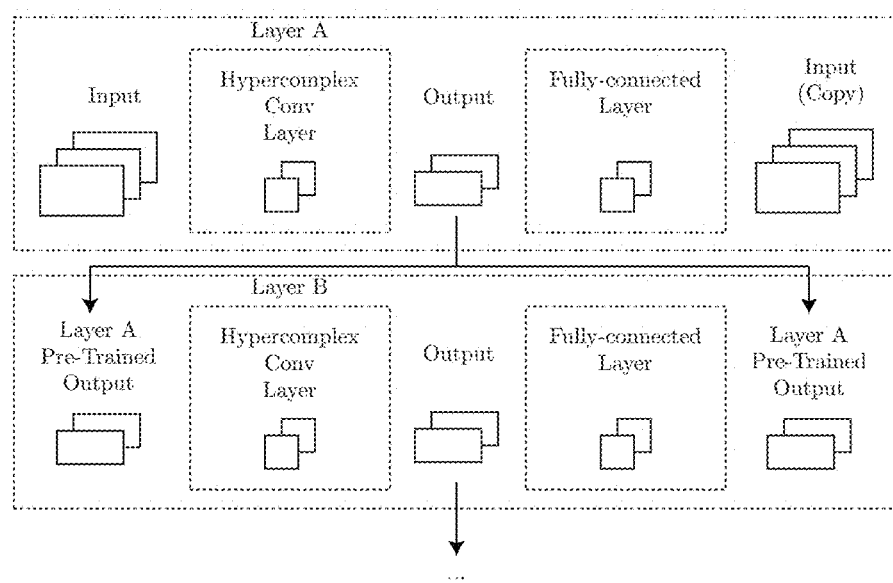
FIG. 14 depicts a schematic diagram of hypercomplex convolutional layer pretraining.

1.10 Unsupervised Learning for Hypercomplex Layer Pre-Training and Deep Belief Networks The hypercomplex learning algorithms of Sections 1.8 and 1.9 both presume that the initial weights for each layer are selected randomly. However, this need not be the case. For example, FIG. 14 shows an exemplary pre-training method.

Suppose there is a multi-layer hypercomplex neural network in which the input layer is "Layer A", the first hidden layer is "Layer B", the next layer is "Layer C", and so on. Unsupervised learning of Layer A may be performed by removing it from the network, attaching a fully-connected layer, and training the new structure as an autoencoder, which means that the desired response is equal to the input. A diagram of an exemplary hypercomplex autoencoder has been drawn in FIG. 14. Once the autoencoder is finished training, the output of Layer A will be a sparse representation of the input data, and therefore is likely to be a useful representation for the final task of the original multi-layer hypercomplex network.

One may use the pre-trained output from Layer A to pre-train Layer B in the same manner. This is shown in the lower half of FIG. 14.

Once pre-training of all layers is complete, the hypercomplex weight settings of each layer may be copied to the original multi-layer network, and fine-tuning of the weight parameters may be performed using any appropriate learning algorithm, such as those developed in Sections 1.8 and 1.9.

This approach is superior to starting with random weights and propagating errors for two reasons: First, it allows one to use large quantities of unlabeled data for the initial pre-training, thereby expanding the universe of useful training data; and, second, since weight adjustment through multi-layer error propagation takes many training cycles, the pre-training procedure significantly reduces overall training time by reducing the workload for the error propagation algorithm.

Moreover, the autoencoders described above may be replaced by any other unsupervised learning method, for example, restricted Boltzmann machines (RBMs). Applying contrastive divergence to each layer, from the lowest to the highest, results in a hypercomplex deep belief network.

1.11 Hypercomplex Layer Pre-Training Using Expert Features

Historically, multi-layer perceptron (MLP) neural network classification systems involve the following steps: Input data, such as images, are converted to a set of features, for example, local binary patterns. Each feature, which, for example, takes the form of a real number, is stacked into a feature vector that is associated with a particular input pattern. Once the feature vector for each input pattern is computed, the feature vectors and system desired response (e.g. classification) values are presented to a fully-connected MLP neural network for training. Many have observed that overall system performance is highly dependent upon the selection of features, and therefore domain experts have spent extensive time engineering features for these systems.

Figure 15:
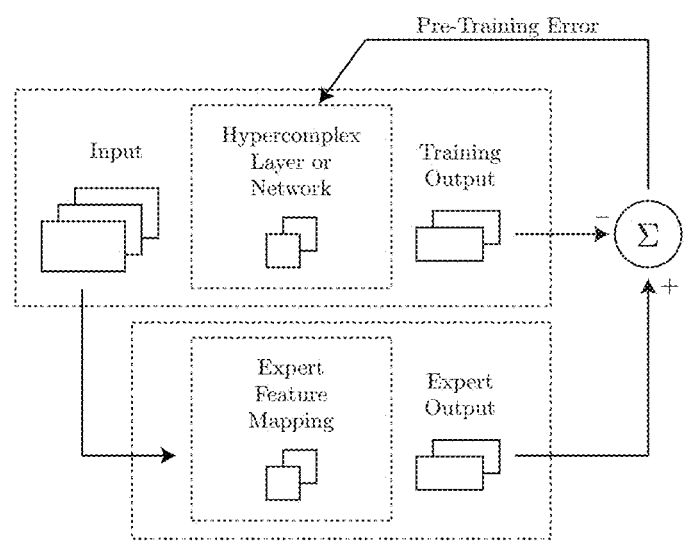
FIG. 15 depicts a schematic diagram of hypercomplex pretraining using expert system features.

One may think of hypercomplex convolutional networks as a way to algorithmically learn hypercomplex features. However, it may be desirable to incorporate expert features into the system as well. An exemplary method for this is shown in FIG. 15 where a neural network layer or layers is pre-trained using the output from one or more expert features as the desired response. Note that one would typically use this method with a subset of layers, for example, the hypercomplex convolutional layers, of a larger hypercomplex graph.

As with the unsupervised pre-training method described in Section 1.10, the hypercomplex layer or layer is pre-trained and then its weights are copied back to the original hypercomplex graph. Learning rules, for example those of Sections 1.8 and 1.9, may then be applied to the entire graph to fine tune the weights.

Using this method, one can start with feature mappings defined by domain experts and then improve the mappings further with hypercomplex learning techniques. Advantages include use of domain-expert knowledge and reduced training time.

1.12 Hypercomplex Transfer Learning

Deep learning algorithms perform well in systems where an abundance of training data is available for use in the learning process. However, many applications do not have an abundance of data; for example, many medical classification tasks do not have large databases of labeled images. One solution to this problem is transfer learning, where other data sets and prediction tasks are used to expand the trained knowledge of the hypercomplex neural network or graph.

Figure 16:
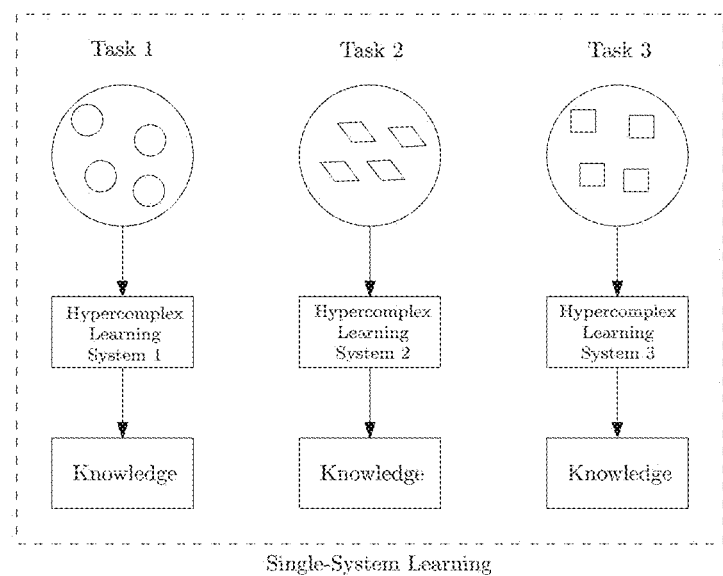
FIG. 16 depicts a schematic diagram of hypercomplex transfer learning.
Figure 16:
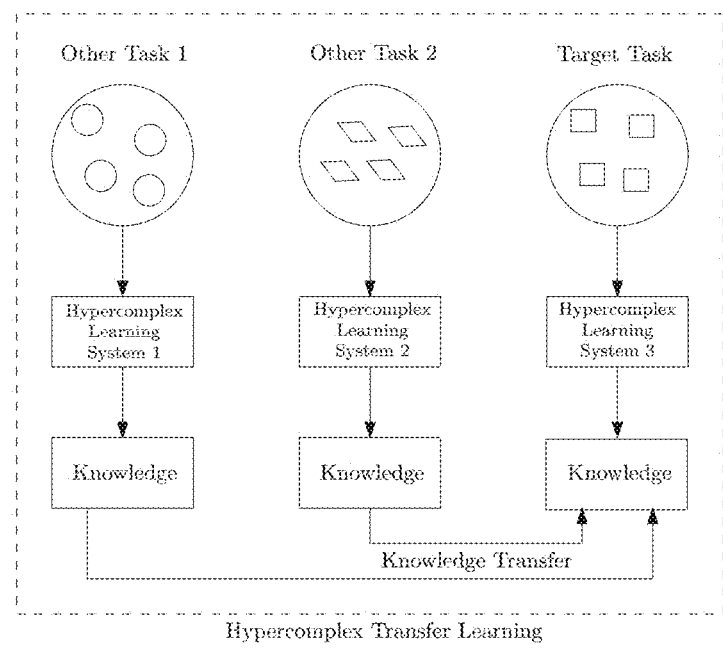

An illustration of transfer learning is shown in FIG. 16. The top half of the figure shows traditional learning systems, where each system is trained to perform a single task and creates a set of knowledge. In the context of hypercomplex networks, the knowledge would correspond with the weight settings for each layer. The bottom half of FIG. 16 shows transfer learning, where each of the "other systems" is trained separately on various tasks, and then the knowledge is integrated into the trained knowledge of the target system in which we are interested.

There are numerous ways of performing the knowledge transfer, though methods will generally seek to represent the "other tasks" and target task in the same feature space through an adaptive (and possibly nonlinear) transform, e.g., using a hypercomplex neural network.

1.13 Hypercomplex Layer with State

Figure 17:
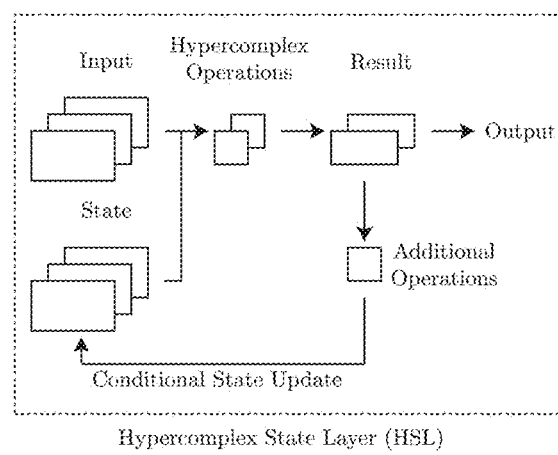
FIG. 17 depicts a schematic diagram of a hypercomplex layer with state—first example.

An exemplary neural network layer is discussed in 1.1 and shown in FIG. 1; this layer is a feedforward convolutional layer. Another important example is a neural network layer with state, which is shown in FIG. 17. This layer combines a hypercomplex input with an internal state, performs hypercomplex operations (for example, convolution), stores and outputs a result, optionally performs additional mathematical operations, and finally updates its internal state.

Figure 18:
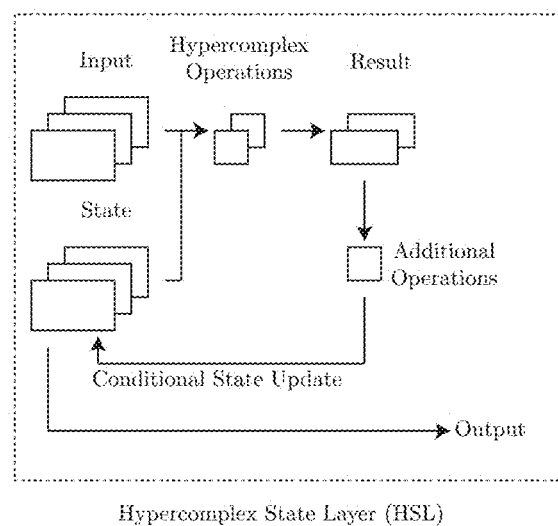
FIG. 18 depicts a schematic diagram of a hypercomplex layer with state—second example.

FIG. 18 shows another example of internal state, where the neuron output is a function of the state variable(s) directly rather than being computed at an intermediate step during processing.

1.14 Hypercomplex Tensor Layer

The hypercomplex tensor layer enables evaluation of whether or not hypercomplex vectors are in a particular relationship. An exemplary quaternion layer is defined in Equation 26.

$$y = g(a, R, b) = u_R^T \cdot f\left(a^T \cdot W_R^{[1:k]} \cdot b + V_R \cdot \begin{bmatrix} a \\ b \end{bmatrix} + b_R\right) \qquad 26$$

In Equation 26, $a \in \mathbb{H}^{d \times 1}$ and $b \in \mathbb{H}^{d \times 1}$ represent quaternion input vectors to be compared. There are k relationships R that may be established between a and b, and each relationship has its own hypercomplex weight array $W_R^{[i]} \in \mathbb{H}^{d \times d}$, where $1 \leq i \leq k$ (and $W_R^{[1:k]} \in \mathbb{H}^{d \times d \times k}$). The output of $a^T \cdot W_R^{[1:k]} \cdot b$ is computed by slicing $W_R^{[1:k]}$ for each value of $[1, k]$ and performing two-dimensional hypercomplex matrix multiplication. Furthermore, the hypercomplex weight array $V_R \in \mathbb{H}^{k \times 2d}$ that acts as a fully-connected layer. Finally, a set of hypercomplex bias weights $b_R \in \mathbb{H}^{k \times 1}$ may optionally be present.

The function f is the layer activation function and may, for example, be the hypercomplex angle quantization function of Section 1.7. Finally, the weight vector $u_R \in \mathbb{H}^{k \times 1}$ is transposed and multiplied to create the final output y E H. When an output vector in $\mathbb{H}^{k \times 1}$ is desired rather than a single quaternion number, the multiplication with $u_R^T$ may be omitted.

A major advantage to hypercomplex numbers in this layer structure is that hypercomplex multiplication is not commutative, which helps the learning structure understand that $g(a, R, b) \neq g(b, R, a)$. Since many relationships are nonsymmetrical, this is a useful property. For example, the relationship, "The branch is part of the tree," makes sense, whereas the reverse relationship, "The tree is part of the branch," does not make sense. Moreover, due to the hypercomplex nature of a and b, one can compare relationships between tuples rather than only single elements.

1.15 Hypercomplex Dropout

In order to prevent data overfitting, dropout operators are frequently found in neural networks. A real-valued dropout operator sets each element in a real-valued array to zero with some nonzero (but usually small) probability. Hypercomplex dropout operators may also be employed in hypercomplex networks, again to prevent data overfitting. However, in a hypercomplex dropout operator, if one of the hypercomplex components (e.g. (1, i, j, k) in the case of a quaternion) is set to zero, then all other components must also be zero to preserve inter-channel relationships within the hypercomplex value. If unit-norm output is desired or required, the real component may assigned a value of one and all other components may be assigned a value of zero.

1.16 Hypercomplex Pooling

It is frequently desirable to downsample data within a hypercomplex network using a hypercomplex pooling operation. An exemplary method for performing this operation is to take a series of local windows, apply a function to each window (e.g. maximum function), and finally represent the data using only the function's output for each window. In hypercomplex networks, the function will, for example, take arguments that involve all hypercomplex components and produce an output that preserves inter-channel hypercomplex relationships.

2 Exemplary Implementations of Hypercomplex Layer

A major difficulty in the practical application of learning systems is the computational complexity of the learning process. In particular, the convolution step described in Equation 1 typically cannot be computed efficiently via Fast Fourier Transform due to small filter kernel sizes. Accordingly, significant effort has been expended by academia and industry to optimize real-valued convolution for real-valued neural network graphs. However, no group has optimized hypercomplex convolution for these tasks, nor is there literature on hypercomplex deep learning. This section presents methods for adapting real-valued computational techniques to hypercomplex problems. The techniques in this section are critical to making the hypercomplex systems described in Section 1 practical for engineering use.

2.1 Convolution Implementations: GEMM

One approach to computing the hypercomplex convolution of Equation 1 is to write a set of for loops that shift the hypercomplex kernel to every appropriate position in the input image, perform a small set of multiplications and additions, and then continue to the next position. While such an approach would theoretically work, modern computer processors are optimized for large matrix-matrix multiplication operations, rather than multiplication between small sets of numbers. Correspondingly, the approach presented in this subsection reframes the hypercomplex convolution problem as a large hypercomplex multiplication, and then explains how to use highly-optimized, real-valued multiplication libraries to complete the computation. Examples of such real-valued multiplication libraries include: Intel's Math Kernel Library (MKL); Automatically Tuned Linear Algebra Software (ATLAS); and Nvidia's cuBLAS. All of these are implementations of a Basic Linear Algebra Subprograms (BLAS) library, and all provide matrix-matrix multiplication functionality through the GEMM function.

In order to demonstrate a hypercomplex neural network convolution, an example of the quaternion case is discussed presently. To aid the discussion, define the following variables:

$X$=inputs of shape$(G, D_i, 4, X_i, Y_i)$ $A$=filter kernel of shape$(D_o, D_i, 4, K_x, K_y)$ $S$=outputs of shape$(G, D_o, 4, X_o, Y_o)$ 27 where G is the number of data patterns in a processing batch, $D_i$ is the input depth, $D_o$ is the output depth, and the last two dimensions of each size represent the rows and columns for each variable. Note that the variables X, A, and S have been defined to correspond to real-valued memory arrays common in modern computers. Since each memory location holds a single real number and not a hypercomplex number, each variable above has been given an extra dimension of size 4. This dimension is used to store the quaternion components of the array. The goal of this computation is to compute the quaternion convolution S=A*X. As discussed above, one strategy is to reshape the A and X matrices such that a single quaternion matrix multiply could be employed to compute the convolution. Reshaped matrices A' and X' are shown in Equation 28, shown in FIG. 60.

In A' of Equation 28, $a_i$ are row vectors. The variable i indexes the output dimension of the kernel, $D_O$. Each row vector is of length $D_i \cdot K_x \cdot K_y$, corresponding to a filter kernel at all input depths. Observe that the A' matrix is of depth 4 to store the quaternion components; therefore, A' may be thought of as a two-dimensional quaternion matrix.

In X' of Equation 28, $x_{r,s}$ are column vectors. The variable r indexes the data input patterns dimension, G. Each column vector is of length $D_i \cdot K_x \cdot K_y$, corresponding to a filter kernel at all input depths. Since the filter kernel must be applied to each location in the image, for each input pattern, there are many columns $x_{r,s}$. The s subscript is to index the filter locations; each input pattern contains M filter locations, where M equals:

$$M=(X_i-K_x+1)\cdot(Y_i-K_y+1) \qquad 29$$

The total number of columns of X' is equal to G·M. Like A', X' is a two-dimensional quaternion matrix and is stored in three real dimensions in computer memory.

The arithmetic for quaternion convolution is performed in Equation 28, using a quaternion matrix-matrix multiply function that is described below in Sections 2.1.1 and 2.1.2.

One will observe that the result S' from Equation 28 is still a two-dimensional quaternion matrix. This result is reshaped to form the final output S.

2.1.1 Using 16 Large Real GEMM Calls

An example of a quaternion matrix multiply routine that may be used to compute Equation 28 is discussed presently. One approach is to employ Equation 2, which computes the product of two quaternions using sixteen real-valued multiply operations. The matrix form of this equation is identical to the scalar version in Equation 2, and each multiply may be performed using a highly-optimized GEMM call to the appropriate BLAS library. Moreover, the sixteen real-valued multiply operations may be performed in parallel if hardware resources permit.

2.1.2 Using 8 Large Real GEMM Calls

Another example of a quaternion matrix multiply routine only requires eight GEMM calls, rather than the sixteen calls of Equation 2. This method takes arguments $k(x,y)=a_k(x,y)+b_{k(x,y)}i+c_{k(x,y)}i+d_k(x,y)k$ and $a(x,y)=a_a(x,y)+b_a(x,y)i+c_a(x,y)j+d_a(x,y)k$, and performs the quaternion operation k·a. The first step is to compute eight intermediate values using the real-valued GEMM call:

$t_1(x,y)=a_k(x,y)\cdot a_a(x,y)$ $t_2(x,y)=d_k(x,y)\cdot c_a(x,y)$ $t_3(x,y)=b_k(x,y)\cdot d_a(x,y)$ $t_4(x,y)=c_k(x,y)\cdot b_a(x,y)$ $$t_5(x,y)=(a_k(x,y)+b_k(x,y)+c_k(x,y)+d_k(x,y))\cdot(a_a(x,y)+b_a(x,y)+c_a(x,y)+d_a(x,y))$$

$$t_6(x,y)=(a_k(x,y)+b_k(x,y)-c_k(x,y)-d_k(x,y))\cdot(a_a(x,y)+b_a(x,y)-c_a(x,y)-d_a(x,y))$$

$$t_7(x,y)=(a_k(x,y)-b_k(x,y)+c_k(x,y)-d_k(x,y))\cdot(a_a(x,y)-b_a(x,y)+c_a(x,y)-d_a(x,y))$$

$$t_8(x,y)=(a_k(x,y)-b_k(x,y)-c_k(x,y)+d_k(x,y))\cdot(a_a(x,y)-b_a(x,y)-c_a(x,y)+a_a(x,y))$$

To complete the quaternion multiplication s(x,y), the temporary terms $t_1$ are scaled and summed as shown in Equation 31:

$$
\begin{aligned}
a_s(x, y) &= 2t_1 - \frac{1}{4}(t_5 + t_6 + t_7 + t_8) \\
b_s(x, y) &= -2t_1 + \frac{1}{4}(t_5 + t_6 - t_7 - t_8) \\
c_s(x, y) &= -2t_1 + \frac{1}{4}(t_5 - t_6 + t_7 - t_8) \\
d_s(x, y) &= -2t_1 + \frac{1}{4}(t_5 - t_6 - t_7 + t_8) \\
s(x, y) &= a_s(x, y) + b_s(x, y)i + c_s(x, y)j + d_s(x, y)k
\end{aligned}
\quad 31
$$

Because the GEMM calls represent the majority of the compute time, the method in this section executes more quickly than the method of Section 2.1.1.

2.2 Convolution Implementations: cuDNN

One pitfall to the GEMM-based approach described in the prior section is that formation of the temporary quaternion matrices A' and X' is memory-intensive. Graphics cards, for example those manufactured by Nvidia, are frequently used for matrix multiplication. Unfortunately, these cards have a limited onboard memory, and therefore inefficient use of memory is a practical engineering problem.

For real-valued convolution, memory-efficient software such as Nvidia's cuDNN library has been developed. This package performs real-valued convolution in a memory- and compute-efficient manner. Therefore, rather than using the GEMM-based approach above, adapting cuDNN or another convolution library to hypercomplex convolution may be advantageous. Because, like multiplication, convolution is a linear operation, the algorithms for quaternion multiplication may be directly applied to quaternion convolution by replacing real-valued multiplication with real-valued convolution. This lead to Equations 3, 4, and 5 of Section 1.2 and is explained in more detail there. The real-valued convolutions in these equations may be carried out using an optimized convolution library such as cuDNN, thereby making quaternion convolution practical on current computer hardware.

2.3 Theano Implementation

The hypercomplex neural network layers described thus far are ideal for use in arbitrary graph structures. A graph structure is a collection of layers (e.g. mathematical functions, hypercomplex or otherwise) with a set of directed edges that define the signal flow from each layer to the other layers (and potentially itself). Extensive effort has been expended to create open-source graph solving libraries, for example, Theano.

Three key mathematical operations are required to use the hypercomplex layers with a graph library such as Theano: First, the forward computation through the layer (Sections 1.2 to 1.7); second, a weight update must be computed by a learning rule for a single layer (Section 1.8); and, third, errors must be propagated through the layer to the next graph element (Section 1.9). Since these three operations have been introduced in this document, it is therefore possible to use the hypercomplex layer in an arbitrary graph structure.

The authors have implemented an exemplary set of Theano operations to enable the straightforward construction of arbitrary graphs of hypercomplex layers. The authors employ the memory storage layout of using a three-dimensional real-valued array to represent a two-dimensional quaternion array; this method is described further in Section 2.1 in the context of GEMM operations. Simulation results in Section 4 have been produced using the exemplary Theano operations and using the cuDNN library as described in Section 2.2.

2.4 GPU and CPU Implementations

As has been alluded to throughout this document, computational efficiency is a key criteria that must be met in order for hypercomplex layers to be practical in solving engineering challenges. Because convolution and matrix multiplication are computationally intensive, the standard approach is to run these tasks on specialized hardware, such as a graphics processing unit (GPU), rather than on a general-purpose processor (e.g. from Intel). The cuDNN library referenced in Section 2.2 is specifically written for Nvidia GPUs. The exemplary implementation of hypercomplex layers indeed employs the cuDNN library and therefore operates on the GPU. However, the computations may be performed on any other computational device and the implementation discussed here is not meant to limit the scope or claims of this patent.

2.5 Phase-Based Activation and Angle Quantization Implementation

An important bottleneck in GPU computational performance is the time delay to transfer data to and from the GPU memory. Because the computationally-intensive tasks of convolution and multiplication are implemented on the GPU in the exemplary software, it is critical that all other graph operations take place on the GPU to reduce transfer time overhead. Therefore, the activation function described in Sections 1.6 and 1.7 have also been implemented using the GPU, as have pooling operators and other neural network functions.

3 Exemplary Hypercomplex Deep Neural Network Structures

Sections 1 and 2 of this document have provided examples of a hypercomplex neural network layers, using quaternion numbers for illustrative purposes. This section discusses exemplary graph structures (i.e. "neural networks") of hypercomplex layers. The layers may be arranged in any graph structure and therefore have wide applicability to the engineering problems discussed in Section 4. The Theano implementation of the hypercomplex layer, discussed in Section 2.3, allows for construction of arbitrary graphs of hypercomplex layers (and other components) using minimal effort.

3.1 Feedforward Neural Network

Figure 19:
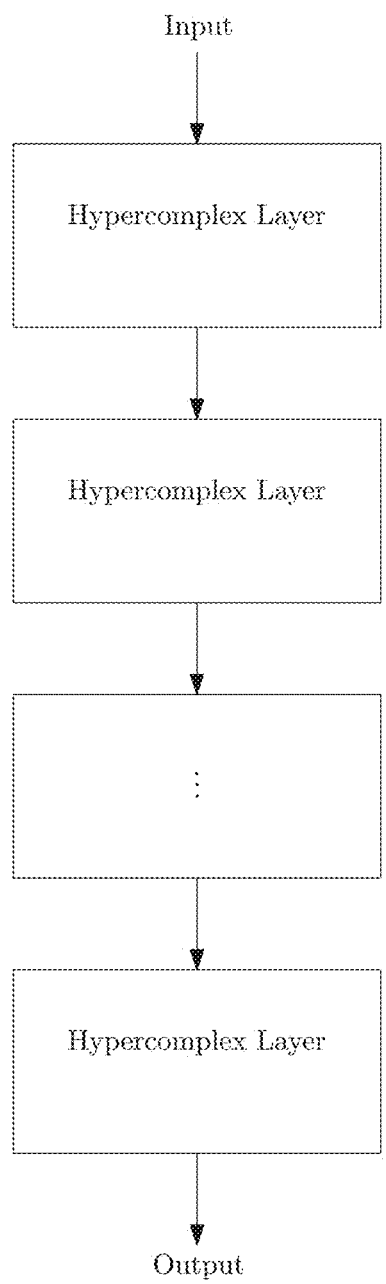
FIG. 19 depicts a flowchart representing a hypercomplex feedforward neural network.

FIG. 19 demonstrates the simplest graph of hypercomplex layers. The output of each layer feeds the input to the next layer, until a final output is reached. The layers may be any type of hypercomplex layer, including fully-connected, convolutional, locally-connected, and so on.

3.2 Neural Network with Pooling

Figure 20:
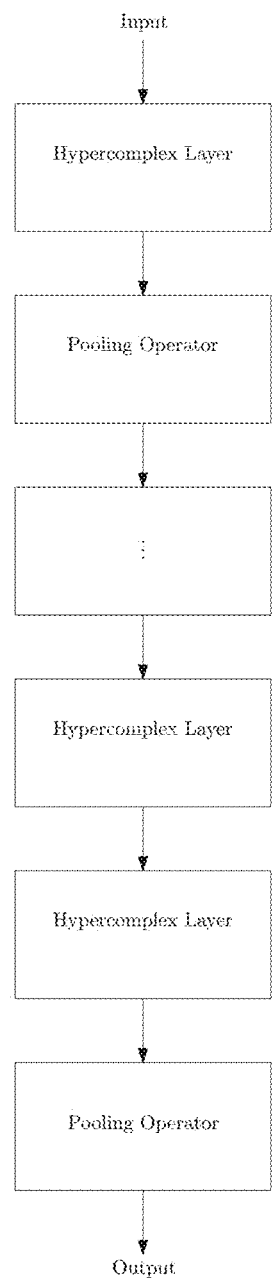
FIG. 20 depicts a flowchart representing a hypercomplex convolutional neural network with pooling.

The feedforward neural network of FIG. 19 may be combined with a variety of other neural network layers. For example, a hypercomplex pooling operator may be added as shown in FIG. 20. The hypercomplex pooling operator applies a function to local windows of hypercomplex points, with the goal of reducing the window to a single hypercomplex number.

3.3 Recurrent Neural Network

Figure 21:
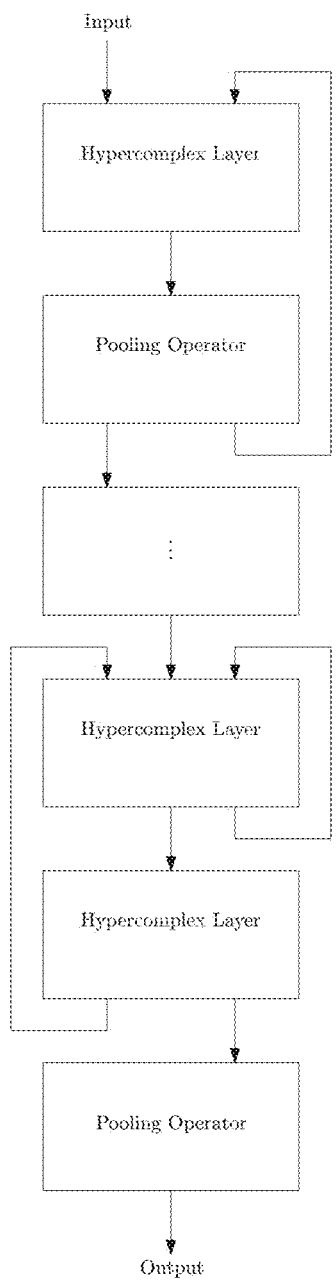
FIG. 21 depicts a flowchart representing a hypercomplex convolutional neural network with feedback: recurrent network.

Graphs of hypercomplex layers also may contain feedback loops, as shown in FIG. 21.

3.4 Neural Network with Layer Jumps

Figure 22:
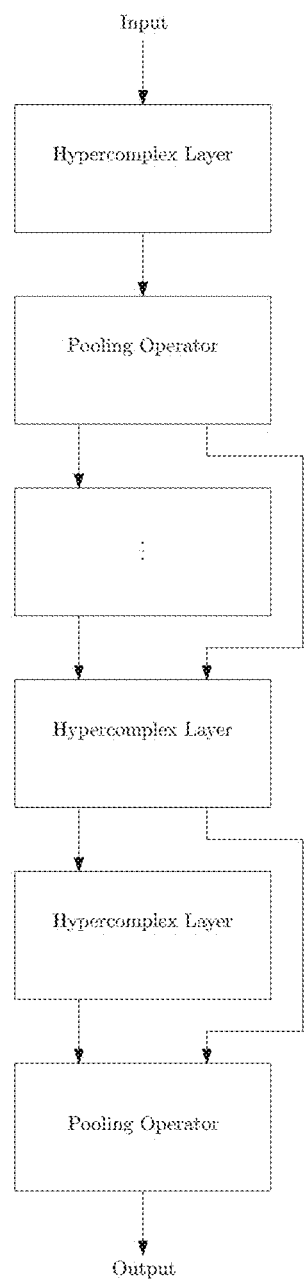
FIG. 22 depicts a flowchart representing a hypercomplex convolutional neural network with layer jumps.

As shown in FIG. 22, not all of the hypercomplex layers must be connected in sequence; the output of one layer may skip one or more layers before reconnecting to the system.

3.5 State Layers

In the entirety of this document, the term "hypercomplex layer" is meant to encompass any variation of a hypercomplex neural network layer, including, but not limited to, fully-connected layers such as those of FIG. 13, convolutional layers such as FIG. 1, locally-connected layers, and layers incorporating state variable such as FIG. 16 and FIG. 18.

3.6 Parallel Filter Sizes

Figure 23:
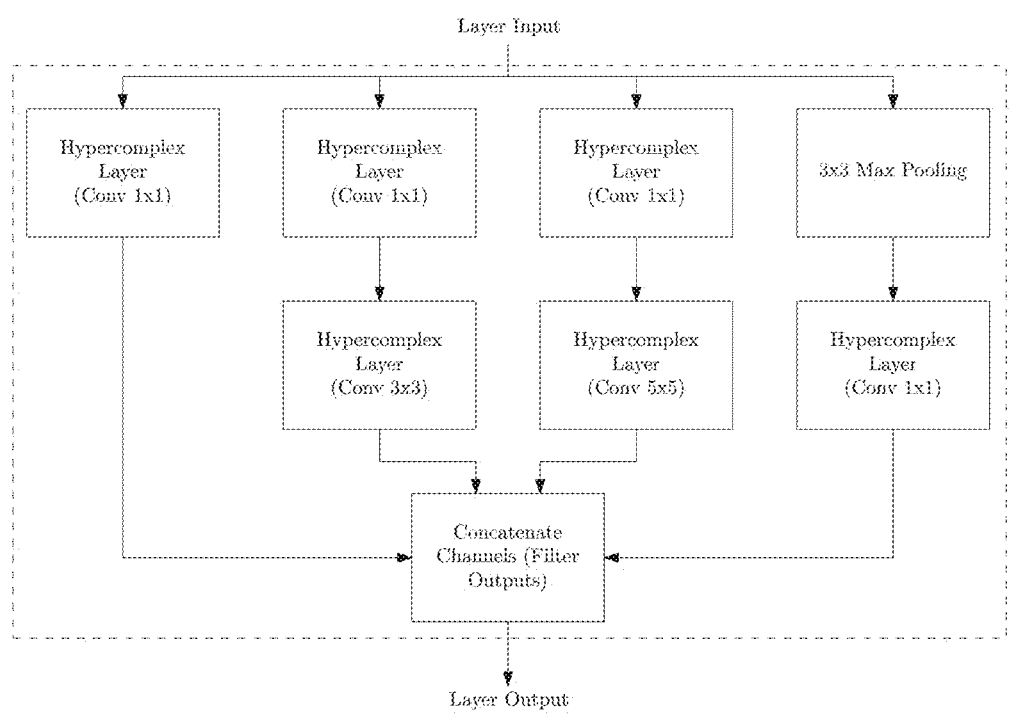
FIG. 23 depicts a flowchart representing a hypercomplex neural network with multiple parallel filters.

FIG. 23 depicts an exemplary arrangement of hypercomplex layers and other exemplary operations such as pooling and concatenation. The structure in FIG. 23 allows one to operate multiple filter sizes in parallel. Moreover, by reducing the number of output channels at the top-level 1×1 convolution filters, one can reduce the computational overhead of the entire structure in the dotted box in FIG. 23.

3.7 Parallel Graphs

Figure 24:
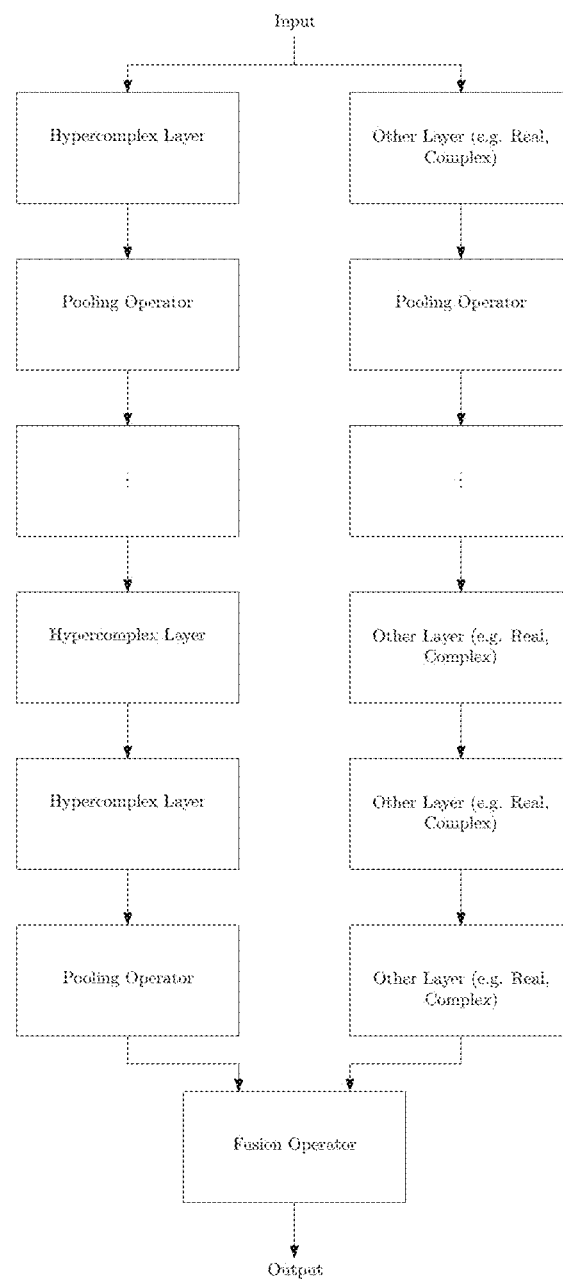
FIG. 24 depicts a flowchart representing a neural network with parallel processing and fusion.

Hypercomplex layers and/or graphs may, for example, be combined in parallel with other structures. The final output of such a system may be determined by combining the results of the hypercomplex layers and/or graph and the other structure using any method of fusion, e.g. averaging, voting systems, maximum likelihood estimation, maximum a posteriori estimation, and so on. An example of this type of system is depicted in FIG. 24.

3.8 Combinations of Hypercomplex and Other Modules

Figure 25:
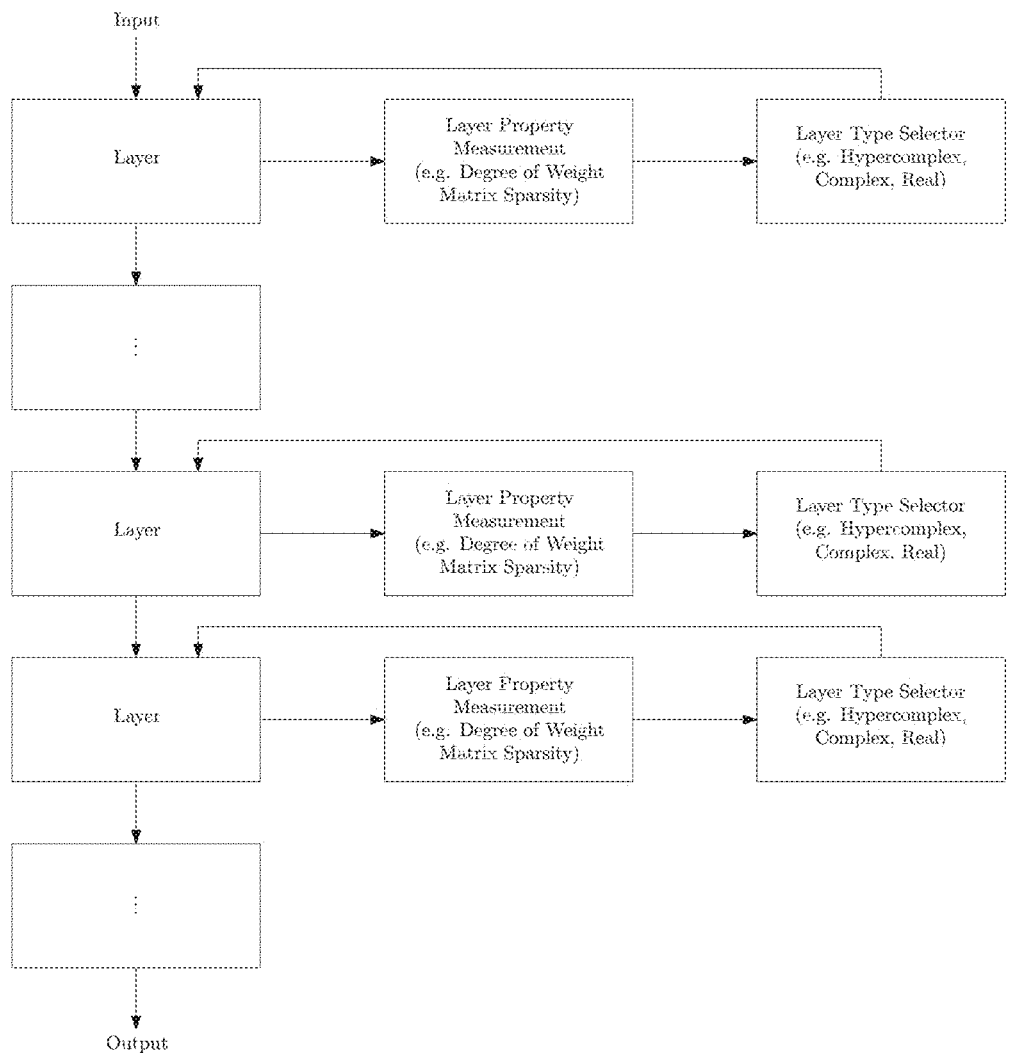
FIG. 25 depicts a flowchart representing a neural network with adaptive layer type selection.

Hypercomplex layers, graphs, and/or modules may be combined in series with nonhypercomplex components; an example of this is shown in FIG. 25. In this example, each graph layer may be hypercomplex or nonhypercomplex. Each layer has a selection algorithm to determine what type/dimensionality is appropriate for the layer. The example in FIG. 25 employs the sparsity of the layer's weight matrix as a measure for component selection. For example, layers that are "harder" to train, according to the sparsity measure, could be chosen to be hypercomplex, while "easier" layers could be real-valued for computational efficiency.

3.9 Hypercomplex Layers in a Graph

The hypercomplex layers may be arranged in any graph-like structure; Sections 3.1 to 3.8 provide examples but are not meant to limit the arrangement or interconnection of hypercomplex layers. As discussed in Section 2.3, the exemplary quaternion hypercomplex layer has specifically been implemented to allow for the creation of arbitrary graphs of hypercomplex layers. These layers may be combined with any other mathematical function(s) to create systems.

4 Exemplary Applications

This section provides exemplary engineering applications of the hypercomplex neural network layer.

4.1 Image Super Resolution

An exemplary application of hypercomplex neural networks is image super resolution. In this task, a color image is enlarged such that the image is represented by a larger number of pixels than the original. Image super resolution is performed by digital cameras, where it is called, "digital zoom," and has many applications in surveillance, security, and other industries.

Image super resolution may be framed as an estimation problem: Given a low-resolution image, estimate the higher-resolution image. Real-valued, deep neural networks have been used for this task. To use a neural network for image super resolution, the following steps are performed: To simulate downsampling, full-size original images are blurred using a Gaussian kernel; the blurred images are paired with their original, full-resolution sources and used to train a neural network as input and desired response, respectively; and, finally, new images are presented to the neural network and the network output is taken to be the enhanced image.

One major limitation of the above procedure is that real-valued neural networks do not understand color, and therefore most approaches in literature are limited to grayscale images. We adapt the hypercomplex neural network layer introduced in this patent application to the super resolution application in FIG. 26. In particular, the quaternion example of the hypercomplex layer is convenient for describing color images. The quaternion's polar form has three angles, which correspond well to the three color channels in an image.

Figure 26:
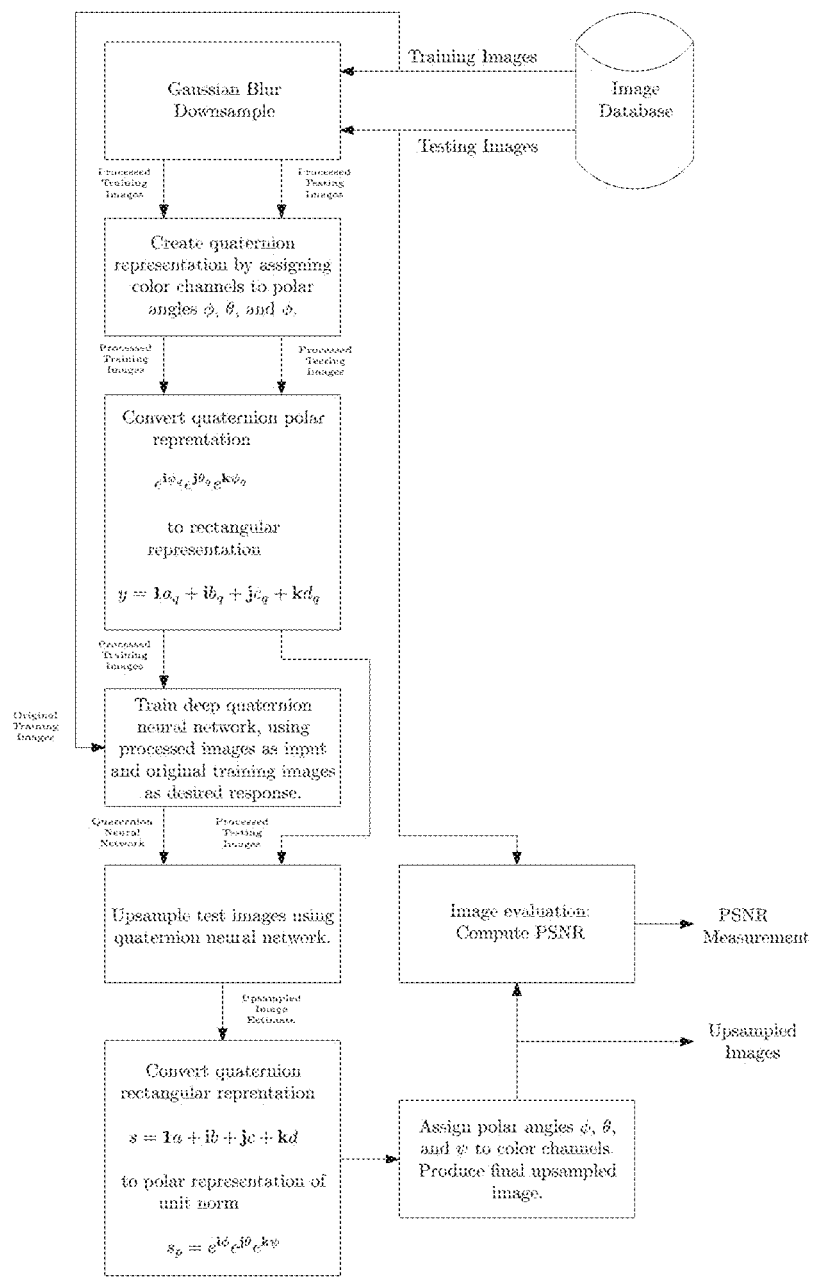
FIG. 26 depicts a flowchart representing an exemplary application: enlarging images

Each step in FIG. 26 is explained henceforth:
1. A database of full-size images is created, where each image is 32×32 pixels;
2. Sets of training and testing images are blurred using a Gaussian kernel. These are the downsampled images that will be used for training and as test input. Since the processed images correspond to original images in the image database, one is able to measure the performance of the neural network predictor with respect to image quality;
3. Create quaternion versions of the 3-dimensional color images by encoding the three image colors as the angles ($\phi$, $\delta$, $\psi$);
4. Convert this polar form to quaternion (1, i, j, k) representation using Equation 14;
5. Using the processed, downsampled training images as input and the original, full-resolution training images as a desired response, train the hypercomplex neural network;
6. Employ the trained neural network weights to predict the full-resolution versions of the processed test images;
7. Convert the network output back to polar form using Equation 12;
8. Assign the angular values ($\phi$, $\theta$, $\psi$) to each image color channel;
9. Compare the predicted test images with the original test images in the database, according to peak signal-to-noise ratio (PSNR), a standard image quality evaluation metric.

The above steps were performed using a quaternion neural network with 3 layers. The first convolutional layer has the parameters $D_i=1$, $D_o=64$, $K_x=K_y=9$. The second layer takes input directly from the first and has parameters $D_i=64$, $D_o=32$, $K_x=K_y=1$. Finally, the third layer takes input directly from the second and has parameters $D_i=32$, $D_o=1$, $K_x=K_y=5$. For information on parameter definitions, please see Section 2.1 of this document. Note that the convolution operations were performed on all valid points (i.e. no zero padding), so the prediction image is of size 20×20 color pixels, which is somewhat smaller than the 32×32 pixel input size.

This experiment was repeated using a real-valued convolutional neural network with the same parameters. However, when using a real-valued neural network, the quaternion polar form (Equations 12 and 14) is not used for the real-valued neural networks. Rather, the images are presented to the network as a depth 3 input, where each input depth corresponds to one of the colors. Consequently, $D_i=3$ for the first layer rather than 1 in the quaternion case, and $D_o=3$ in the last layer. This allows the real neural network to process color images, but the real network does not understand that there is a significant relationship between the three color channels. Each neural network was trained using 256 input images. The networks were trained for at least 150,000 cycles; in all cases, the training error had reached steady state before training was deemed complete. An additional set of 2544 images was used for testing.

TABLE 1

| Neural Network | PSNR (Training Set) | PSNR (Testing Set) |
|---|---|---|
| Real-Valued | 29.72 dB | 30.06 dB |
| Hypercomplex | 31.24 dB | 31.89 dB |

The mean PSNR values are shown for the training and testing datasets in Table 1. Higher PSNR values represent better results, and one can observe that the hypercomplex network outperforms the real-valued network.

Figure 27:
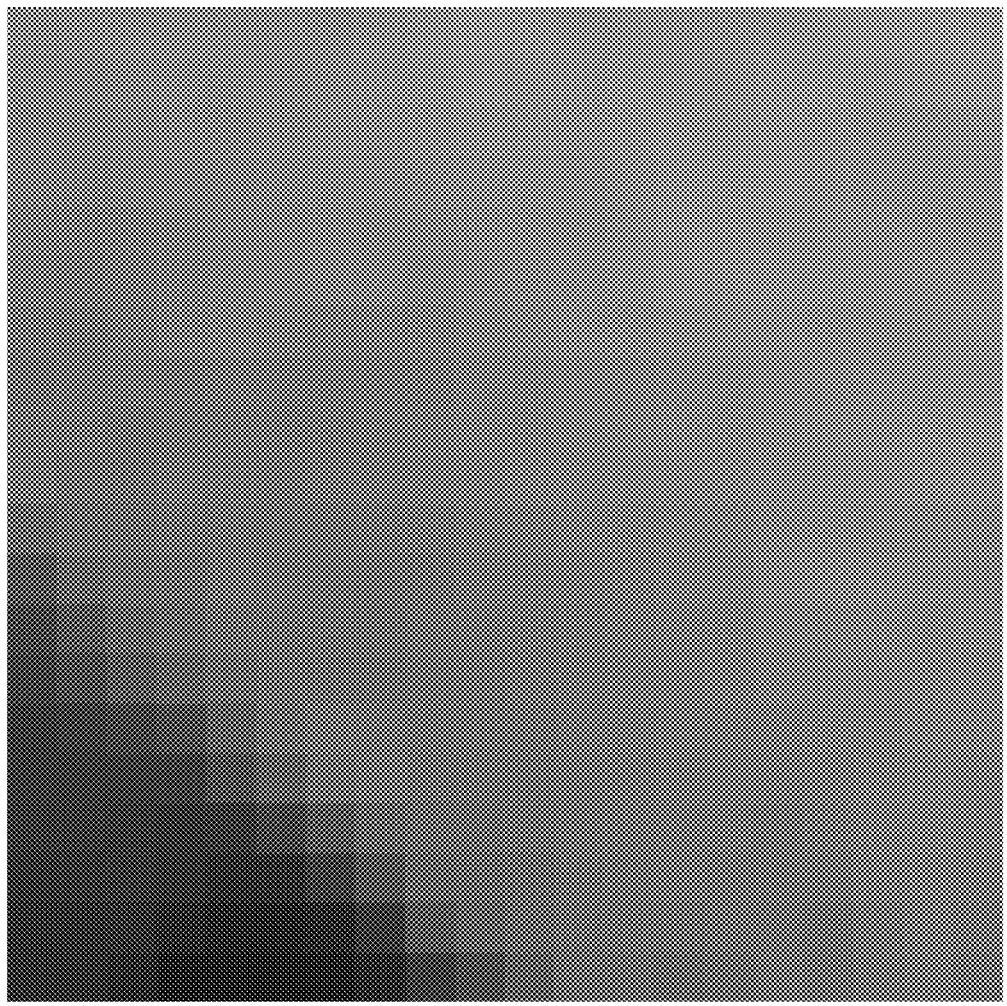
FIG. 27 depicts a representation of super resolution image 1: ground truth.
Figure 28:
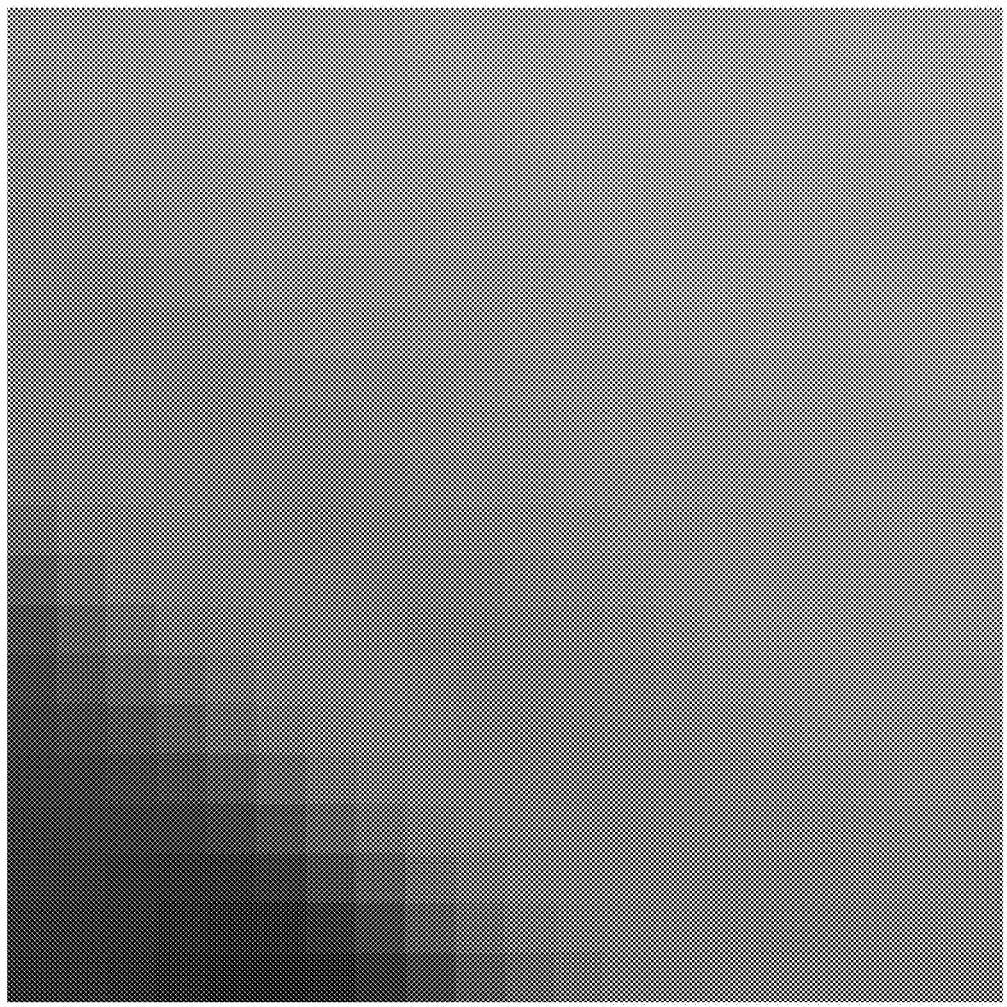
FIG. 28 depicts a representation of super resolution image 1: real-valued prediction.
Figure 29:
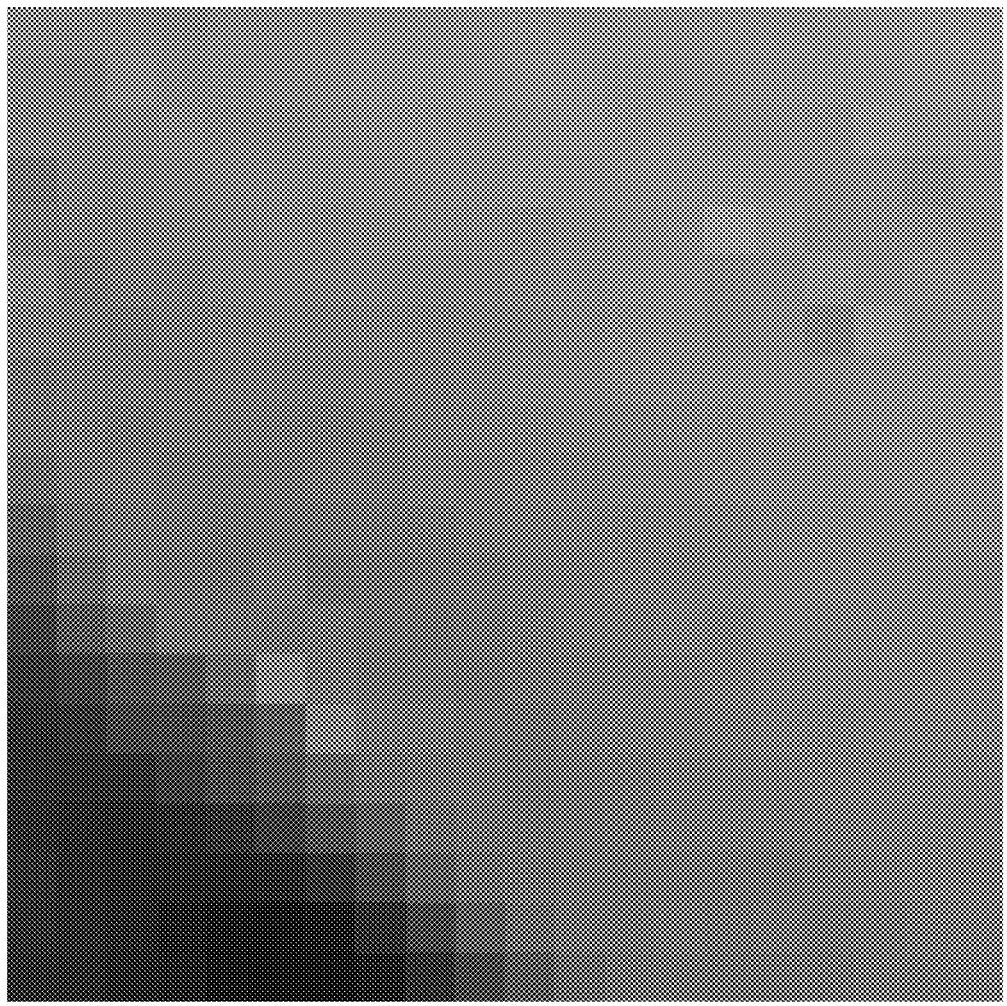
FIG. 29 depicts a representation of super resolution image 1: hypercomplex prediction.
Figure 30:
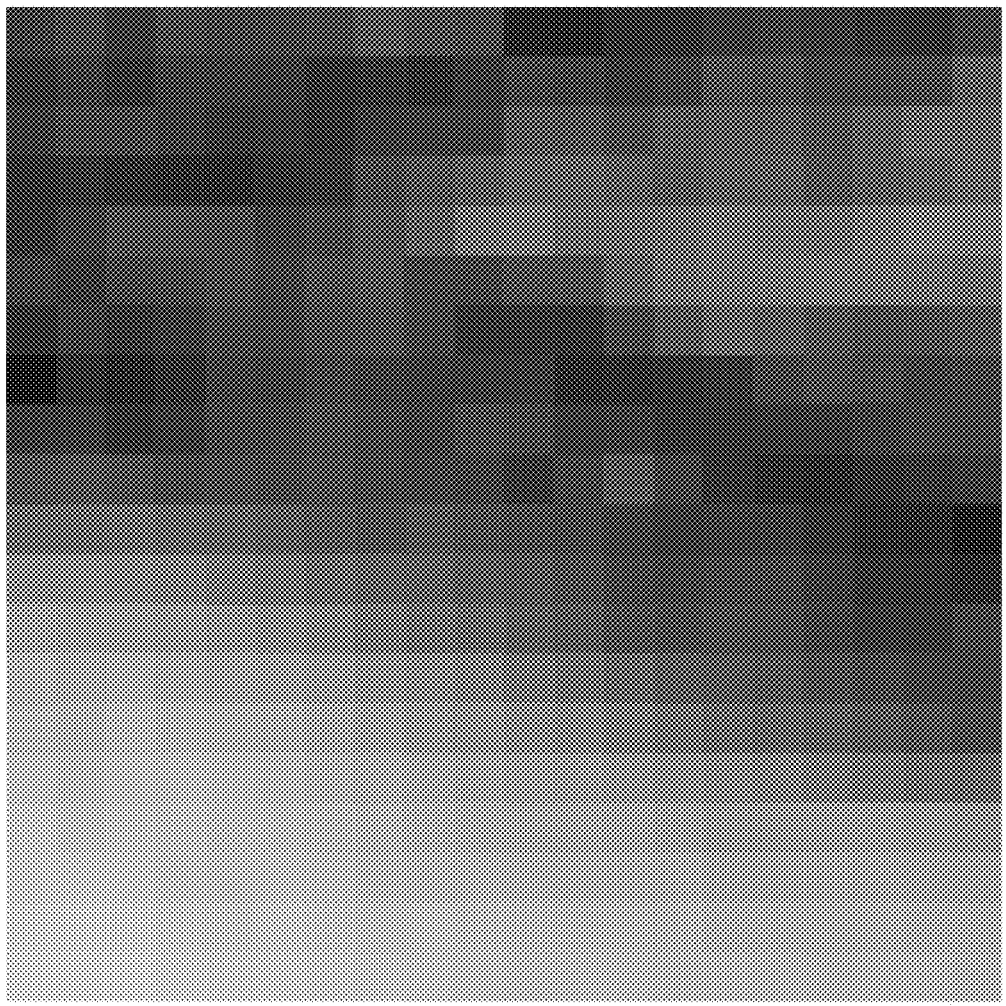
FIG. 30 depicts a representation of super resolution image 2: ground truth.
Figure 31:
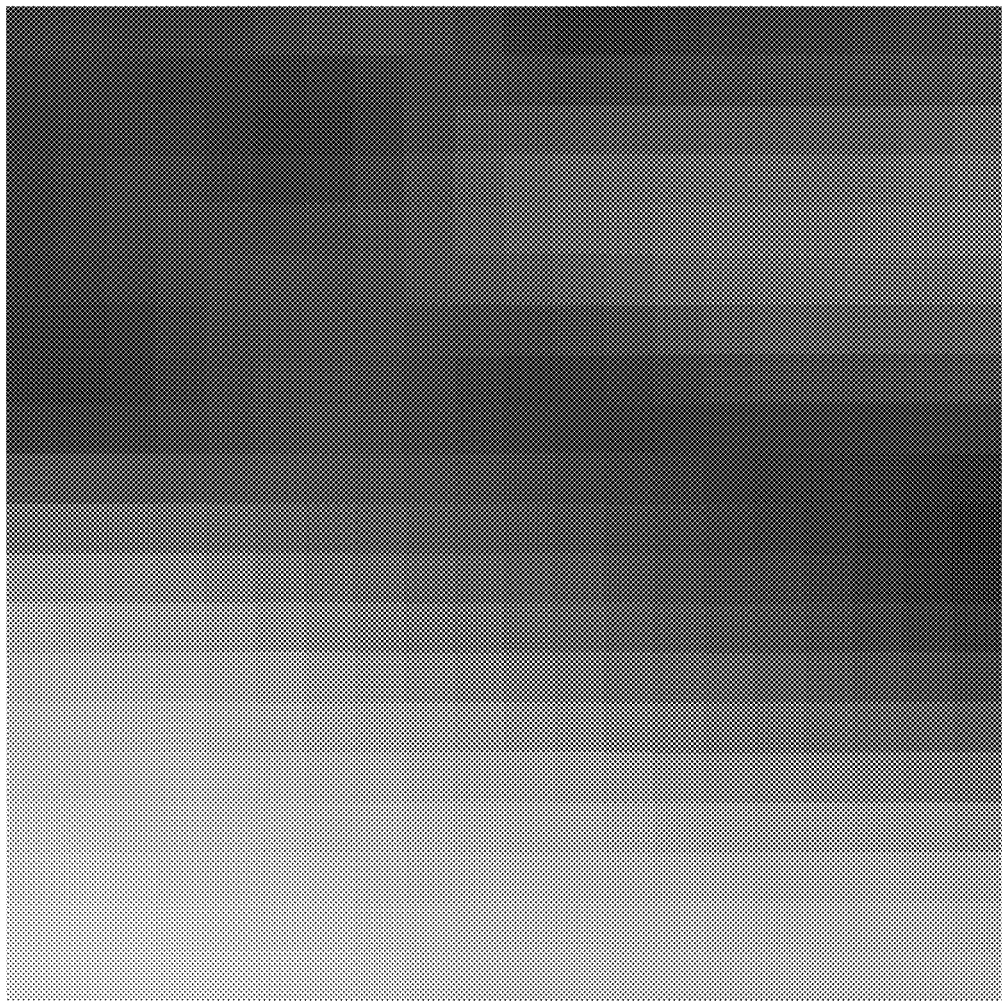
FIG. 31 depicts a representation of super resolution image 2: real-valued prediction.
Figure 32:
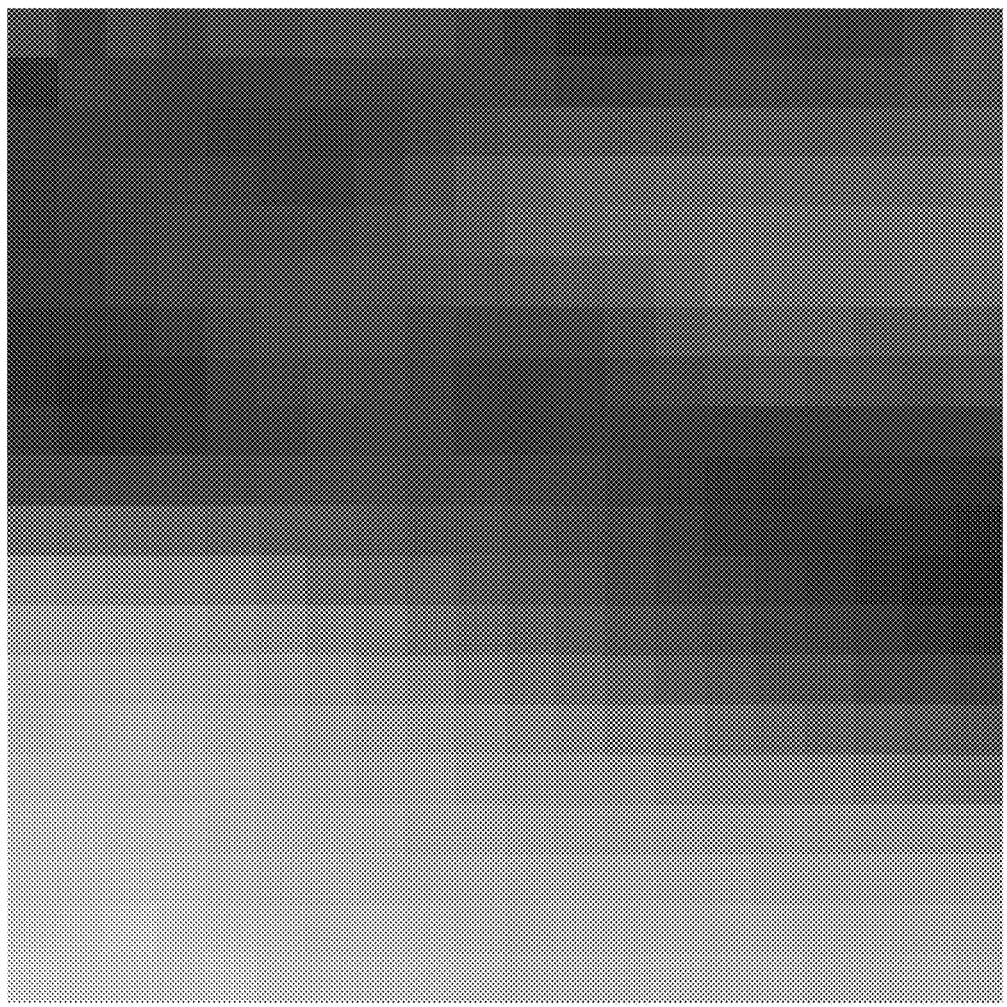
FIG. 32 depicts a representation of super resolution image 2: hypercomplex prediction.

Sample visual outputs from each algorithm are shown in FIG. 27 through FIG. 32: FIG. 27 shows an original, ground truth image; FIG. 28 shows the real-valued neural network prediction; FIG. 29 shows the hypercomplex network prediction; and FIG. 30 through FIG. 32 repeat this process for a second sample image. One can observe that the real-valued algorithm has difficulty predicting the orange color of the image and, rather, substitutes green instead. The hypercomplex algorithm introduced in this patent application does not have difficulty with color images.

4.2 Image Segmentation

Another exemplary application of the hypercomplex neural network is color image segmentation. Image segmentation is the process of assigning pixels in a digital image to multiple sets, where each set typically represents a meaningful item in the image. For example, in a digital image of airplanes flying, one may want to segment the image into sky, airplane, and cloud areas.

When combined with the pooling operator, real-valued convolutional neural networks have seen wide application to image classification. However, the shift-invariance caused by pooling makes for poor image localization, which is necessary for image segmentation. One strategy to combat this problem is to upsample the image during convolution. Such upsampling is standard practice in signal processing, where one inserts zeros between consecutive data values to create a larger image. This upsampled image is trained into a hypercomplex neural network.

Figure 33:
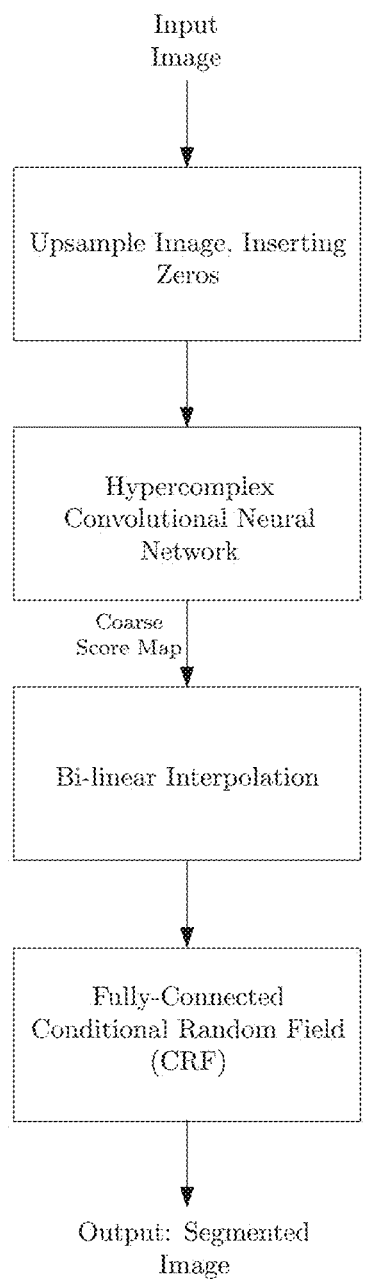
FIG. 33 depicts a flowchart representing a hypercomplex application: image segmentation.

An exemplary system for hypercomplex image segmentation is shown in FIG. 33. Input images are upsampled, processed through a pre-trained hypercomplex neural network, smoothed using bi-linear interpolation, and finally processed using a conditional random field (CRF) to produce a final image segmentation result.

4.3 Image Quality Evaluation

The hypercomplex networks introduced in this patent may also be used for automated image quality evaluation.

Image quality analysis is fundamentally a task for human perception, and therefore humans provide the ultimate ground truth in image quality evaluation tasks. However, human ranking of images is time-consuming and expensive, and therefore computational models of human visual perception are of great interest. Humans typically categorize images using natural language—i.e. with words like, "good," or, "bad." Existing studies have asked humans to map these qualitative descriptions to a numerical score, for example, 1 to 100. Research indicates that people are not good at the mapping process, and therefore the step of mapping to a numerical score adds noise. Finally, existing image quality measurement systems have attempted to learn the mapping from image to numerical score, and are impeded by the noisy word-to-score mapping described previously.

Another approach is to perform blind image quality assessment, where the image quality assessment system learns the mapping from image to qualitative description. Thus, a blind image quality assessment system is effectively a multiclass classifier, where each class corresponds to a word such as, "excellent," or, "bad." Such a system is shown in FIG. 34 and is another exemplary application of the proposed hypercomplex networks.

Figure 34:
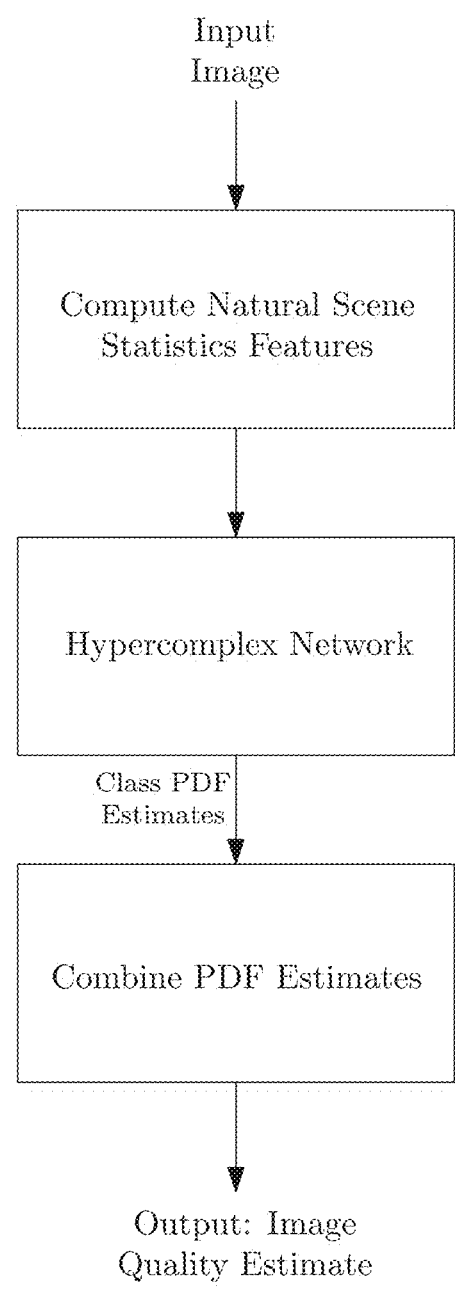
FIG. 34 depicts a flowchart representing an image quality measurement.

The first processing step of the system in FIG. 34 computes color features that are based on human visual perception. Next, the color features are processed simultaneously using a hypercomplex network. The network estimates probabilities for each class, and finally the class probabilities are combined to select the final image quality estimate.

A key feature of the hypercomplex network is its ability to process all color channels simultaneously, thereby preserving important inter-channel relationships. Existing methods either process images in grayscale or process color channels separately, thereby losing important information.

4.4 Image Steganalysis

Another exemplary application of hypercomplex deep learning is image steganalysis. Image steganography is the technique of hiding information in images by slightly altering the pixel values of the image. The alteration of pixels is performed such that the human visual system cannot perceptually see a difference between the original and altered image. Consequently, steganography allows for covert communications over insecure channels and has been used by a variety of terrorist organizations for hidden communications. Popular steganographic algorithms include HUGO, WOW, and S-UNIWARD.

Figure 35:
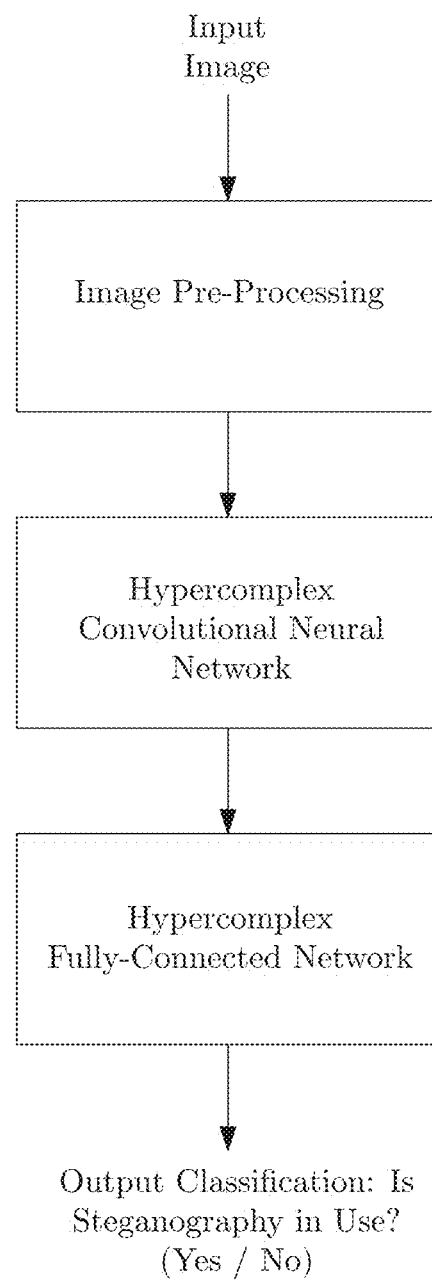
FIG. 35 depicts a flowchart representing a hypercomplex application: image steganalysis.

Methods for detecting steganography in images have been developed. However, all of the methods either process images in grayscale or process each color channel separately, thereby losing important inter-channel relationships. The hypercomplex neural network architecture in this patent application overcomes both limitations; an example of a steganalysis system is shown in FIG. 35. In this system, a hypercomplex convolutional neural network is used to develop steganalysis features, and a fully-connected hypercomplex layer (or layers) is used to perform the final classification task.

4.5 Face Recognition

Figure 36:
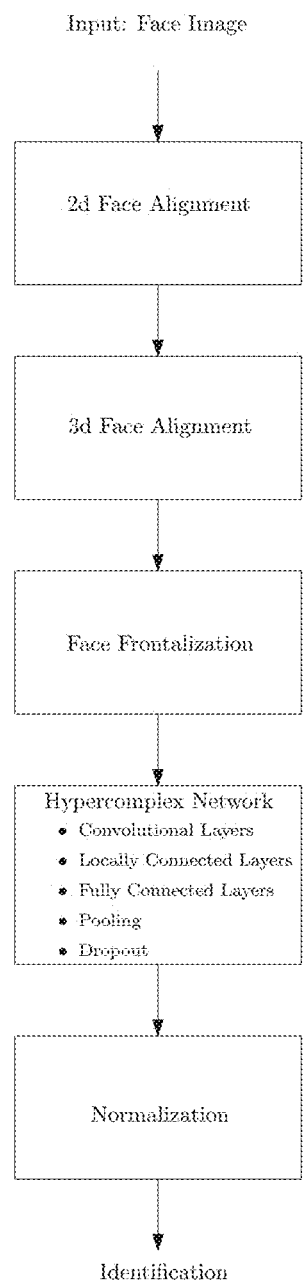
FIG. 36 depicts a flowchart representing a hypercomplex application: face recognition.

Due to hypercomplex networks' advantages in color image processing, face recognition is another exemplary application. One method of face recognition is shown in FIG. 36. In this system, the face is first aligned to a position in two dimensions. It is then mapped onto a 3d surface through the use of reference points (e.g. eyes, nose, etc.), and a direct frontal image of the 3d face is then formed. Next, the face is processed using a hypercomplex network. The network may use any combination of, for example, convolutional layers, locally-connected layers, fully-connected layers, hypercomplex pooling, and/or hypercomplex dropout while processing the image. Additional normalization or other processing may be performed after the hypercomplex network processing. Finally, a face recognition measure is output for identification.

4.6 Natural Language Processing: Event Embedding

An important task in natural language processing is event embedding, the process of converting events into vectors. An example of an event may be, "The cat ate the mouse." In this case, the subject $O_1$ is the cat, the predicate P is "ate", and the object $O_2$ is the poor mouse. Open-source software such as ZPar can be used to extract the tuple $(O_1, P, O_2)$ from the sentence, and this tuple is referred to as the event.

Figure 37:
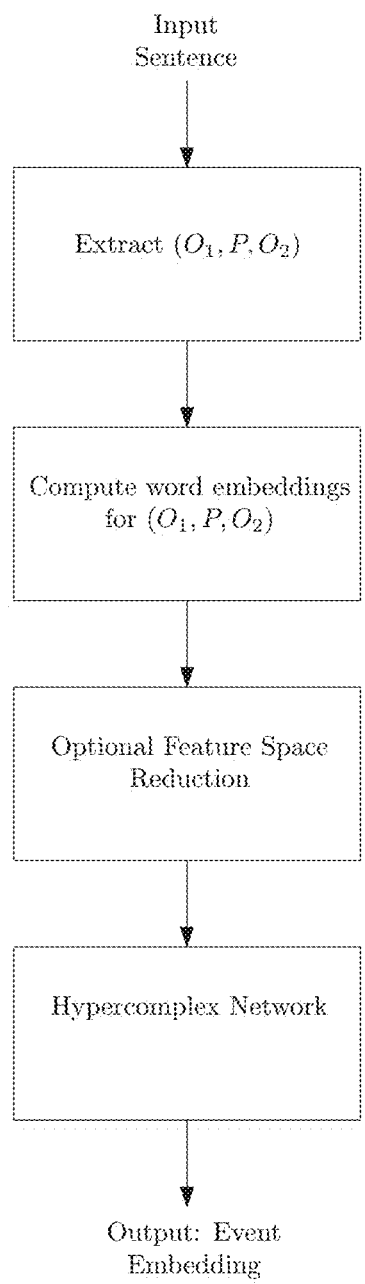
FIG. 37 depicts a flowchart representing a hypercomplex application: event embedding.

However, the tuple $(O_1, P, O_2)$ is still a tuple of words, and machine reading and translation tasks typically require the tuple to be represented as a vector. An exemplary application of a hypercomplex network for tuple event embedding is shown in FIG. 37. The first step for event embedding is to extract $(O_1, P, O_2)$. Next, word embeddings for each element of the tuple are computed; there are many standard ways to compute word embeddings, for example, the Microsoft Distributed Machine Learning Toolkit. Since word embeddings are a sparse feature space, typically (but optionally) feature space reduction will be performed, e.g., using clustering. Next, each element of the generated tuple of word embeddings may be represented as a hypercomplex angle, using the same strategy as in Section 4.1. Finally, a single output embedding vector is obtained through use of the hypercomplex network introduced in this patent application. In particular, the hypercomplex tensor layer structure introduced in Section 1.14 is useful for this task.

4.7 Natural Language Processing: Machine Translation

A natural extension of the event embedding example of Section 4.6 is machine translation: Embedding a word, event, or sentence as a vector, and then running the process in reverse but using neural networks trained in a different language. The result is a system that automatically translates from one written language to another, e.g. from English to Spanish.

Figure 38:
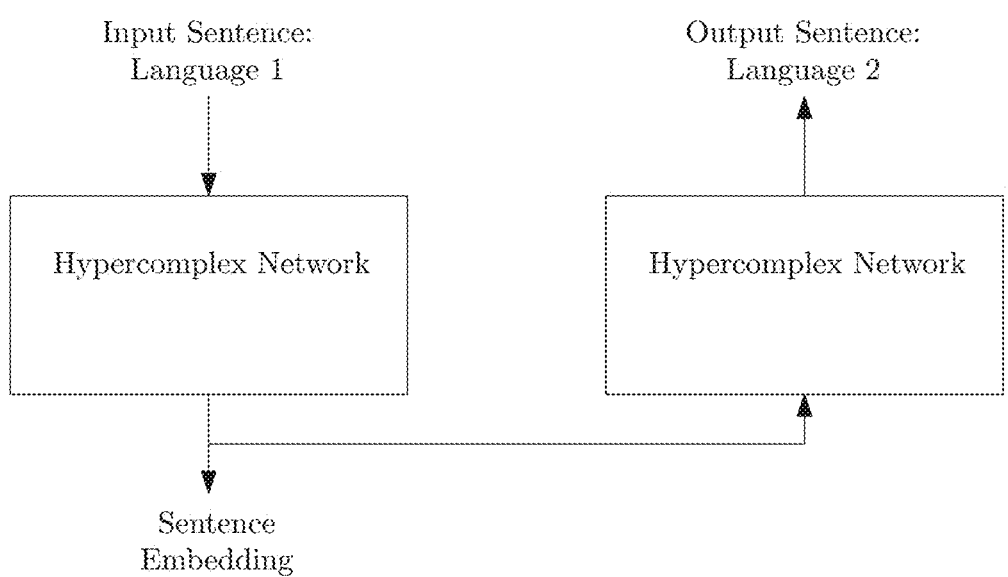
FIG. 38 depicts a flowchart representing a hypercomplex application: machine translation 1.

The most general form of a machine translation system is shown in FIG. 38, where a complete sentence is input to a hypercomplex network, an embedding is created, and then a different hypercomplex network outputs the translated sentence. Note that, due to the sequential nature of sentences, these hypercomplex networks will typically have state elements within them, as in FIG. 18. Moreover, the networks will generally be trained together, with the goal of maximizing the probability of obtaining the correct translation, typically with a log-likelihood cost function.

Figure 39:
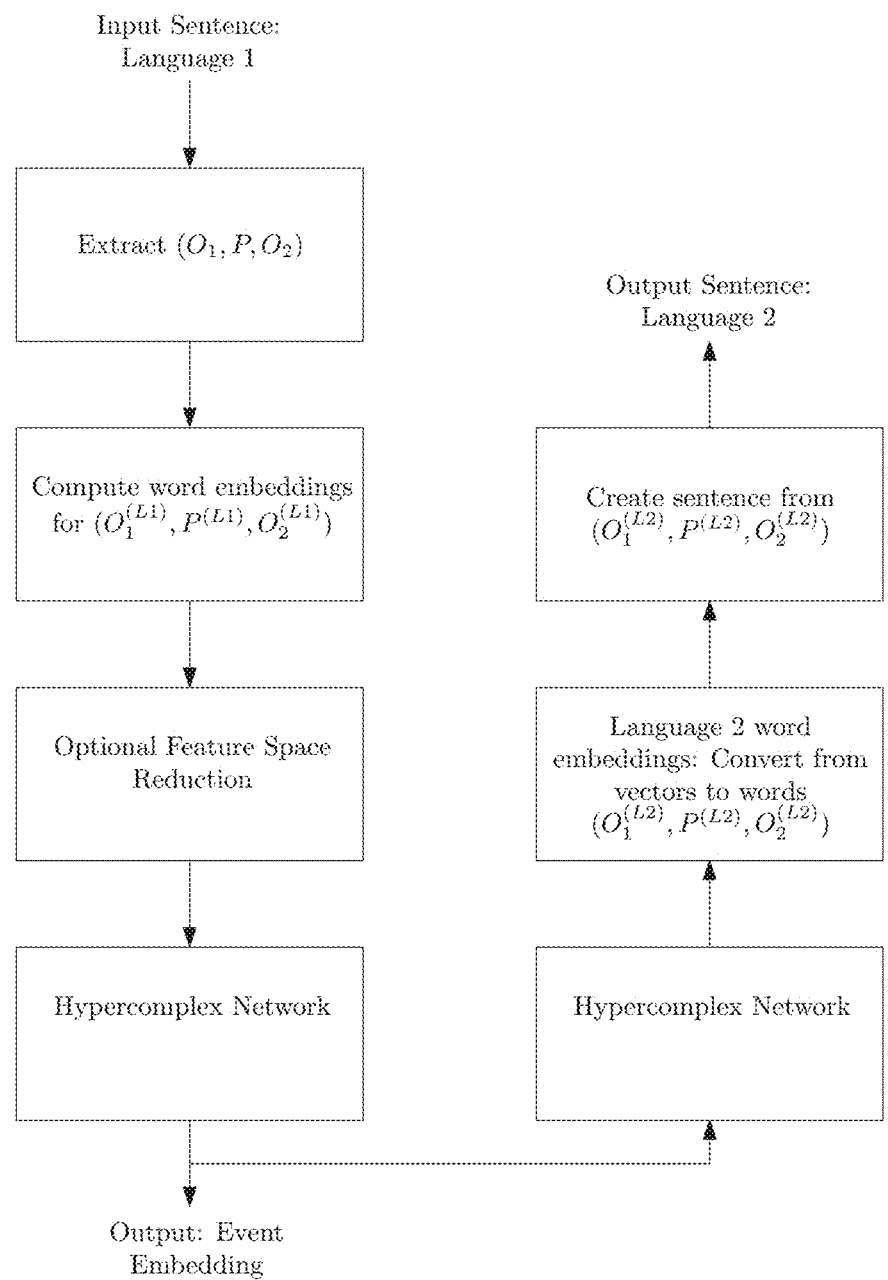
FIG. 39 depicts a flowchart representing a hypercomplex application: machine translation 2.

Another example of a machine translation system is shown in FIG. 39, where the event embedding pipeline of Section 4.6 is performed, followed by a reverse set of steps to compute the final translated sentence. In this system, each step may be trained separately to allow for more fine-grained control of system performance. As with the system in FIG. 37, this system may also have all of the blocks trained together according to a single cost function. The choice of training methodology will be application-specific and may be decided by the user.

4.8 Unsupervised Learning: Object Recognition

The deep neural network graphs described in this patent application are typically trained using labeled data, where each training input pattern has an associated desired response from the network. However, in many applications, extensive sets of labeled are not available. Therefore, a way of learning from unlabeled data is valuable in practical engineering problems.

An exemplary approach to using unlabeled data is to train autoassociative hypercomplex neural networks, where the desired response of the network is the same as the input. Provided that the hypercomplex network has intermediate representations (i.e. layer outputs within the graph) that are of smaller size than the input, the autoassociative network will create a sparse representation of the input data during the training process. This sparse representation can be thought of as a form of nonlinear, hypercomplex principal component analysis (PCA) and extracts only the most "informative" pieces of the original data. Unlike linear PCA, the hypercomplex network performs this information extraction in a nonlinear manner that takes all hypercomplex components into account.

An example of autoassociative hypercomplex neural networks is discussed in Section 1.10, where autoassociative structures are employed for pre-training neural network layers.

Figure 40:
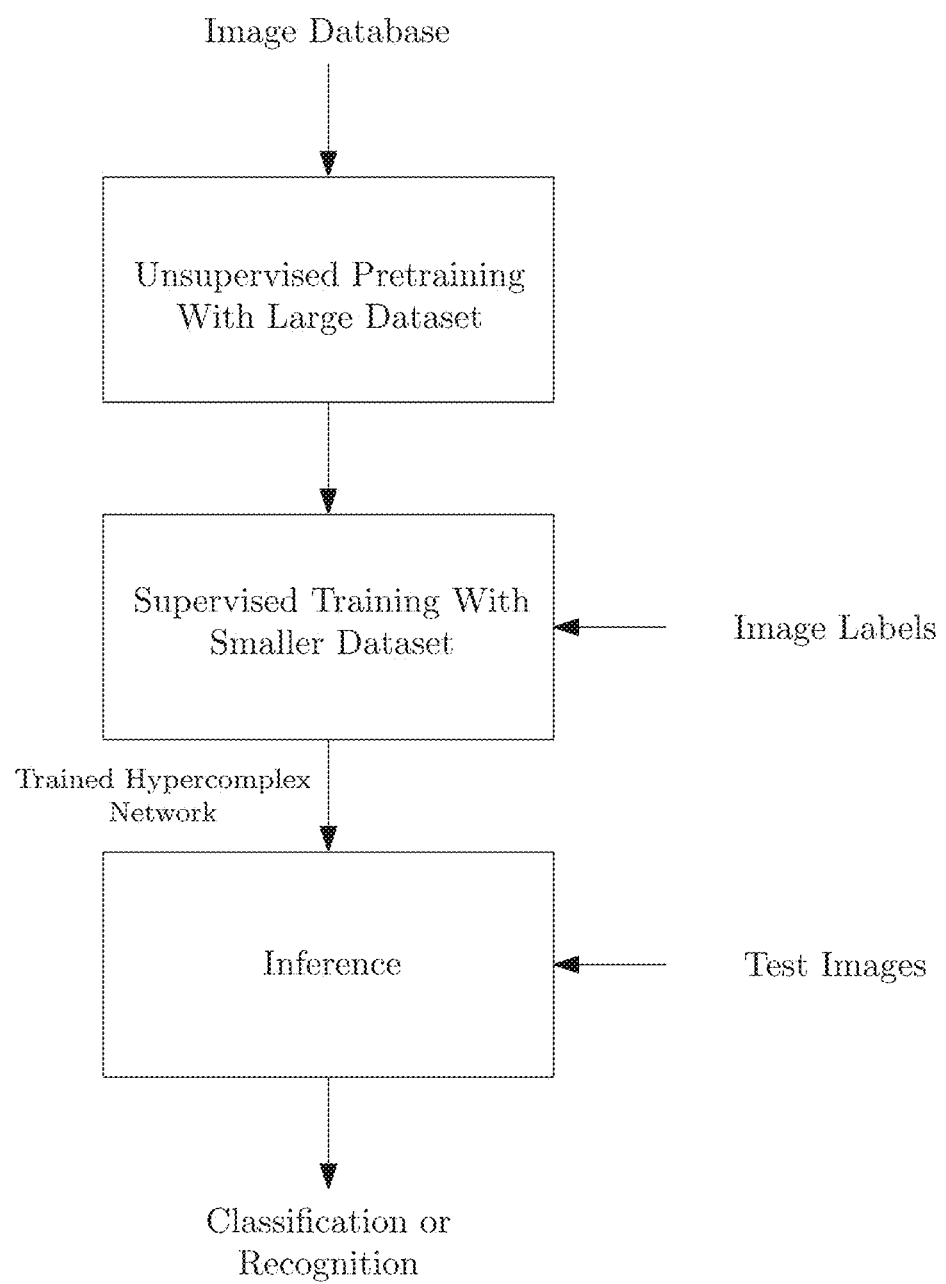
FIG. 40 depicts a flowchart representing a hypercomplex application: unsupervised learning.

Additionally, unsupervised learning of hypercomplex neural networks may be used for feature learning in computer vision applications. For example, in FIG. 40, a method for training an image recognition system is shown. First, unlabeled images are trained according to the pretraining method of FIG. 14. Next, a smaller set of images that also have labels are used to fine-tune the hypercomplex network. Finally, the hypercomplex network may be used for image classification and recognition tasks.

4.9 Control Systems

Figure 41:
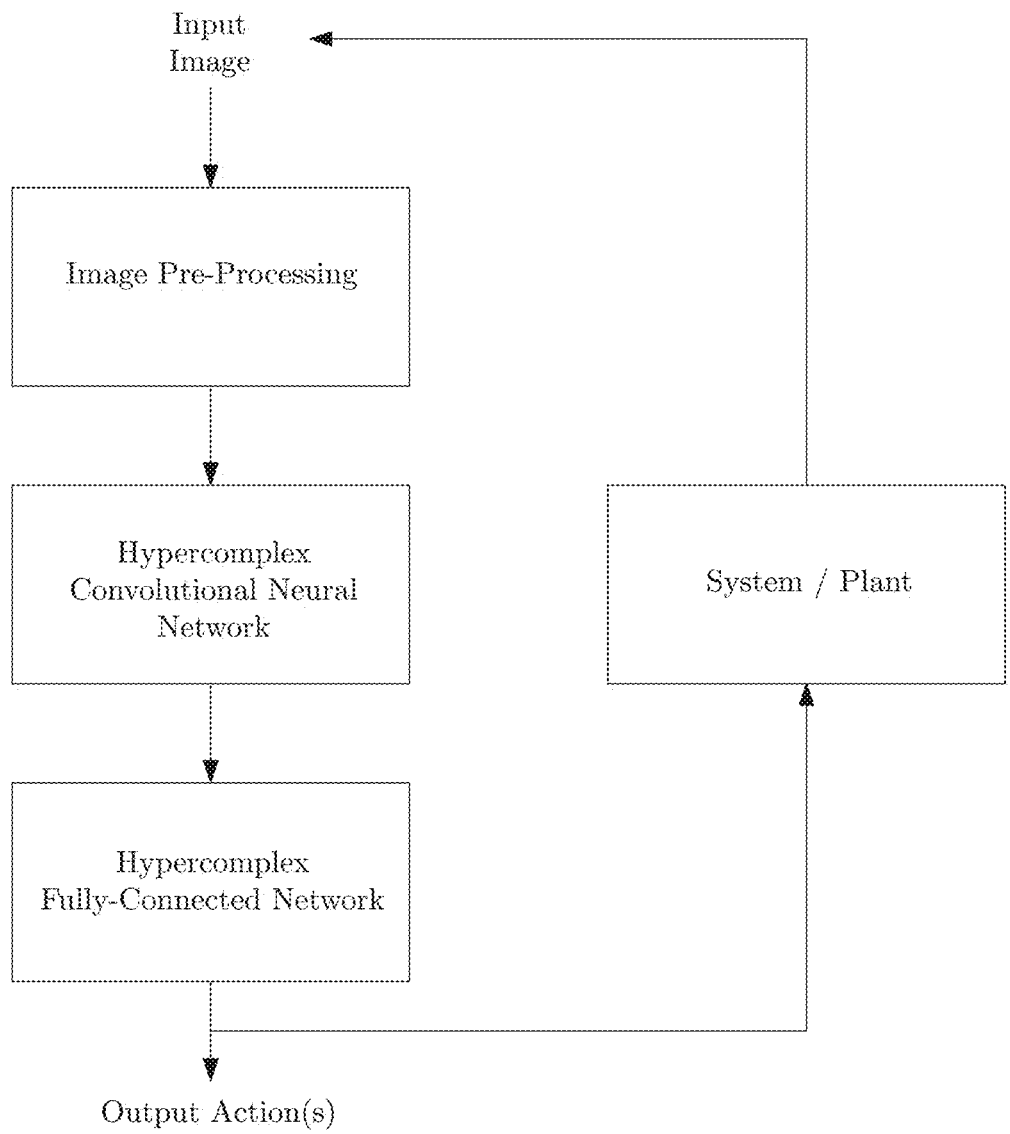
FIG. 41 depicts a flowchart representing a hypercomplex application—control: learning actions in a system with state.

Hypercomplex neural networks and graph structures may be employed, for example, to control systems with state, i.e. a plant. FIG. 41 shows a simple system where an image is processed using a hypercomplex convolutional neural network to determine a control action. The action is input to the system, which then generates a new image for further processing. Examples of machines following this structure include autonomous vehicles and aircraft, automated playing of video games, and other tasks where rewards are assigned after a sequence of steps.

4.10 Generative Models

Figure 42:
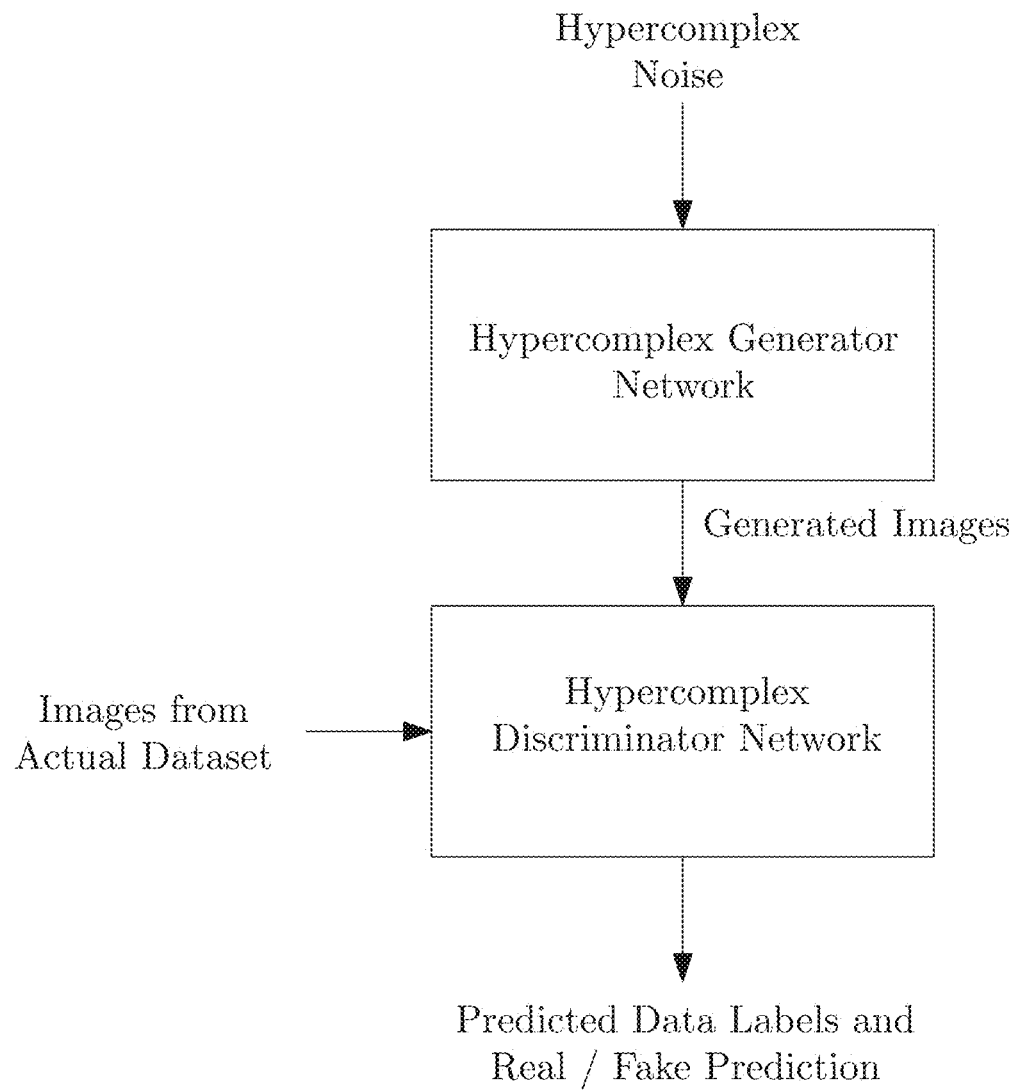
FIG. 42 depicts a flowchart representing a hypercomplex application: generative models.

FIG. 42 demonstrates an exemplary application of hypercomplex neural networks where two networks are present: The generator network takes noise as input and generates a fake image. Next, the discriminator network compares the fake image and a real image to decide which image is "real." This prediction amounts to a probability distribution over the data labels and is then employed for training both networks. Use of data generation may enhance the performance of image classification models such as the exemplary model shown in FIG. 33, FIG. 34, FIG. 35, or FIG. 36.

4.11 Medical Imaging: Breast Mass Classification

Another exemplary application hypercomplex networks is breast cancer classification or severity grading. For this application, use of the word, "classification," will refer both to applications where cancer presence is determined on a true or false basis, and will also refer to applications where the cancer is graded according to any type of scale—i.e. grading the severity of the cancer.

Figure 43:
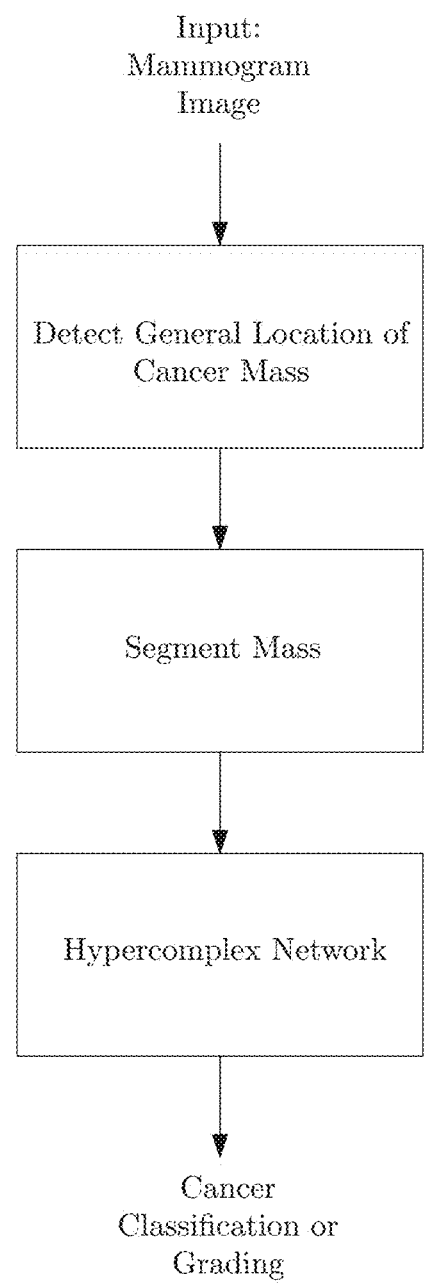
FIG. 43 depicts a flowchart representing a hypercomplex application: breast cancer classification or grading with hypercomplex network.

A simple system for breast cancer classification is shown in FIG. 43. In this system, the image is first processed to find the general area of potential tumors. Each tumor is then segmented using any image segmentation method (or, for example, the image segmentation method of Section 4.2), and finally the segmented image is processed by a hypercomplex network to determine a final cancer classification.

Note that a variety of multi-dimensional mammogram techniques are currently under development, and that false color is currently added to existing mammograms. Therefore, the advantages that a hypercomplex network has when processing color and multi-dimensional data apply to this example.

Figure 44:
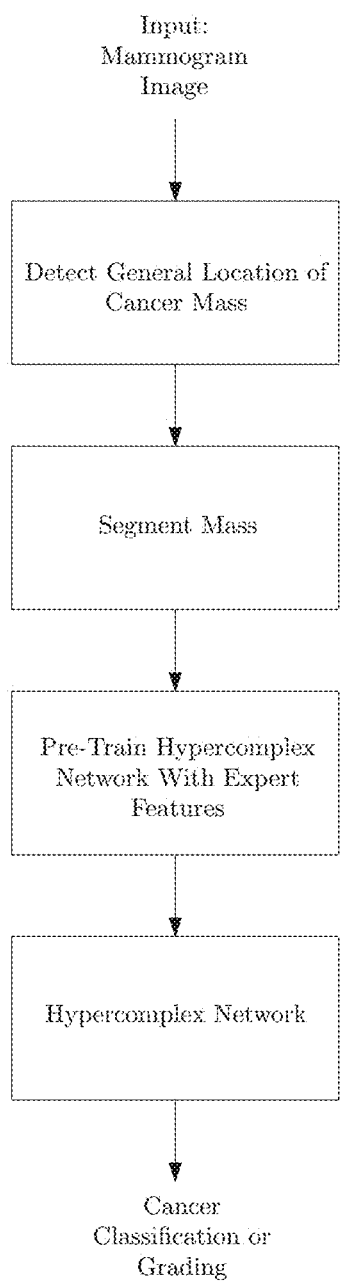
FIG. 44 depicts a flowchart representing a hypercomplex application: breast cancer classification or grading with pre-trained expert features.

Since breast cancer classification has been studied extensively, a large database of expert features has already been developed for use with this application. A further improvement upon the described hypercomplex breast cancer classification system is shown in FIG. 44 where existing expert features are pre-trained into the hypercomplex network before fine-tuning the network with standard learning techniques. This method of pre-training is described in detail in Section 1.11 and in FIG. 15.

Figure 45:
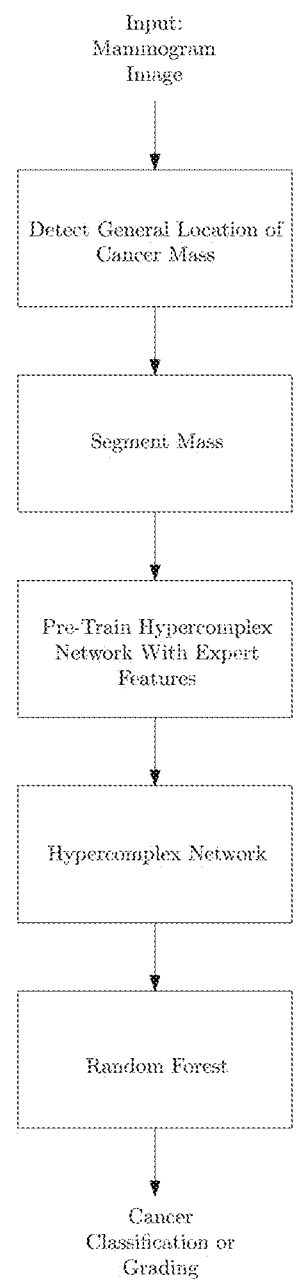
FIG. 45 depicts a flowchart representing a hypercomplex application: breast cancer classification or grading with pre-trained expert features and postprocessing.

Finally, additional postprocessing may be performed after the output of the hypercomplex network. An example of this is shown in FIG. 45, where random forest processing is applied to potentially further enhance classification accuracy.

4.12 Medical Imaging: MM

Figure 46:
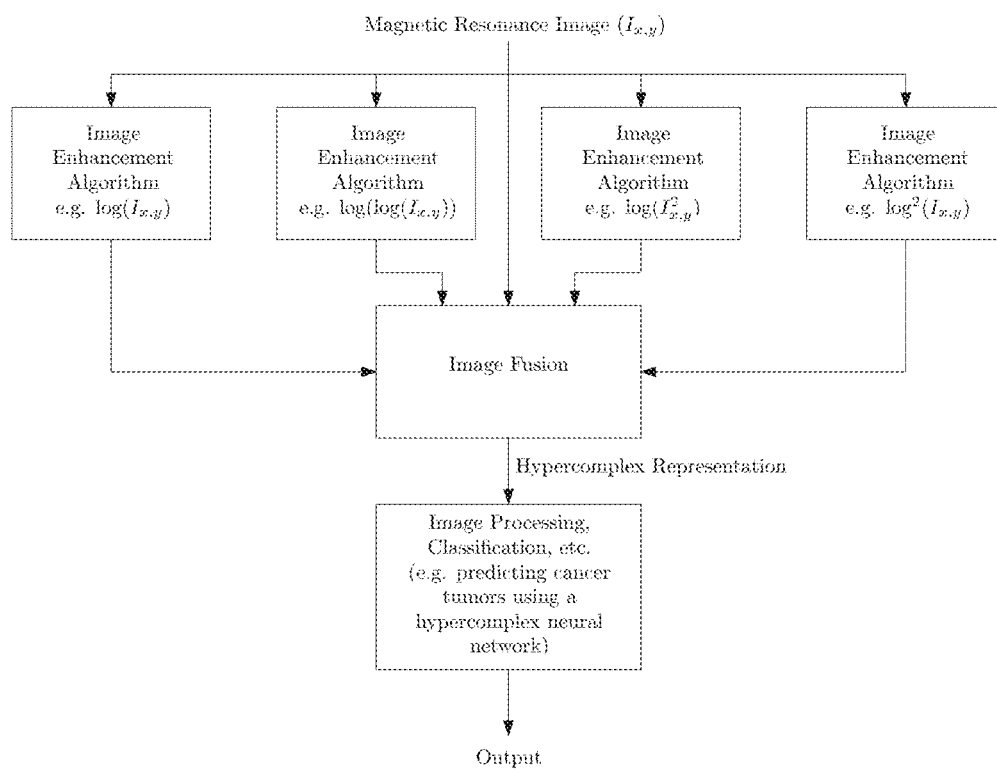
FIG. 46 depicts a flowchart representing a hypercomplex application: magnetic resonance image processing to classify cancer tumors.

FIG. 46 depicts an example of processing magnetic resonance image (MRI) data using hypercomplex representations. Once reconstructed from polar sensor data, MM data is typically displayed as gray-level images. As shown in FIG. 46, these images may be enhanced using a variety of image processing techniques, including logarithms or any other image enhancement algorithm. Next, the original and enhanced images may be combined using any fusion technique and, finally, represented using hypercomplex values. This hypercomplex representation may serve as input to further image processing and classification systems, for example, the hypercomplex neural networks discussed elsewhere in this document.

4.13 Hypercomplex processing of multi-sensor data

Most modern sensing applications employ multiple sensors, either in the context of a sensor array using multiple of the same type of sensor or by using different types of sensors (e.g. as in a smartphone). Because these sensors are typically measuring related, or the same, quantity, the output from each sensor is usually related in some way to the outputs from the other sensors.

Figure 47:
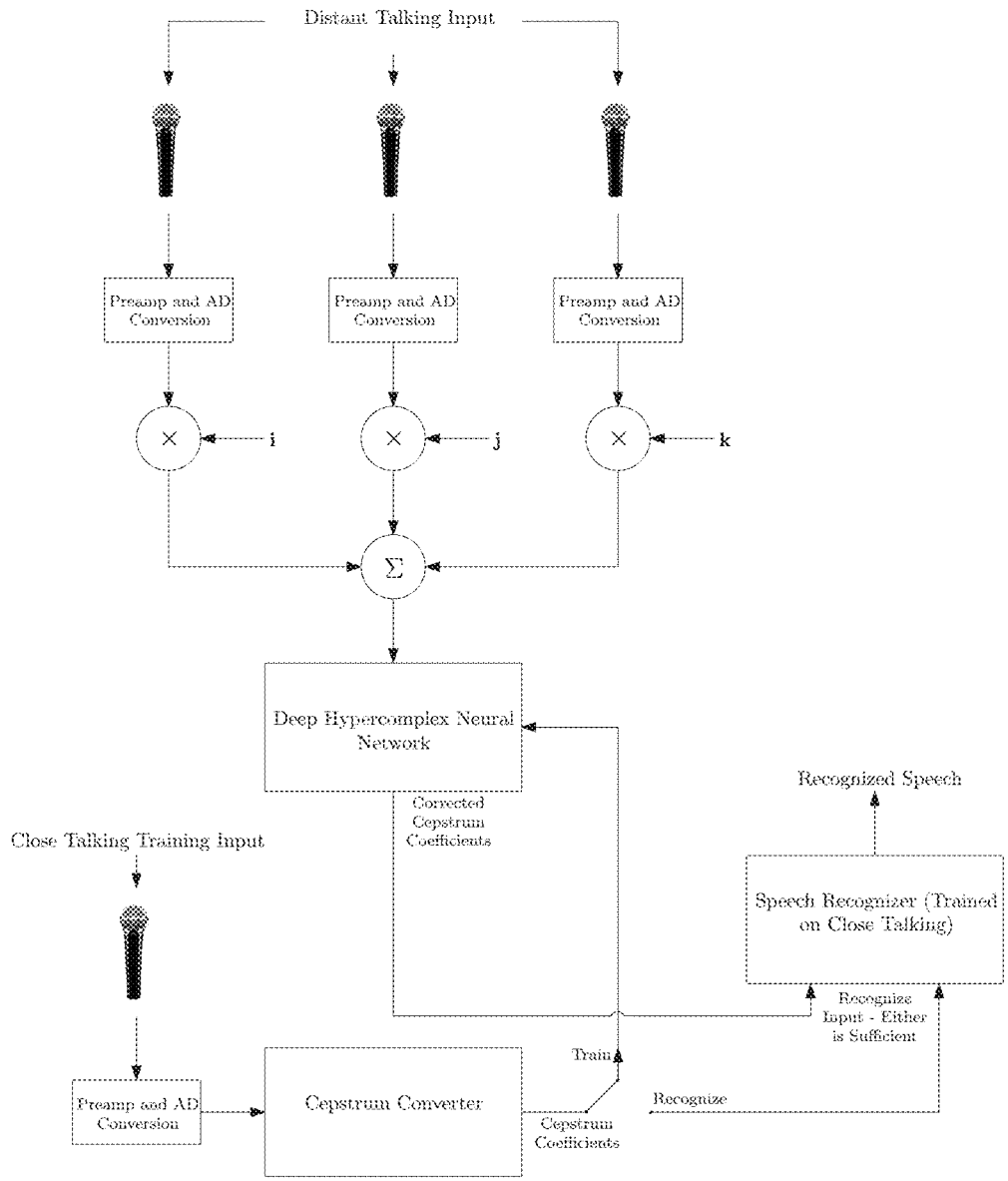
FIG. 47 depicts a flowchart representing a hypercomplex application: multi-sensor audio data processing.

Multi-sensor data may be represented by hypercomplex numbers and, accordingly, processed in a unified manner by the introduced hypercomplex neural networks. An example of speech recognition is shown in FIG. 47. In this system, a speech recognizer is trained using a speaker who talks close to the microphone and therefore has excellent signal to noise ratio. The person's speech is converted to cepstrum coefficients, input to the speech recognizer, and then converted to text.

The goal is to perform similar speech recognition on a speaker who is far away from a microphone array. To accomplish this, a microphone array captures far away speech and represents it using hypercomplex numbers. Next, a deep hypercomplex neural network (possibly including state elements) is trained to output corrected cepstrum coefficients by using the close talking input and its cepstrum converter to created labeled training data. Finally, during the recognition phase, the close talking microphone can be disabled completely and the hypercomplex neural network feeds the speech recognizer directly, delivering speech recognition quality similar to that of the close-talking system.

4.14 Hypercomplex Multispectral Image Processing and Prediction

Multispectral imaging is important for a variety of material analysis applications, such as remote sensing, art and ancient writing investigation and decoding, fruit quality analysis, and so on. In multispectral imaging, images of the same object are taken at a variety of different wavelengths. Since materials have different reflectance and absorption properties at different wavelengths, multispectral images allow one to perform analysis that is not possible with the human eye.

Figure 48:
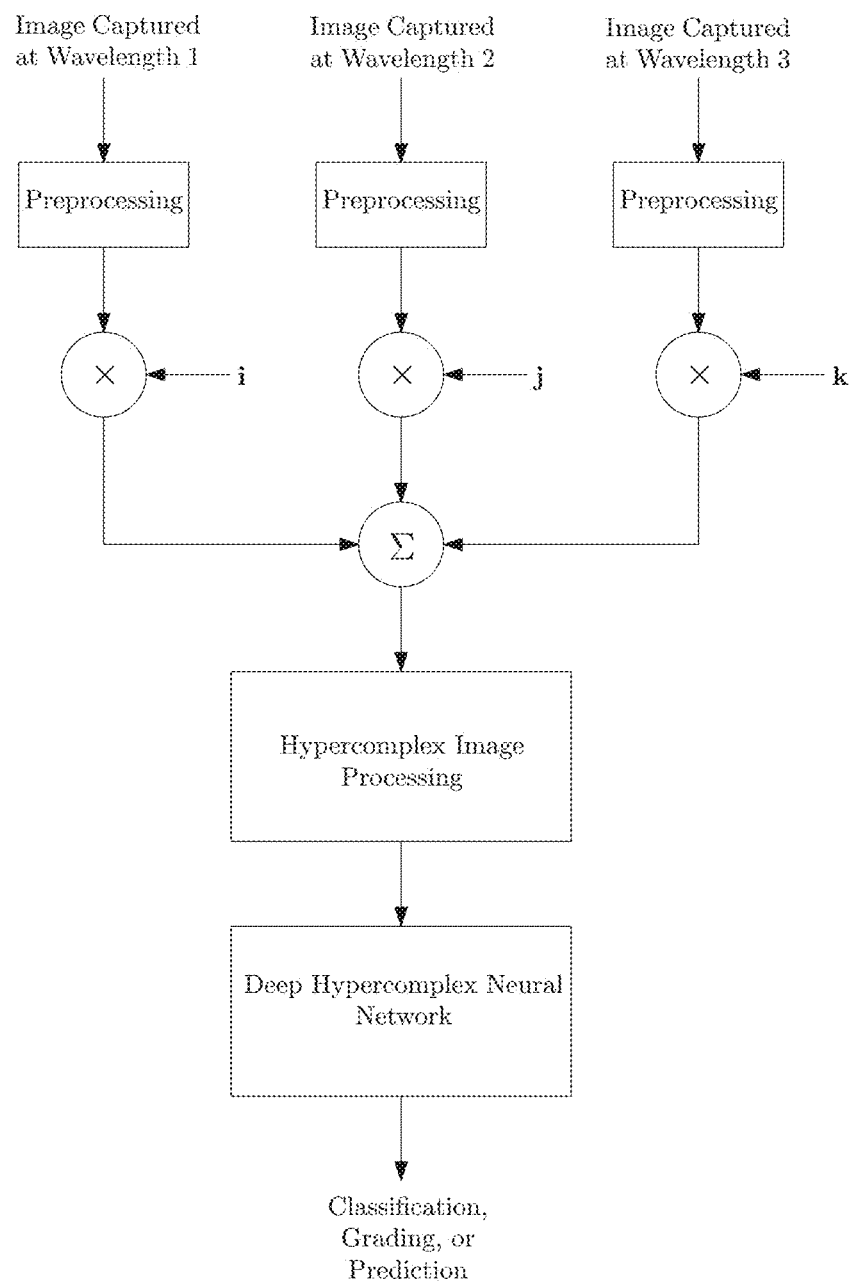
FIG. 48 depicts a flowchart representing a hypercomplex application: multispectral image processing.

A typical multispectral image dataset is processed using a classifier to determine some property or score of the material. This process is shown in FIG. 48, where multiple images are captured, represented using hypercomplex numbers, and then classified using a hypercomplex deep neural network.

Figure 49:
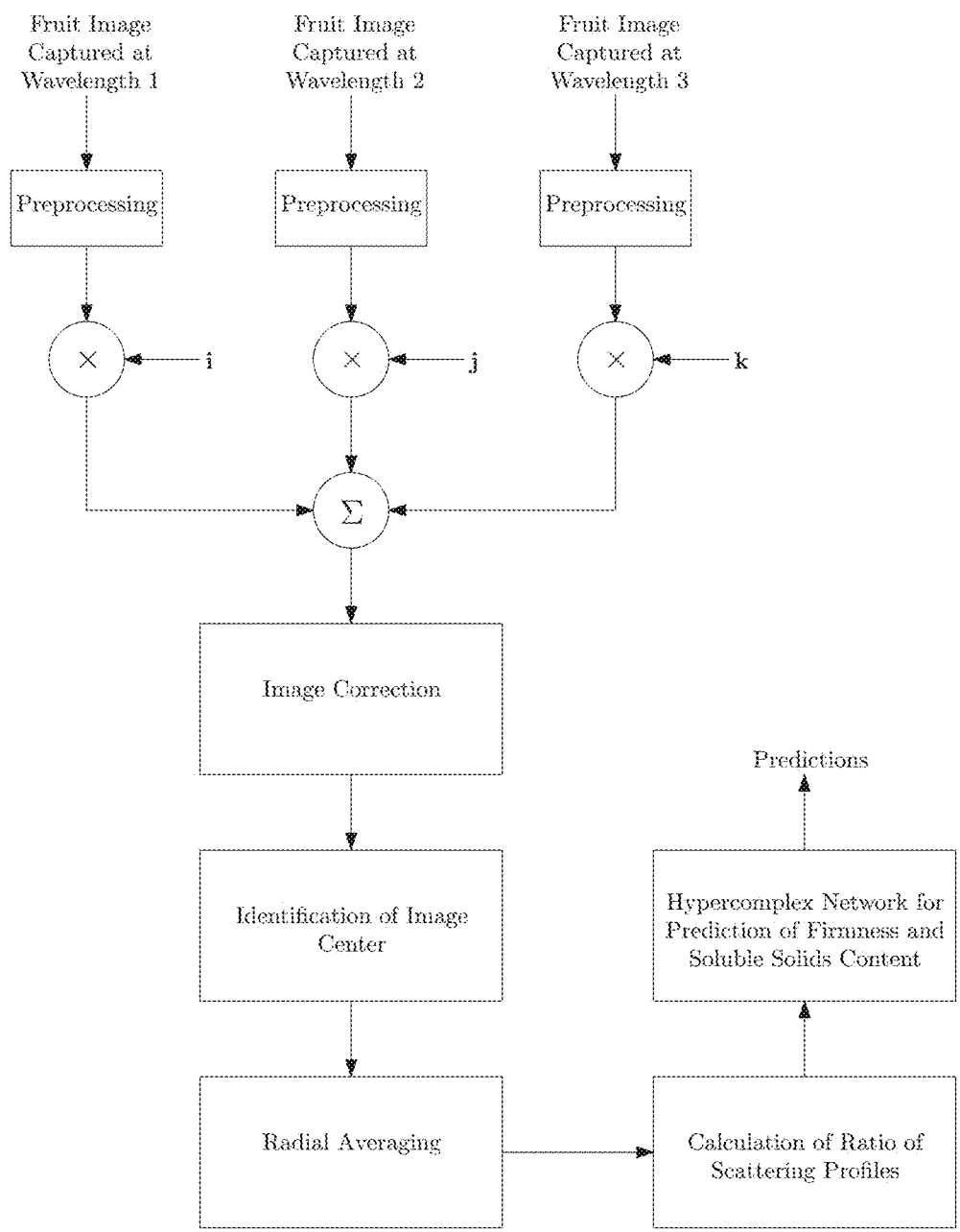
FIG. 49 depicts a flowchart representing a hypercomplex application: multispectral image processing for fruit firmness and soluble solids content prediction.

In FIG. 49, the exemplary application of multispectral prediction of apple (fruit) firmness and soluble solids content is demonstrated. Images of an apple are captured at numerous wavelengths and represented as hypercomplex numbers. Three images are shown in the figure, the but the approach is applicable to any number of images or wavelengths. Next, the images are processed using an apple fruit image processing pipeline, and finally classified using a hypercomplex neural network.

4.15 Hypercomplex Image Filtering

Figure 50:
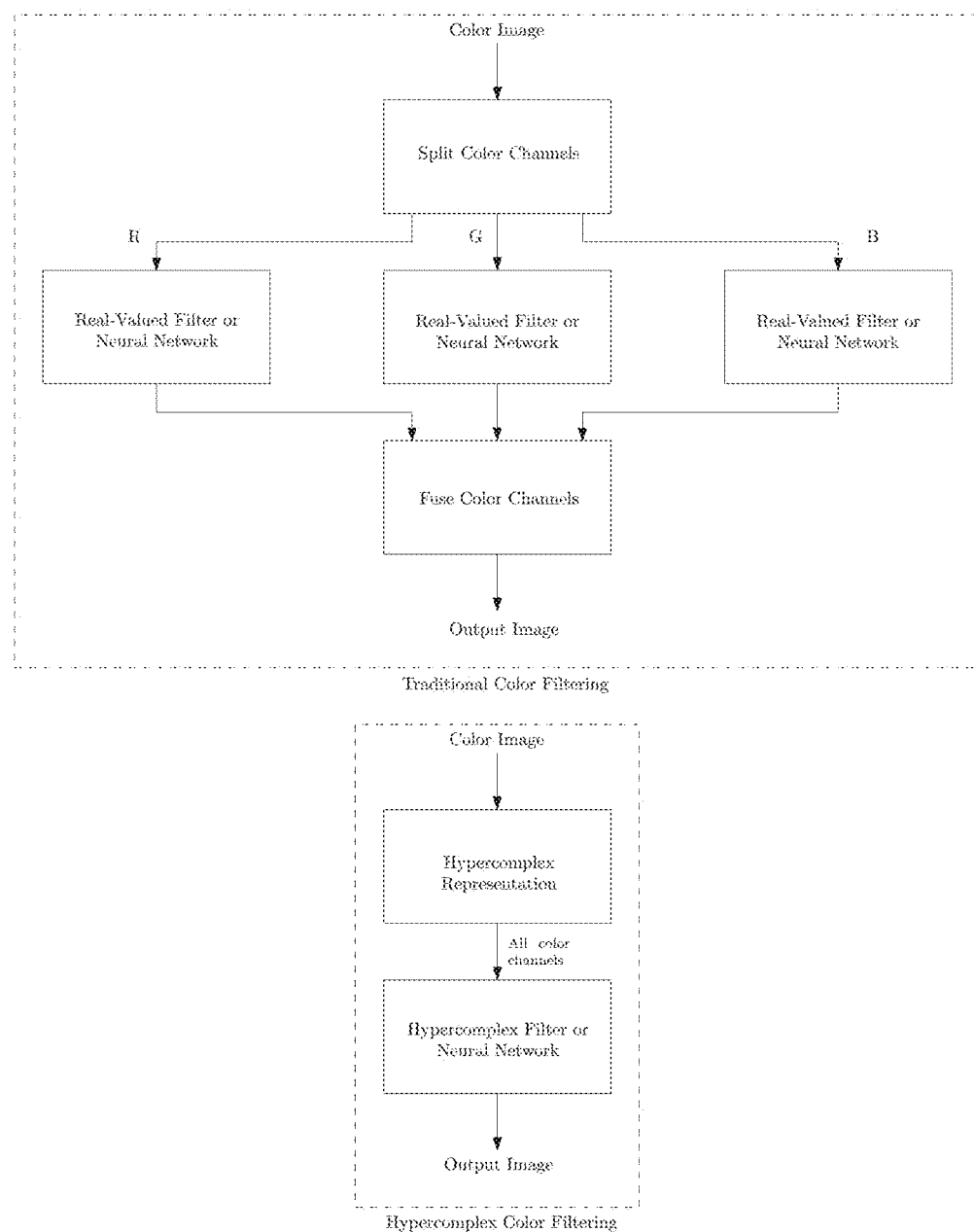
FIG. 50 depicts a flowchart representing a hypercomplex application: color image filtering.

Another exemplary application of the hypercomplex neural networks introduced in this patent is color image filtering, where the colors are processed in a unified fashion as shown in FIG. 50. Traditionally, color images are split into their color channels and each channel is processed separately, as shown in the top half of FIG. 50. The hypercomplex structures in this patent allow systems to process images in a unified manner, enabling the preservation and processing of important inter-channel relationships. This is shown in the bottom pane of FIG. 50.

4.16 Hypercomplex Processing of Gray Level Images

Figure 51:
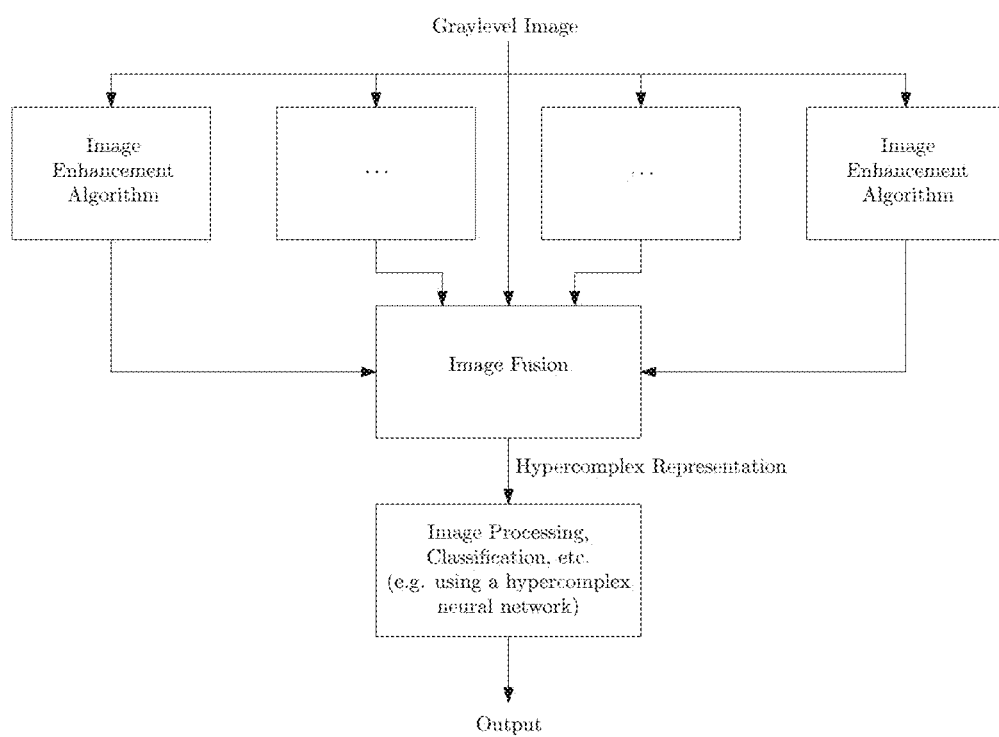
FIG. 51 depicts a flowchart representing a hypercomplex application: gray level image processing.

While processing of multichannel, color images has been discussed at length in this application, hypercomplex structures may also be employed for single-channel, gray-level images as well. FIG. 51, shows an example where a single-channel image is enhanced using any sort of image enhancement algorithm (e.g. contrast enhancement, application of logarithms, etc.). The original and enhanced images are subsequently combined and represented using hypercomplex numbers, which can be employed with hypercomplex algorithms as described elsewhere in this document.

4.17 Hypercomplex Processing of Enhanced Color Images

Figure 52:
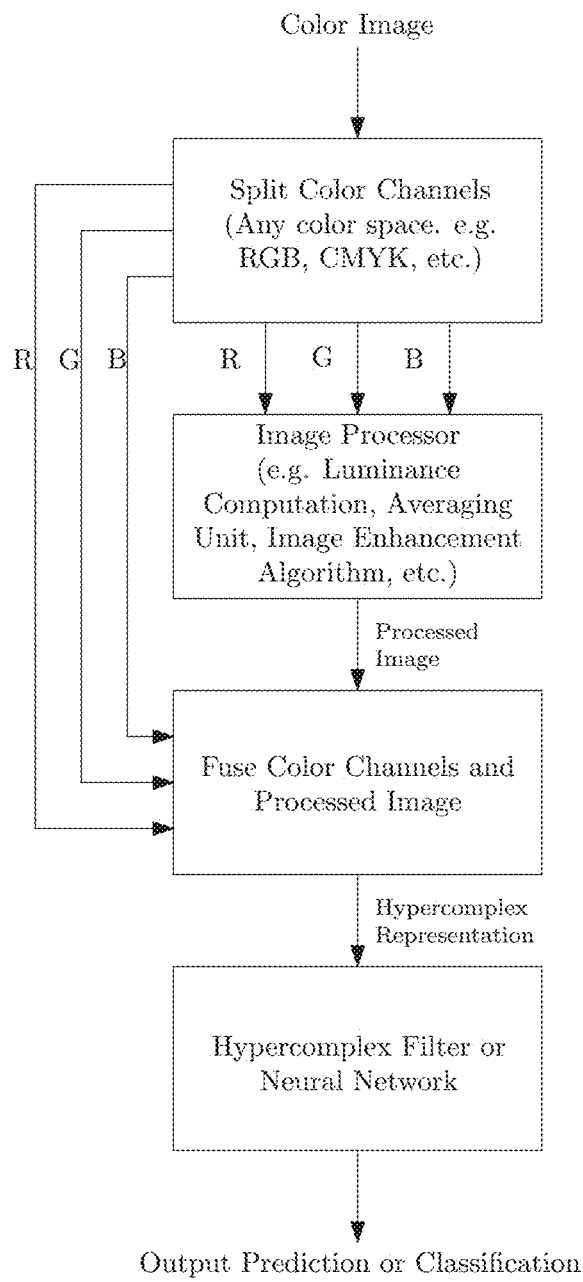
FIG. 52 depicts a flowchart representing a hypercomplex application: enhanced color image processing or classification.

Standard color image enhancement and analysis techniques, such as, for example, luminance computation, averaging filters, morphological operations, and so on, may be employed in conjunction with the hypercomplex graph components/neural networks described in this application. For example, FIG. 52 shows a system where a color image is split into its components and is then processed by various enhancement algorithms. Next, the original and enhanced image are combined to form a hypercomplex representation of the image data. This representation is then used as input to a hypercomplex neural network to produce some output prediction, classification, or enhancement of the original color image.

4.18 Multimodal Biometric Identity Matching

Biometric authentication has become popular in recent years due to advancements in sensors and imaging algorithms. However, any single biometric credential can still easily be corrupted due to noise: For example, camera images may be occluded or have unwanted shadows; fingerprint readers may read fingers covered in dirt or mud; iris images may be corrupted due to contact lenses; and so on. To increase the accuracy of biometric authentication systems, multimodal biometric measurements are helpful.

Figure 53:
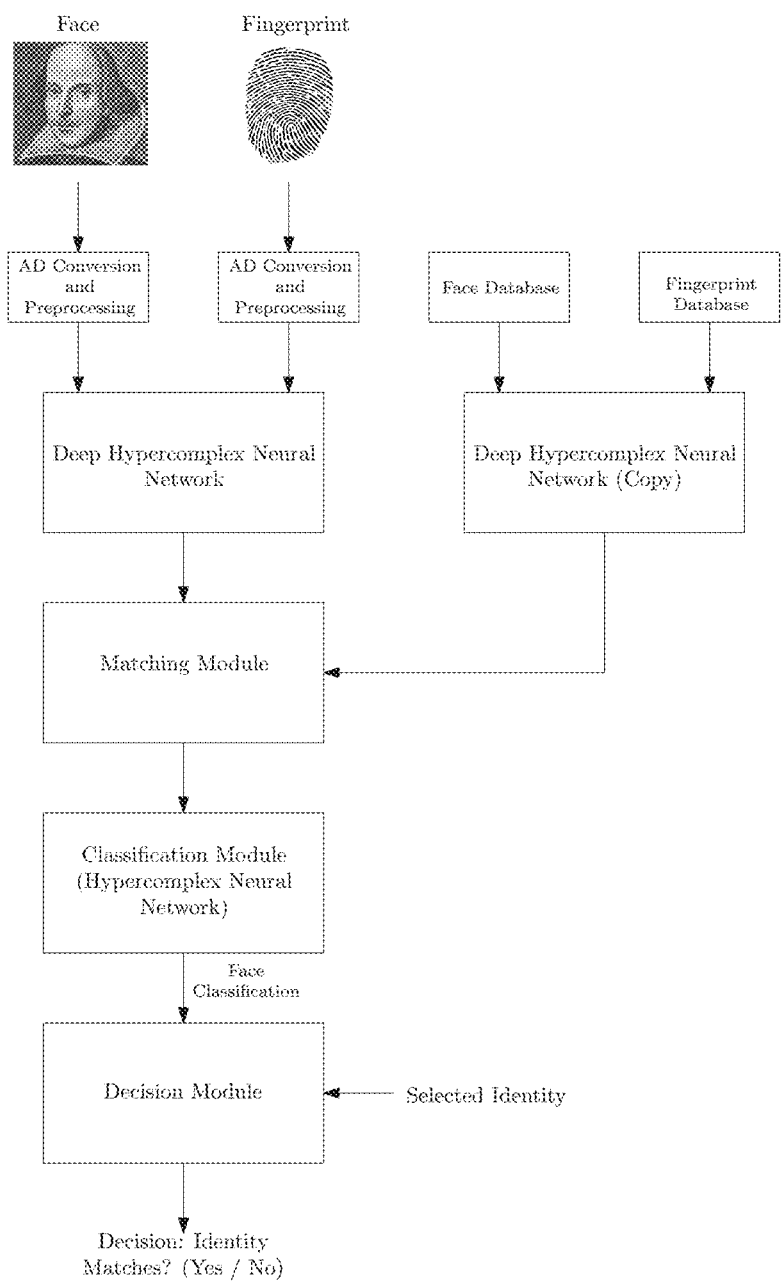
FIG. 53 depicts a flowchart representing a hypercomplex application: multimodal biometric identity verification.

An exemplary application of the hypercomplex neural networks in this patent application is multimodal biometric identity matching, where multiple biometric sensors are combined at the feature level to enable decision making based on a fused set of data. FIG. 53 shows an exemplary system that employs facial photographs and fingerprints. The face and fingerprint data is digitized and sent to a hypercomplex deep neural network, which learns an appropriate hierarchical data representation to combine the two sensors. Faces and fingerprints are also stored in a database, and the in-database data is processed using a copy of the deep network so that the matching module is matching equivalent data. After matching, another hypercomplex neural network may be used for classification and, finally, a decision module can accept or reject that the input data belongs to a person of a given identity. The face in FIG. 53 is drawn in grayscale but may also be presented in color; there are numerous examples of color image processing throughout this patent application.

Advantages of unified multimodal processing include higher accuracy of classification and better system immunity to noise and spoofing attacks.

4.19 Multimodal Biometric Identity Matching with Autoencoder

Figure 54:
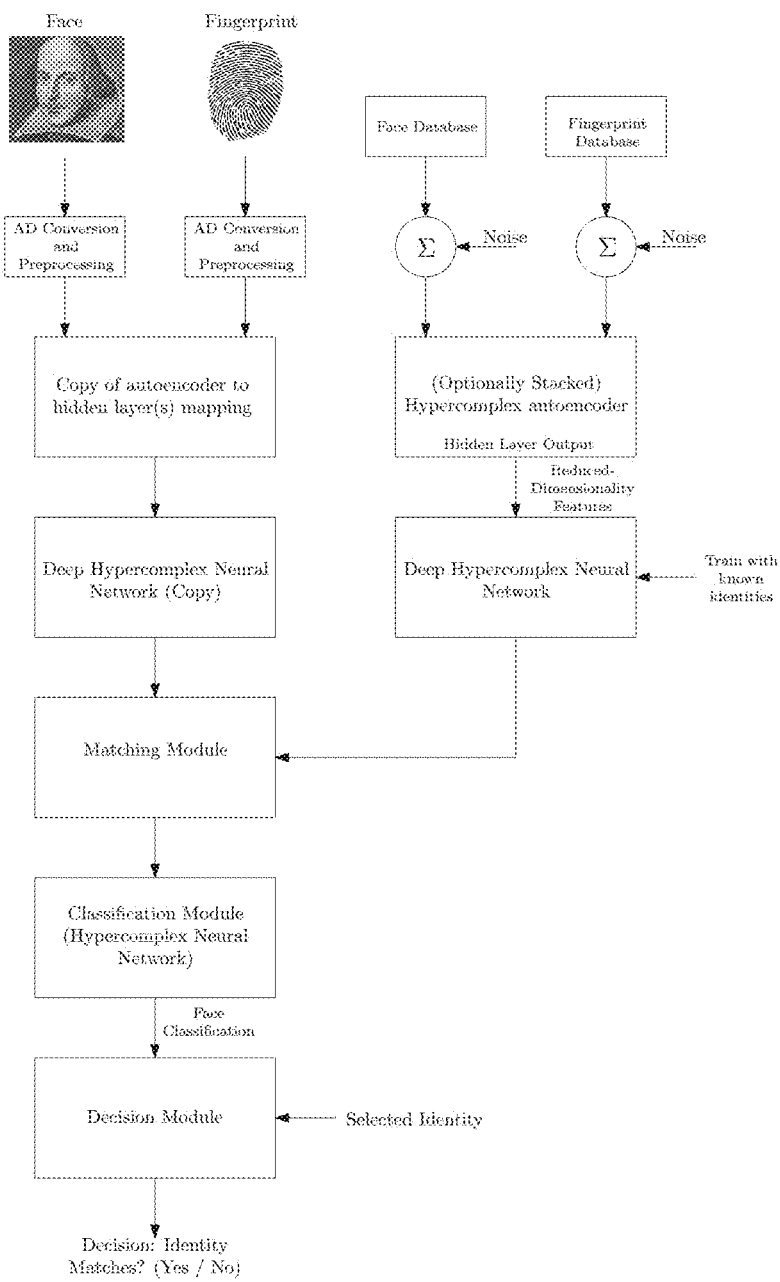
FIG. 54 depicts a flowchart representing a hypercomplex application: multimodal biometric identity verification with autoencoder.

To further extend the example in Section 4.18, one may add an additional hypercomplex autoencoder, as pictured in FIG. 54. The (optionally stacked) autoencoder serves to create unsupervised representations of the training dataset, thereby reducing the feature space for the deep hypercomplex network. During training, multiple copies of the input data are each corrupted by independent sets of noise and trained into the autoencoder. This serves to improve generalization performance and the robustness of the feature space learned by the autoencoder. Note that any other feature space reduction method may be employed, and that the autoencoder is merely an example of a feature reduction technique.

4.20 Multimodal Biometric Identity Matching with Unlabeled Data

Figure 55:
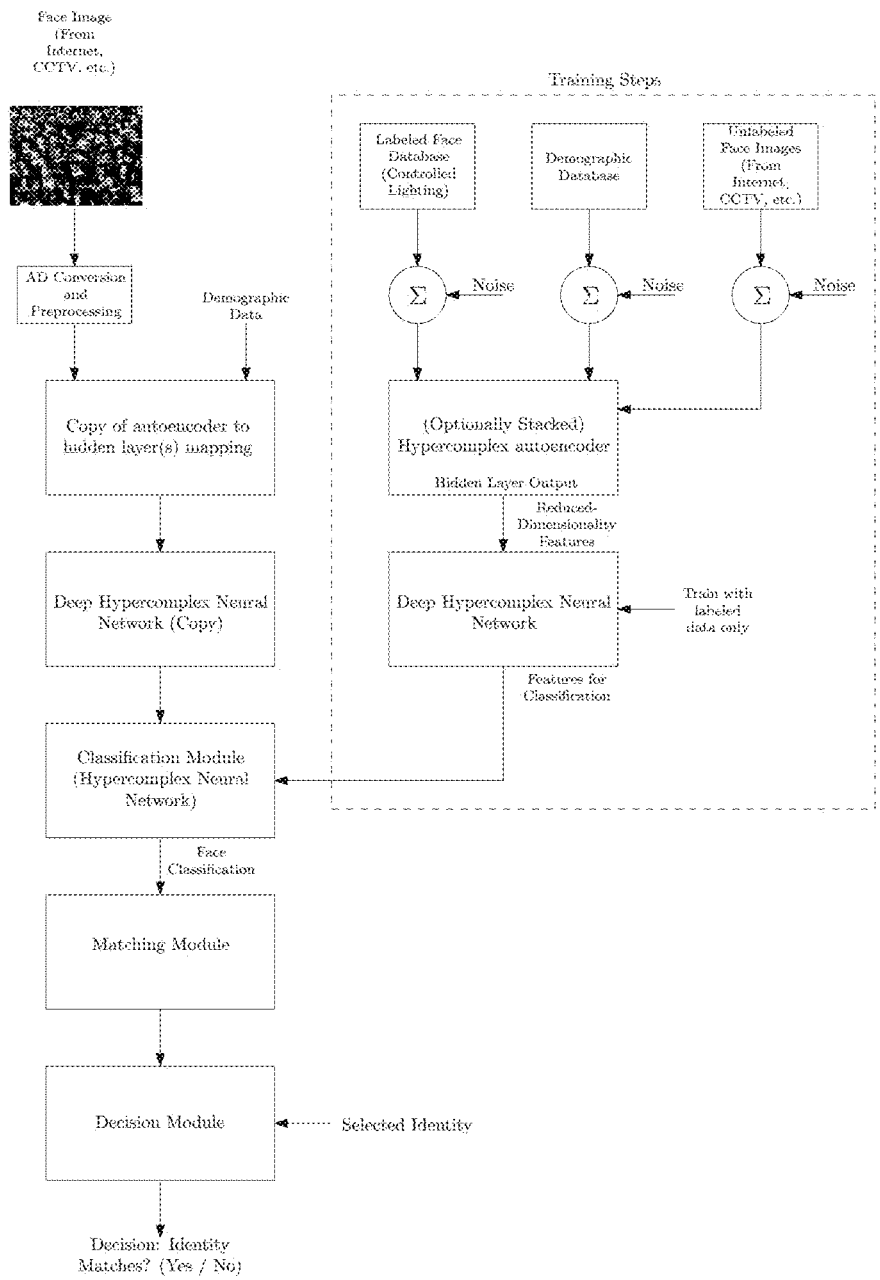
FIG. 55 depicts a flowchart representing a hypercomplex application: multimodal biometric identity verification with transfer learning.

In biometrics, it is frequently the case that large quantities of unlabeled data are available, but only a small dataset of labeled data can be obtained. It is desirable to use the unlabeled data to enhance system performance through pre-training steps, as shown in FIG. 55. As in Section 4.19, an autoencoder is trained with noisy copies of data to create a lower-dimensional representation of the input data. However, in the system of FIG. 55, additional unlabeled data is trained into the autoencoder.

Particularly in the case of facial images, most labeled databases have well-lit images in a controlled environment, while unlabeled datasets (e.g. from social media) have significant variations in pose, illumination, and expression. Therefore, creating data representations that are capable of representing both types of data will enhance overall system performance.

4.21 Multimodal Biometric Identity Matching with Transfer Learning

Figure 56:
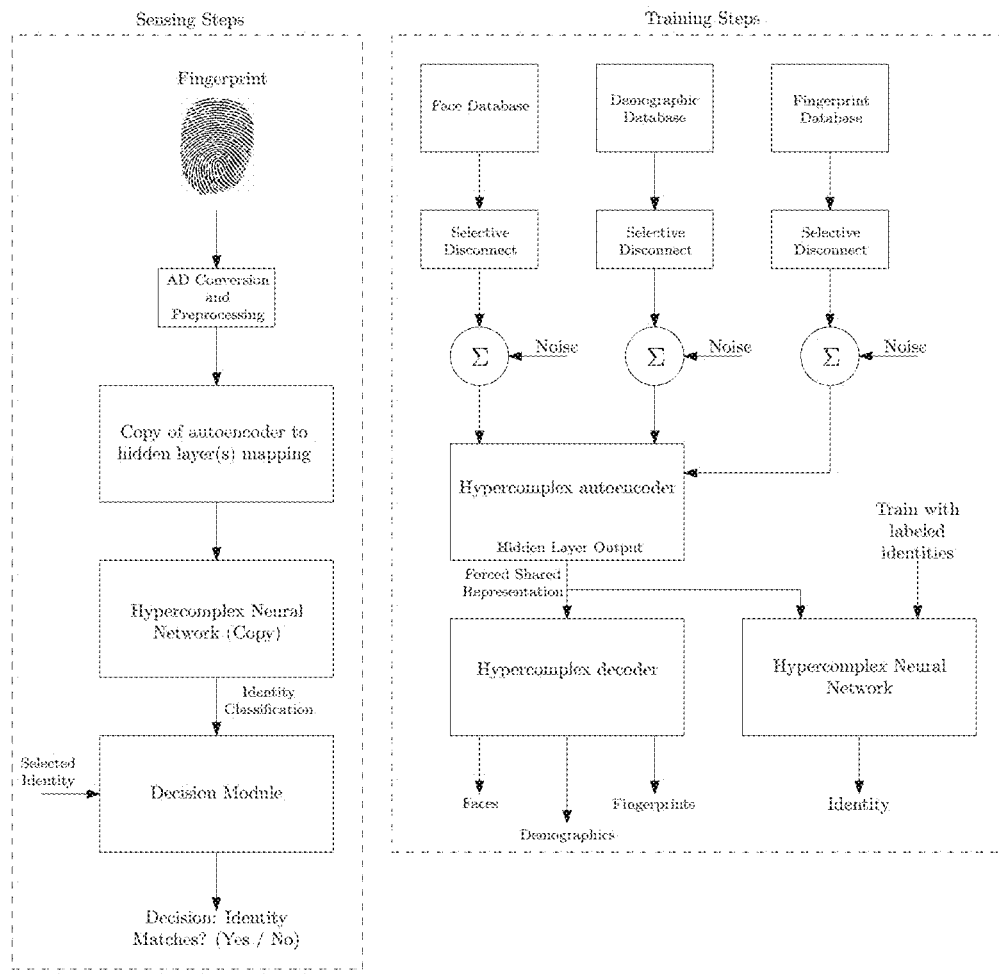
FIG. 56 depicts a flowchart representing a hypercomplex application: multimodal biometric identity verification with missing modalities.

A potential problem with the system described in Section 4.20 is that the feature representation created by the (stacked) autoencoder may result in a feature space where each modality is represented by separate elements; while all modalities theoretically share the same feature representations, they do not share the same numerical elements within those representations. An exemplary solution to this is shown in FIG. 56, where all modalities are forced to share elements in the feature space.

In this proposed system, matching sets of data are formed from, for example: (i) anatomical characteristics, for example, fingerprints, signature, face, DNA, finger shape, hand geometry, vascular technology, iris, and retina; (ii) behavioral characteristics, for example, typing rhythm, gait, gestures, and voice; (iii) demographic indicators, for example, age, height, race, and gender; and (iv) artificial characteristics such as tattoos and other body decoration. While training the autoencoder, one or more modalities from each matching dataset are omitted and replaced with zeros. However, the autoencoder/decoder pair is still trained to reconstruct the missing modality, thereby ensuring that information from the other modalities is used to represent the missing modality. As with FIG. 54 and FIG. 55, noise is repeatedly sampled and added to the autoencoder training set in order to enhance the generality of the learned representation.

4.22 Clothing Identification

The fashion industry presents a number of interesting exemplary applications of hypercomplex neural networks. In particular, most labeled data for clothing comes from retailers, who hire models to demonstrate clothing appearance and label the photographs with attributes of the clothing, such as sleeve length, slim or loose, color, and so on. However, many practical applications of clothing detection are relevant for so-called "in the street" clothes. For example, if a retailer wants to know how often a piece of clothing is worn, scanning social media could be an effective approach, provided that the clothing can be identified from photos that are taken in an uncontrolled environment.

Moreover, in biometric applications, clothing identification may be helpful as an additional modality.

Figure 57:
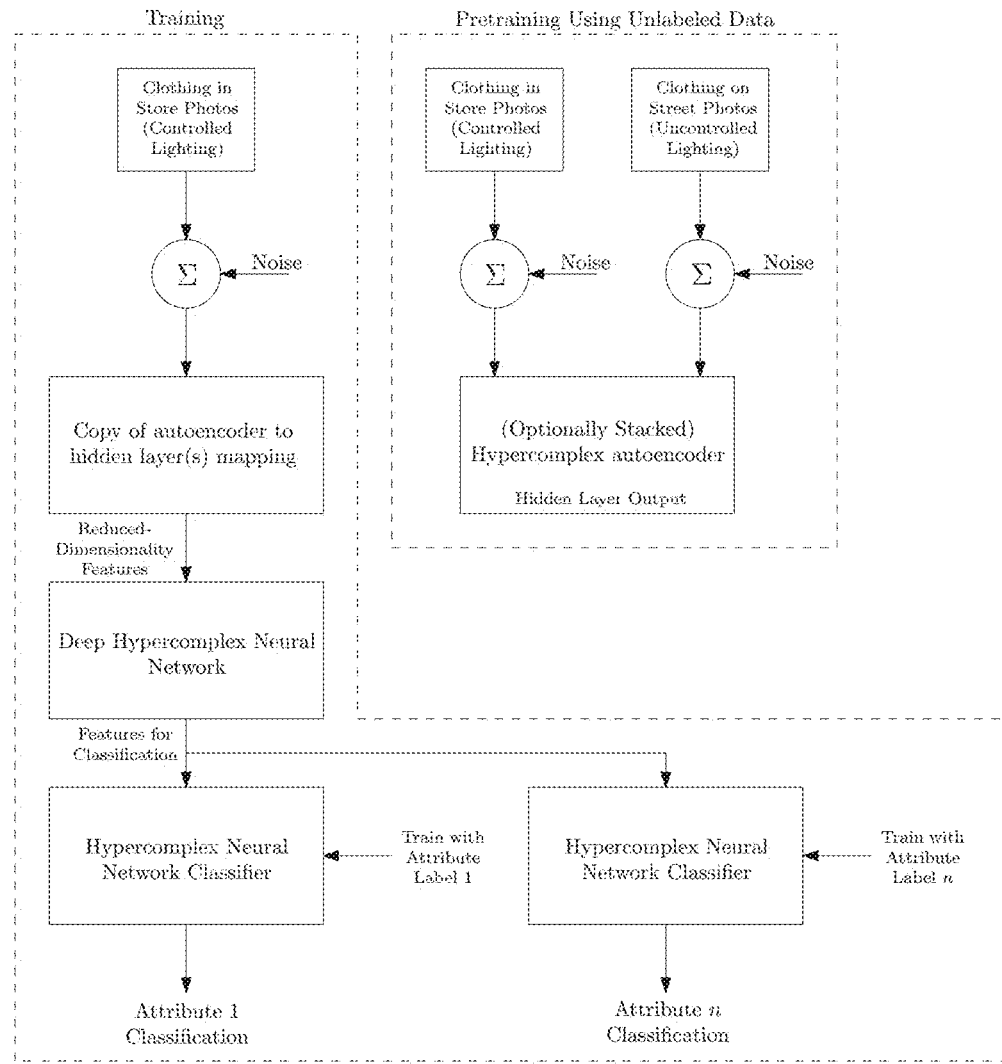
FIG. 57 depicts a flowchart representing a hypercomplex application: attribute classification of clothing using labeled and unlabeled data.
Figure 58:
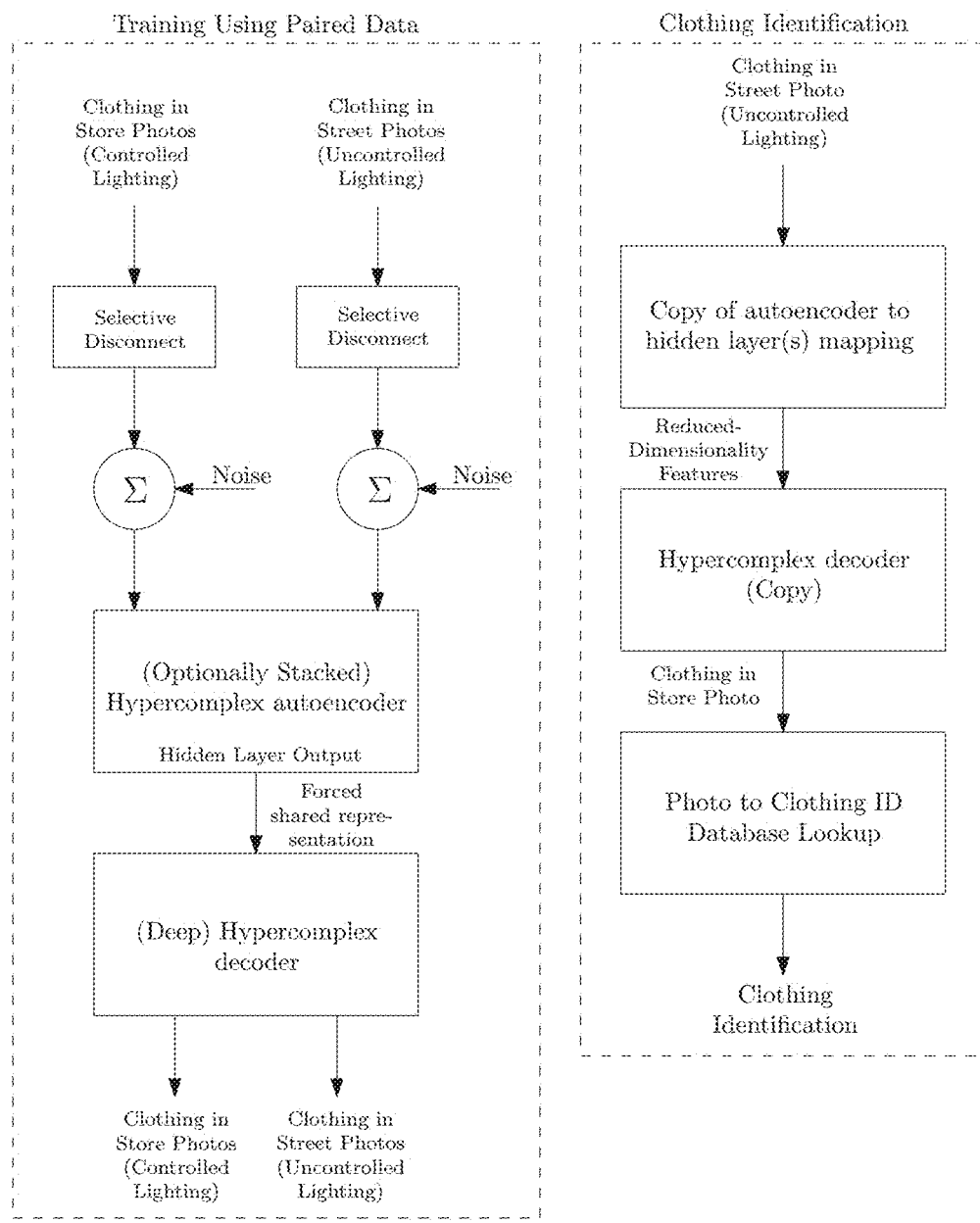
FIG. 58 depicts a flowchart representing a hypercomplex application: transfer learning to match "in the street" clothing with "in store" photographs.

An exemplary system for creating a store clothing to attribute classification system is shown in FIG. 57. This system is useful for labeling attributes of in-store clothing that does not have attributes already labeled by a human. In FIG. 58, a (optionally stacked) hypercomplex autoencoder is used to create a forced shared representation of in-street and in-store clothes. As with thee biometric application in Section 4.21, the autoencoder is trained by selectively disabling one of the input modalities (in this case, clothing photo) but forcing the entire system to reproduce the missing modality. During clothing identification, the system is always running with the "in-store" input modality missing and, by training in the earlier step, produces the correct "in-store" output given the "in-street" input. This output is then matched by database to the clothing identification, product number, stored attributes, etc.

5. Flowchart Diagram for Hypercomplex Training of Neural Network

Figure 59:
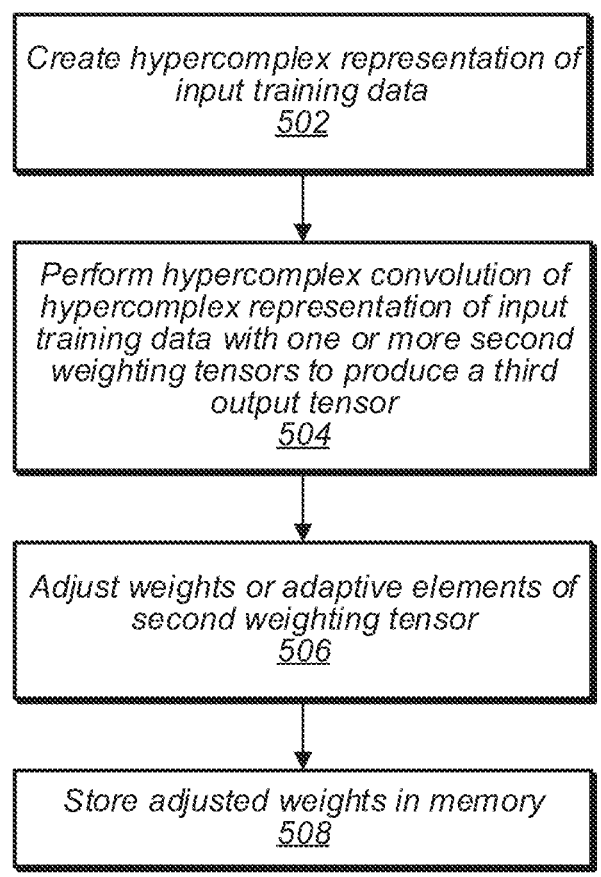
FIG. 59 depicts a flowchart representing hypercomplex training of a neural network.

FIG. 59 is a flowchart diagram illustrating an exemplary method for training one or more neural network layers, according to some embodiments. According to various embodiments, the neural network layers may be part of a convolutional neural network (CNN) or a tensor neural network (TNN). Aspects of the method of FIG. 59 may be implemented by a processing element or a processor coupled to a memory medium and included within any of a variety of types of computer devices, such as those illustrated in and described with respect to various of the Figures herein, or more generally in conjunction with any of the computer systems or devices shown in the above Figures, among other devices, as desired. For example, the processing element may be a central processing unit (CPU), a graphics processing unit (GPU), a field programmable gate array (FPGA), an application specific integrated circuit (ASIC), and/or any other type of processing element. In various embodiments, some of the elements of the methods shown may be performed concurrently, in a different order than shown, may be substituted for by other method elements, or may be omitted. Additional method elements may also be performed as desired. As shown, the method of FIG. 59 may operate as follows.

At 502, a hypercomplex representation of input training data may be created. In some embodiments, the input training data may comprise image data (e.g., traditional image data, multispectral image data, or hyperspectral image data. For example, in some embodiments, each spectral component of the multispectral image data may be associated in the hypercomplex representation with a separate dimension in hypercomplex space), and the hypercomplex representation may comprise a first tensor. In these embodiments, a first dimension of the first tensor may correspond to a first dimension of pixels in an input image, a second dimension of the first tensor may correspond to a second dimension of pixels in the input image, and a third dimension of the first tensor may correspond to different spectral components of the input image in a multispectral or hyperspectral representation. In other words, the first tensor may separately represent each of a plurality of spectral components of the input images as respective matrices of pixels. In some embodiments, the first tensor may have an additional dimension corresponding to depth (e.g., for a three-dimensional "image", i.e., a multispectral 3D model).

In other embodiments, the input training data may comprise text and the CNN may be designed for speech recognition or another type of text-processing application. In these embodiments, the hypercomplex representation of input training data may comprise a set of data tensors. In these embodiments, a first dimension of each data tensor may correspond to words in an input text, a second dimension of each data tensor may correspond to different parts of speech of the input text in a hypercomplex representation, and each data tensor may have additional dimensions corresponding to one or more of data depth, text depth, and sentence structure.

At 504, hypercomplex convolution of the hypercomplex representation (e.g., the first tensor in some embodiments, or the set of two or more data tensors, in other embodiments) with a second tensor may be performed to produce a third output tensor. For image processing applications, the second tensor may be a hypercomplex representation of weights or adaptive elements that relate one or more distinct subsets of the pixels in the input image with each pixel in the output tensor. In some embodiments, the subsets of pixels are selected to comprise a local window in the spatial dimensions of the input image. In some embodiments, a subset of the weights map the input data to a hypercomplex output using a hypercomplex convolution function.

In text processing applications, 504 may comprise performing hypercomplex multiplication using a first data tensor of the set of two or more data tensors of the hypercomplex representation with a third hypercomplex tensor to produce a hypercomplex intermediate tensor result, and then multiplying the hypercomplex intermediate result with a second data tensor of the set of two or more data tensors to produce a fourth hypercomplex output tensor, wherein the third hypercomplex tensor is a hypercomplex representation of weights or adaptive elements that relate the hypercomplex data tensors to one another. In some embodiments, the fourth hypercomplex output tensor may be optionally processed through additional transformations and then serve as input data for a subsequent layer of the neural network. In some embodiments, the third output tensor may serve as input data for a subsequent layer of the neural network.

At 506, the weights or adaptive elements in the second tensor may be adjusted such that an error function related to the input training data and its hypercomplex representation is reduced. For example, a steepest descent or other minimization calculation may be performed on the weights or adaptive elements in the second tensor such that the error function is reduced.

At 508, the adjusted weights may be stored in the memory medium to obtain a trained neural network. Each of steps 502-508 may be subsequently iterated on subsequent respective input data to iteratively train the neural network.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for training one or more convolutional neural network (CNN) layers, the method comprising:
by a computer processor having a memory coupled thereto:
creating a first layer of the CNN comprising a hypercomplex representation of input training data, wherein the hypercomplex representation of the input training data comprises a first tensor, wherein a first dimension of the first tensor corresponds to a first dimension of pixels in an input image, wherein a second dimension of the first tensor corresponds to a second dimension of pixels in the input image, wherein the first dimension is orthogonal to the second dimension, and wherein a third dimension of the first tensor corresponds to different spectral components of the input image in a multispectral representation; and
performing hypercomplex convolution of the first tensor with a second tensor to produce a third output tensor, wherein the second tensor is a hypercomplex representation of first weights that relate one or more distinct subsets of the pixels in the input image with each pixel in the output tensor, and wherein the third output tensor serves as input training data for a second layer of the CNN;
adjusting the first weights in the second tensor such that an error function related to the input training data and its hypercomplex representation is reduced; and
storing the adjusted first weights in the memory as trained parameters of the first layer of the CNN.

2. The method of 1, wherein the distinct subsets of pixels are selected to comprise local windows in the spatial dimensions of the input image.

3. The method of claim 1, wherein the input image comprises a three-dimensional image, wherein a third dimension of the first tensor corresponds to a depth of pixels in the input image, and wherein the depth is orthogonal to the first dimension and the second dimension.

4. The method of claim 1, wherein adjusting the first weights in the second tensor such that the error function related to the input training data and its hypercomplex representation is reduced comprises performing a steepest descent calculation on the first weights the second tensor.

5. The method of claim 1, the method further comprising:
creating a second layer of the CNN comprising a hypercomplex representation of the third output tensor, wherein the hypercomplex representation of the third output tensor comprises a fourth tensor,
performing hypercomplex convolution of the fourth tensor with a fifth tensor to produce a sixth output tensor, wherein the fifth tensor is a hypercomplex representation of second weights;
adjusting the second weights in the fifth tensor such that an error function related to the third output tensor and its hypercomplex representation is reduced; and
storing the adjusted second weights in the memory as trained parameters of the second layer of the CNN.

6. The method of claim 1, the method further comprising:
iteratively repeating said creating, performing, adjusting and storing on one or more subsequent layers of the CNN.

7. The method of claim 1, wherein performing hypercomplex convolution of the first tensor with the second tensor comprises performing quaternion multiplication of the first tensor with the second tensor.

* * * * *